INVENTORS:
Frank A. Morris
Robert B. Trousdale
BY T. L. Bowes
Attorney

INVENTORS:
Frank A. Morris
Robert B. Trousdale
BY T. L. Bowes
Att'y

TELEPHONE SYSTEM

Filed Dec. 16, 1952 35 Sheets-Sheet 3

INVENTORS:
Frank A. Morris
Robert B. Trousdale
BY
T. L. Bowes
Att'y

INVENTORS:
Frank A. Morris
Robert B. Trousdale
BY T. L. Bowes
Att'y

INVENTORS:
Frank A. Morris
Robert B. Trousdale
BY T. L. Bowes
Att'y

INVENTORS:
Frank A. Morris
Robert B. Trousdale
BY T. L. Bowes
Att'y

INVENTORS:
Frank A. Morris
Robert B. Trousdale
BY T. L. Bowes
Att'y

Jan. 12, 1960 F. A. MORRIS ET AL 2,921,137

TELEPHONE SYSTEM

Filed Dec. 16, 1952 35 Sheets-Sheet 8

INVENTORS:
Frank A. Morris
Robert B. Trousdale
BY T. L. Bowes
Att'y

INVENTORS:
Frank A. Morris
Robert B. Trousdale
BY T. L. Bowes
Att'y

INVENTORS:
Frank A. Morris
Robert B. Trousdale
BY T. L. Bowes
Att'y

INVENTORS:
Frank A. Morris
Robert B. Trousdale
BY T. L. Bowes
Att'y

Tenth Hundreds Group-14

INVENTORS:
Frank A. Morris
Robert B. Trousdale
BY T. L. Bowes
Att'y

INVENTORS
Frank A. Morris
Robert B. Trousdale
BY T. L. Bowes
Att'y

INVENTORS
Frank A. Morris
Robert B. Trousdale
BY T. L. Bowes
Att'y

INVENTORS:
Frank A. Morris
Robert B. Trousdale
BY T. L. Bowes
Att'y

INVENTORS:
Frank A. Morris
Robert B. Trousdale
BY T. L. Bowes
Att'y

INVENTORS:
Frank A. Morris
Robert B. Trousdale
BY T. L. Bowes
Att'y

Selector-120 b

INVENTORS:
Frank A. Morris
Robert B. Trousdale
BY T. L. Bowes
Att'y

INVENTORS:
Frank A. Morris
Robert B. Trousdale
BY T. L. Bowes
Att'y.

INVENTORS:
Frank A. Morris
Robert B. Trousdale
BY T. L. Bowes
Att'y

INVENTORS:
Frank A. Morris
Robert B. Trousdale
BY T. L. Bowes
Atty

INVENTORS:
Frank A. Morris
Robert B. Trousdale
BY T. L. Bowes
Att'y

INVENTORS:
Frank A. Morris
Robert B. Trousdale
BY T. L. Bowes
Att'y

INVENTORS:
Frank A. Morris
Robert B. Trousdale
BY T. L. Bowes
Att'y

Selector Forward Coupling Circuit-186

Selector Allotting Circuit-20 b

INVENTORS:
Frank A. Morris
Robert B. Trousdale
BY T. L. Bowes
Atty

Fig. 21

| | | |
|---|---|---|
| Fig. 13 | Fig. 14 | Fig. 15 |
| Fig. 16 | Fig. 17 | Fig. 18 |

Fig. 22

| | | |
|---|---|---|
| Fig. 1 | Fig. 2 | Fig. 3 |
| Fig. 4 | Fig. 5 | Fig. 6 |
| Fig. 7 | Fig. 8 | Fig. 9 |
| Fig. 10 | Fig. 11 | Fig. 12 |

Fig. 23

| | | |
|---|---|---|
| Fig. 4A | Fig. 4B | Fig. 4C |

INVENTORS:
Frank A. Morris
Robert B. Trousdale
BY T. L. Bowes
Attorney

INVENTORS
Frank A. Morris
Robert B. Trousdale
BY T. L. Bowes
Attorney

Jan. 12, 1960 F. A. MORRIS ET AL 2,921,137

TELEPHONE SYSTEM

Filed Dec. 16, 1952 35 Sheets-Sheet 28

INVENTORS
Frank A. Morris
Robert B. Trousdale
BY T. L. Bowes
Attorney

INVENTORS:
Frank A. Morris
Robert B. Trousdale
BY T. L. Bowes
Attorney

Jan. 12, 1960 F. A. MORRIS ET AL 2,921,137

TELEPHONE SYSTEM

Filed Dec. 16, 1952 35 Sheets-Sheet 30

INVENTORS:
Frank A. Morris
Robert B. Trousdale
BY
T. L. Bowes
Attorney

INVENTORS:
Frank A. Morris
Robert B. Trousdale
BY T. L. Bowes
Attorney

Jan. 12, 1960 F. A. MORRIS ET AL 2,921,137

TELEPHONE SYSTEM

Filed Dec. 16, 1952 35 Sheets-Sheet 32

INVENTORS.
Frank A. Morris
BY Robert B. Trousdale
T. L. Bowes
Attorney

TELEPHONE SYSTEM

INVENTORS:
Frank A. Morris
BY Robert B. Trousdale
T. L. Bowes
Atty

INVENTORS:
Frank A. Morris
Robert B. Trousdale
BY T. L. Bowes
Atty

Jan. 12, 1960 F. A. MORRIS ET AL 2,921,137

TELEPHONE SYSTEM

Filed Dec. 16, 1952 35 Sheets-Sheet 35

INVENTORS
Frank A. Morris
Robert B. Trousdale
BY T. L. Bowes
Atty

United States Patent Office 2,921,137

Patented Jan. 12, 1960

2,921,137

TELEPHONE SYSTEM

Frank A. Morris, Rochester, and Robert B. Trousdale, Webster, N.Y., assignors, by mesne assignments, to General Dynamics Corporation, a corporation of Delaware Application December 16, 1952, Serial No. 326,213

30 Claims. (Cl. 179—18)

The present invention relates to improved methods and apparatus for selectively setting up signal transmission connections between the lines of a signalling system, and, more particularly, to improved methods and apparatus for setting up two-way communication connections between the lines of an automatic telephone system wherein a large number of lines are serviced. Specifically, the present invention is directed to an automatic telephone system of the improved form disclosed and claimed in our co-pending application, Serial No. 134,974, filed on December 24, 1949, issued as U.S. Letters Patent No. 2,773,934, on December 11, 1956, and assigned to the same assignee as the present invention, wherein a group of one thousand lines may be serviced on a private line basis or a group of ten thousand subscribers may be serviced on a party line basis.

Many types of automatic switching apparatus have been proposed and developed for transmitting signals between the lines of telephone, telegraph and other communication systems. In the main, the apparatus proposed and developed for this purpose utilizes electromechanical devices embodying moving mechanical parts, such, for example, as relays, stepping switches and the like, to perform the line selecting, line interconnecting and ancillary functions required in selectively interconnecting any two lines of a large group of lines. While apparatus of this type and embodying switching devices of various forms has been developed to provide thoroughly reliable service, it is inherently subject to several limitations, including that of insufficient operating speed. To overcome these limitations various proposals have been made for utilizing electronic facilities, such, for example, as cathode ray tubes, for the purpose of transmitting signals between the lines of a signalling system on a selective basis.

However, most of these proposals are limited to arrangements for providing signal transmission between a relatively small number of lines, such as twenty lines, and include no provisions whatever for accommodating the large number of subscriber lines necessary to any practical, commercially acceptable system. In particular, these proposed systems are totally lacking in facilities for servicing a system of, for example, one thousand lines from the same common equipment.

Accordingly, it is an object of the present invention to provide new and improved methods and apparatus for selectively setting up two-way communication connections between any pair of lines of a signalling system which includes a large number of subscriber lines.

It is another object of the present invention to provide a new and improved automatic telephone system capable of serving one thousand private line subscribers and providing all of the services of comparable electromechanical switch-type systems, but which consists exclusively of electron conducting devices such, for example, as electron tubes, gas tubes, crystal rectifiers, semiconductors and the like, together with interconnecting circuit components therefor.

It is still another object of the present invention to provide a new and improved electronic telephone system capable of providing service for one thousand private line suoscribers and wherein a single signal path common to all of said lines is employed to transmit signals between any pair of lines of the system.

It is a further object of the present invention to provide a new and improved electronic telephone system capable of providing service for one thousand private line subscribers and wherein at least a portion of the equipment is common to all of the subscriber lines.

It is a still further object of the present invention to provide an electronic telephone system capable of providing service for one thousand subscribers on a private line basis, or ten thousand subscribers on a party line basis, and wherein at least a portion of the equipment is common to all of the subscriber substation equipment.

Another object of the present invention resides in the provision of an improved electronic telephone system capable of servicing one thousand private subscriber lines and wherein trunk hunting facilities are provided for finding an idle trunk within certain designated trunk groups of lines in the system.

Still another object of the present invention resides in the provision of an improved electronic telephone system capable of servicing one thousand private subscriber lines wherein conversation timing facilities common to all of the lines of the system are provided for timing out the call after a predetermined conversation timing interval between any pair of calling and called lines of the system.

A further object of the present invention resides in the provision of a new and improved electronic telephone system capable of servicing one thousand private subscriber lines wherein party line ringing facilities common to all of the lines of the system are provided for ringing any one of a plurality of substations associated with any one of the lines of the system on a party line basis.

A still further object of the present invention resides in the provision of a new and improved electronic telephone system which is fully automatic in operation and is adapted to serve a group of one thousand private subscriber lines and which compares favorably in first cost with electromechanical systems of the same capacity, requires a minimum of special circuit components in the construction thereof and yet is capable of providing reliable service with a minimum amount of maintenance.

The invention both as to its organization and method of operation, together with further objects and advantages thereof, will best be understood by reference to the following specification taken in connection with the accompanying drawings in which:

Figs. 1–12, inclusive, when arranged in the manner shown in Fig. 22 diagrammatically illustrate an automatic telephone system characterized by the features of the present invention;

Figs. 3A and 3B, when laid side by side in the order named diagrammatically illustrate the components of one of the finder-selector links embodied in the system shown in Figs. 1–12, inclusive;

Figs. 4A, 4B and 4C, when arranged in the manner shown in Fig. 23, diagrammatically illustrate the components of one of the acceptor-connector links embodied in the system shown in Figs. 1–12, inclusive;

Figs. 13–18, inclusive, when arranged in the manner shown in Fig. 21, illustrate schematically the details of the selector portion of one of the finder-selector links diagrammatically illustrated in Figs. 3A and 3B;

Figure 33:
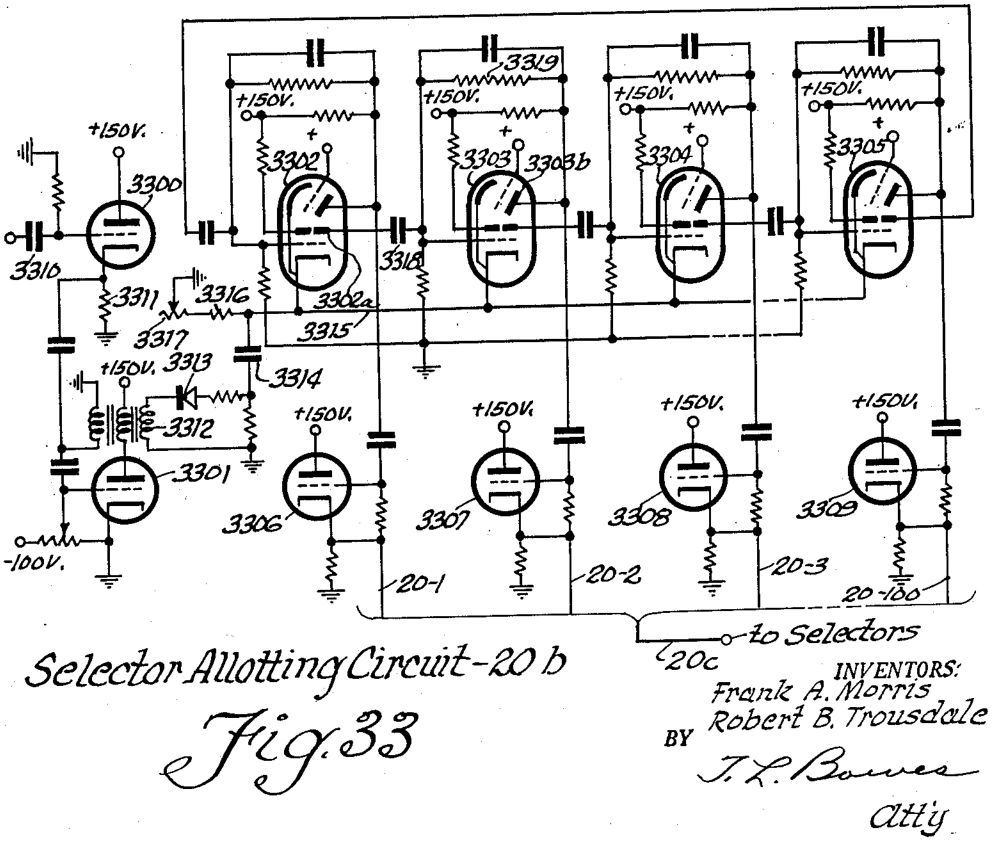
Figure 24:
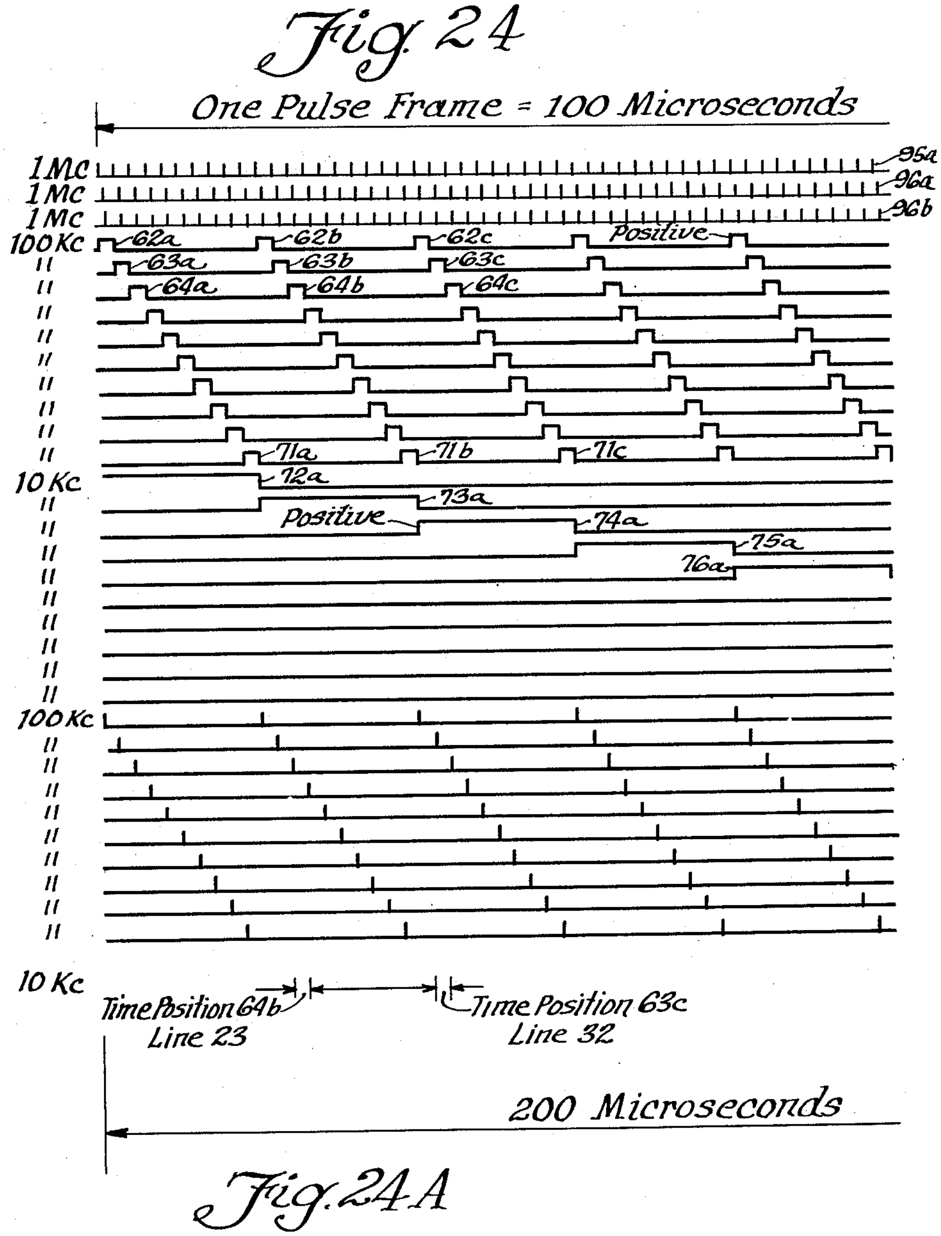
Figure 24A:
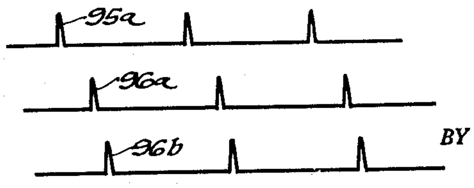
Figure 25:
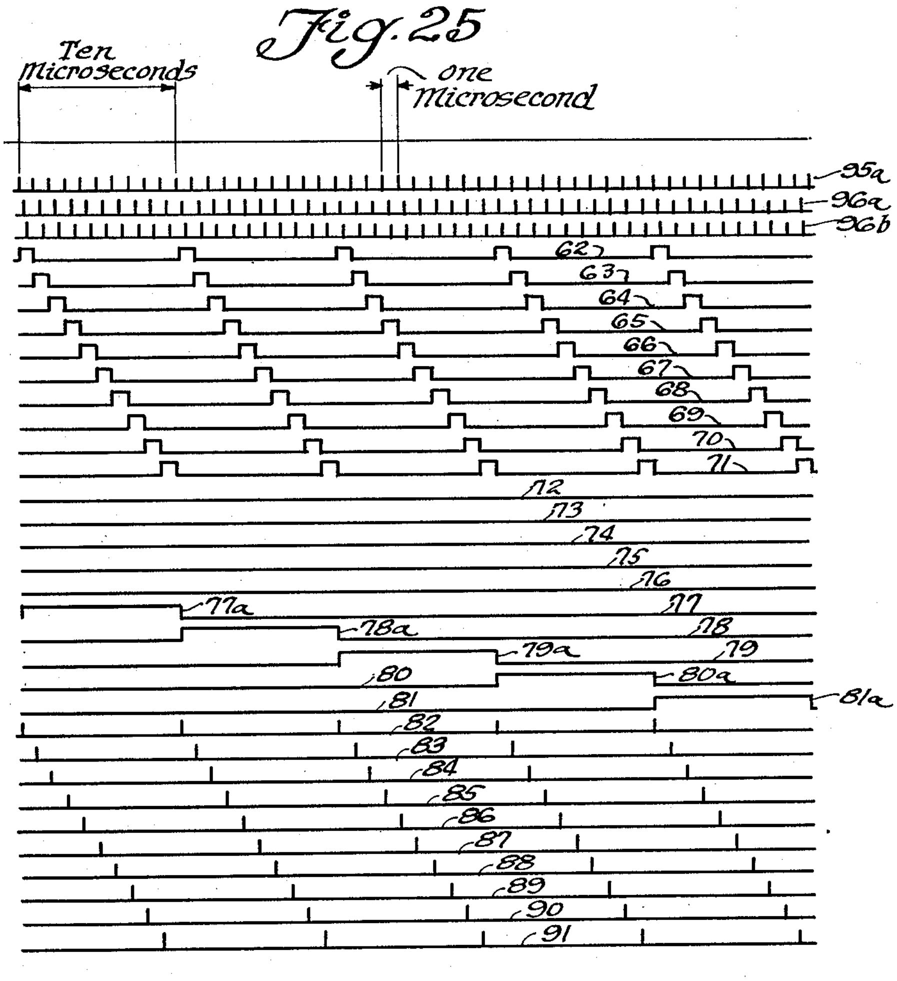
Figure 26:
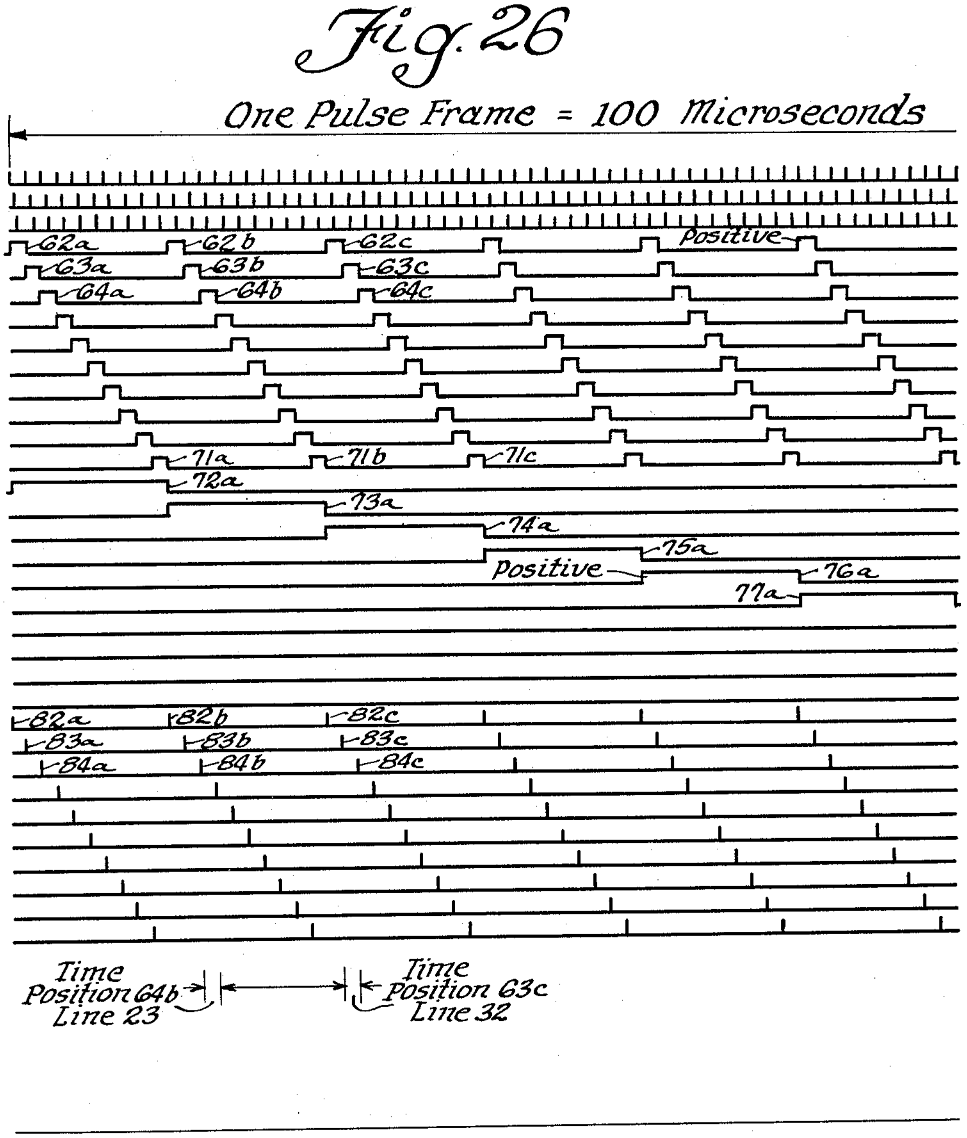
Figure 27:
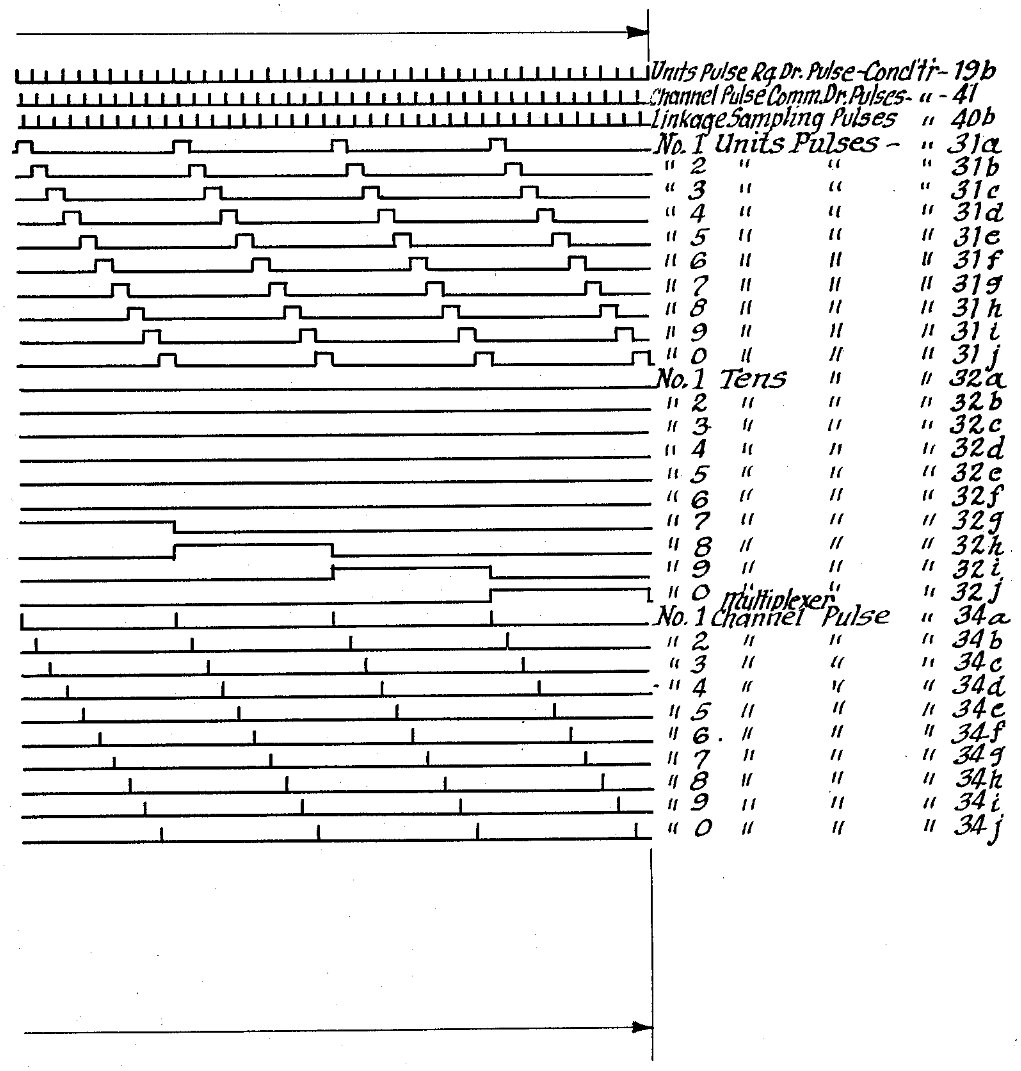
Figure 30:
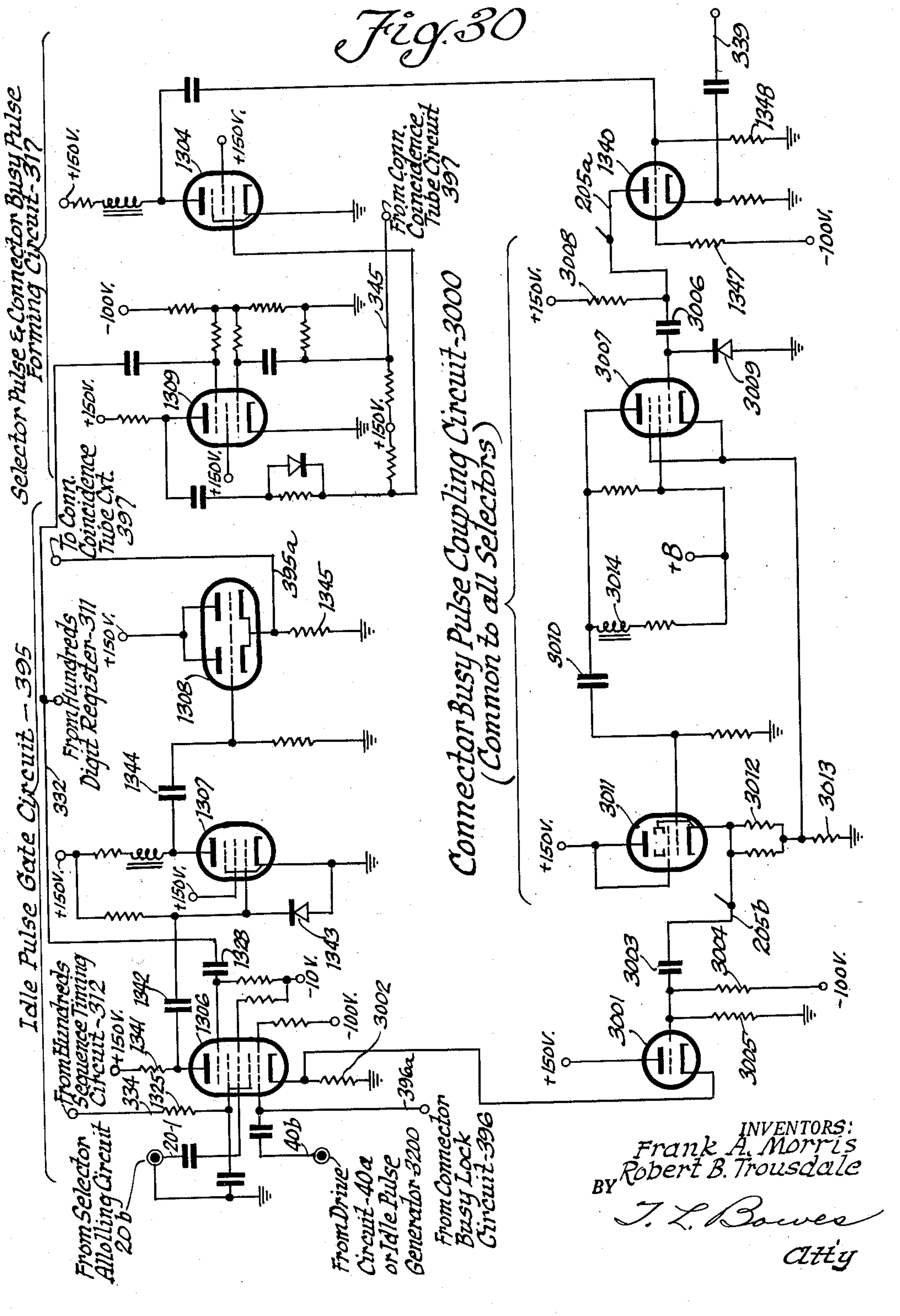
Figure 31:
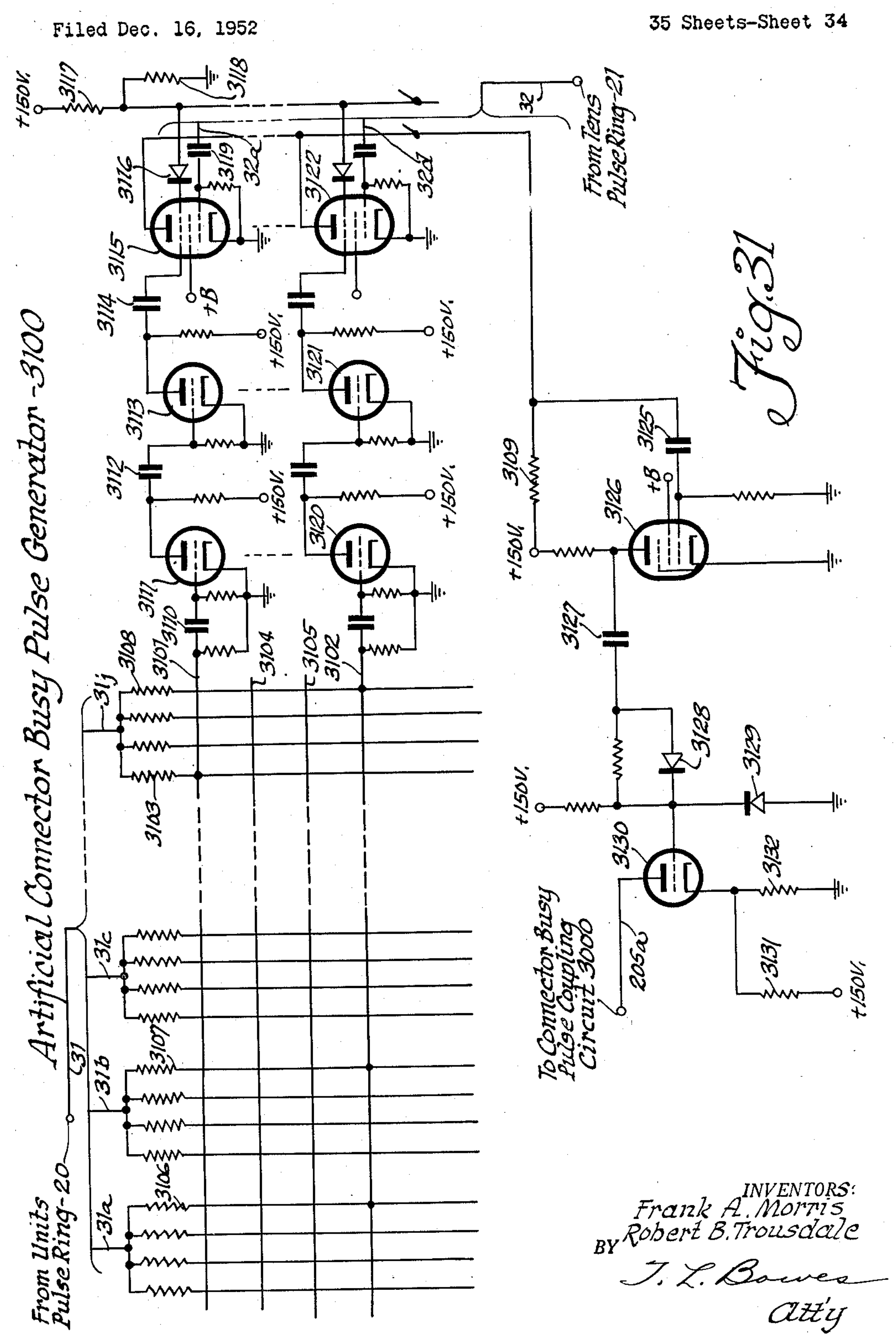
Figure 32:
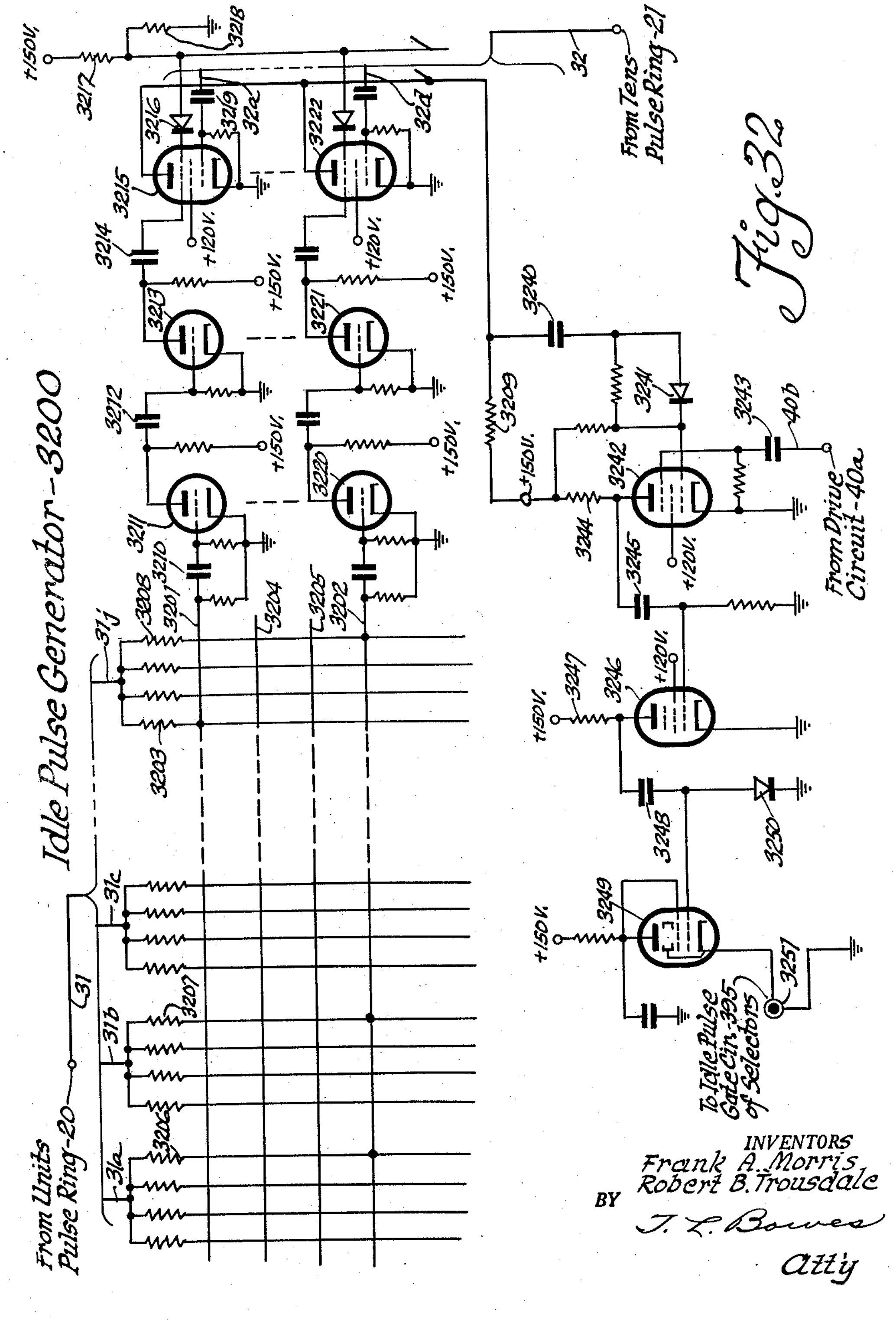

Figs. 24–29, inclusive, and Fig. 24A are graphs illustrating the operating characteristics of certain components of the system;

Figs. 30–32, inclusive, illustrate the details of an alternative embodiment of a portion of the system of the present invention; and Fig. 33 is a schematic diagram of the selector allotting circuit in the system of the present invention.

In general, the electronic telephone system herein disclosed is capable of serving one thousand lines, each of which lines may have associated therewith a number of party line substations up to a maximum of ten such party line substations for each line. More specifically, the system is capable of providing two-way communication between any two lines of a one thousand line system on either a private or party line basis and includes entirely novel facilities for performing all of the services of electromechanical switch-type systems, including such special service features as trunk hunting, conversation timing, and party line ringing. All of these functions are accomplished on a fully automatic basis without the use of any relays, steppng swtches or other mechanical devices having moving parts.

Basically, the present improved system utilizes a system of multiplexing, namely pulse sampling effectively at an ultrasonic rate of the control and intelligence signals produced on each line of the system to provide signal channel separation. Specifically, the one thousand lines of the system are divided into ten groups or levels of one hundred lines each, and the one hundred lines of each line group have individually assigned thereto different pulse time positions in repetitve time position frames each comprising one hundred pulse time positions. Thus, each pulse time position is assigned to one line in each hundreds line group.

Each line group consisting of one hundred lines is designated as a particular hundreds digit line group. Thus, the first line group of one hundred lines is designated as the first hundreds digit line group, the second line group of one hundred lines is designated as the second hundreds digit line group, the third line group of one hundred lines is designated as the third hundreds digit line group, etc. The lines of each hundreds digit line group also have collectively assigned thereto a group of ten of said time pulse positions, or trunk group positions, which identify the hundreds digit position or level of these lines in the one thousand line system.

Intelligence and control signals developed on any one line in a given hundreds digit line group are sampled only in the particular pulse time position assigned to said one line and the samples are carried through the signal transmitting components of the system as far as the hundreds group selector stage on multiplexer signal pulses occurring in this particular time position. In the hundreds group selector stage the control and intelligence signals carried by the multiplexer signal pulses are detected and either used for control purposes, such as called line hundreds group selection, or are superimposed on selector forward signal pulses occurring in an idle one of the ten time positions assigned to the hundreds line group which includes the called line, and the samples are then carried through the signal transmitting components of the system as far as the line selector, or connector stage on the selector forward signal pulses occurring in said idle time position. In the connector stage the control and intelligence signals carried by the selector forward signal pulses are detected and either used for control purposes, such as called line selection within the called line hundreds group, or are superimposed on connector signal pulses occurring in the time position assigned to the called line within the called line hundreds group for redistribution to the substations associated with the called line. The reverse process is employed in transmitting intelligence from the called substation back to the calling substation.

In order to minimize the amount of equipment used in certain operations of the system and to avoid the extremely high sampling rate which would be required if one thousand different time positions were used for the one thousand lines of the system, a decimal system of multiplexing is employed which entails arbitrary division of the lines of the system into hundreds line groups, and arbitrary division of the lines of each hundreds line group into line subgroups. More specifically, the one thousand lines of the system are divided into ten line groups of one hundred lines each which are referred to as hundreds digit line groups, and the one hundred lines of each hundreds digit line group are divided into ten subgroups of ten lines each. Since only one hundred time positions are used for the entire one thousand line system, the same time position is utilized by one line in each of the hundreds digit line groups. Tens multiplexing or gating pulses are developed at the rate of ten pulses for each pulse frame, and each tens pulses individually corresponds to a particular subgroup of ten lines within each hundreds digit line group and occurs during the time interval of each pulse frame which exactly spans the ten pulse time positions individually assigned to the lines of the particular subgroup.

A group of line selector or connector stages are permanently assigned to each of the hundreds digit line groups and each connector stage associated with a given line group has assigned thereto one of the ten pulse time positions, or trunk group positions, assigned to each hundreds line group. Thus, each pulse time position identifies one line within each hundreds line group, and also identifies one connector stage. Accordingly, the ten pulse time positions spanned by each tens pulse are individually assigned to different connector stages associated with a given hundreds line group. Since ten trunk group positions are assigned to each hundreds line group, a maximum of one hundred connector stages may be employed in the one thousand line system and each connector stage is identified by a different time position. With this system of multiplexing, transmission of multiplexer signal pulses through certain of the signal transmission components of the system is dependent upon time coincidence of these signal pulses with particular tens pulses of successive pulse frames, as well as coincidence of these pulses with particular pulse time positions within successive pulse frames. In order to provide for such features as line busying, all links busying and trunk hunting, certain facilities are associated with each hundreds digit line group, as will be described in more detail hereinafter.

GENERAL DESCRIPTION OF THE SYSTEM

Referring now to the drawings, and more particularly to Figs. 1–12, inclusive, thereof, the present fully automatic electronic telephone system is there illustrated as comprising one thousand lines which are arranged in different hundreds digit line groups of which the first, second and last hundreds digit groups are shown in the drawings. Thus, the equipment common to the one hundred lines in the first hundreds group 12 is shown in the horizontally arranged Figs. 1, 2 and 3, the equipment common to the one hundred lines in the second hundreds line group 13 is shown in the horizontally arranged Figs. 4, 5 and 6, and the equipment common to the one hundred lines in the last or tenth hundreds group 14 is shown in the horizontally arranged Figs. 7, 8 and 9. The equipment 17, which is common to the one thousand lines of the system, is shown in the horizontally arranged Figs. 10, 11 and 12.

Figure 1:
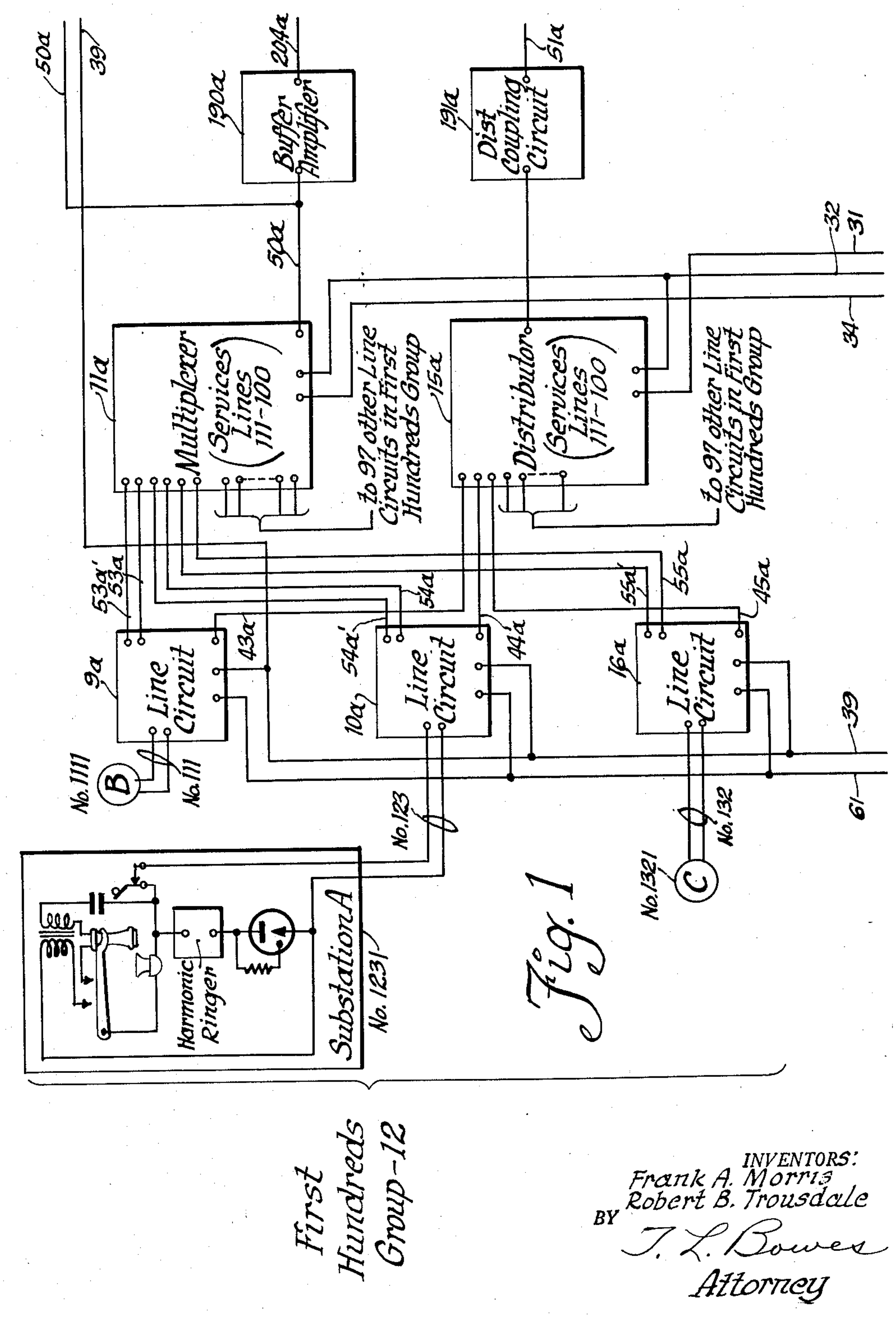
Figure 2:
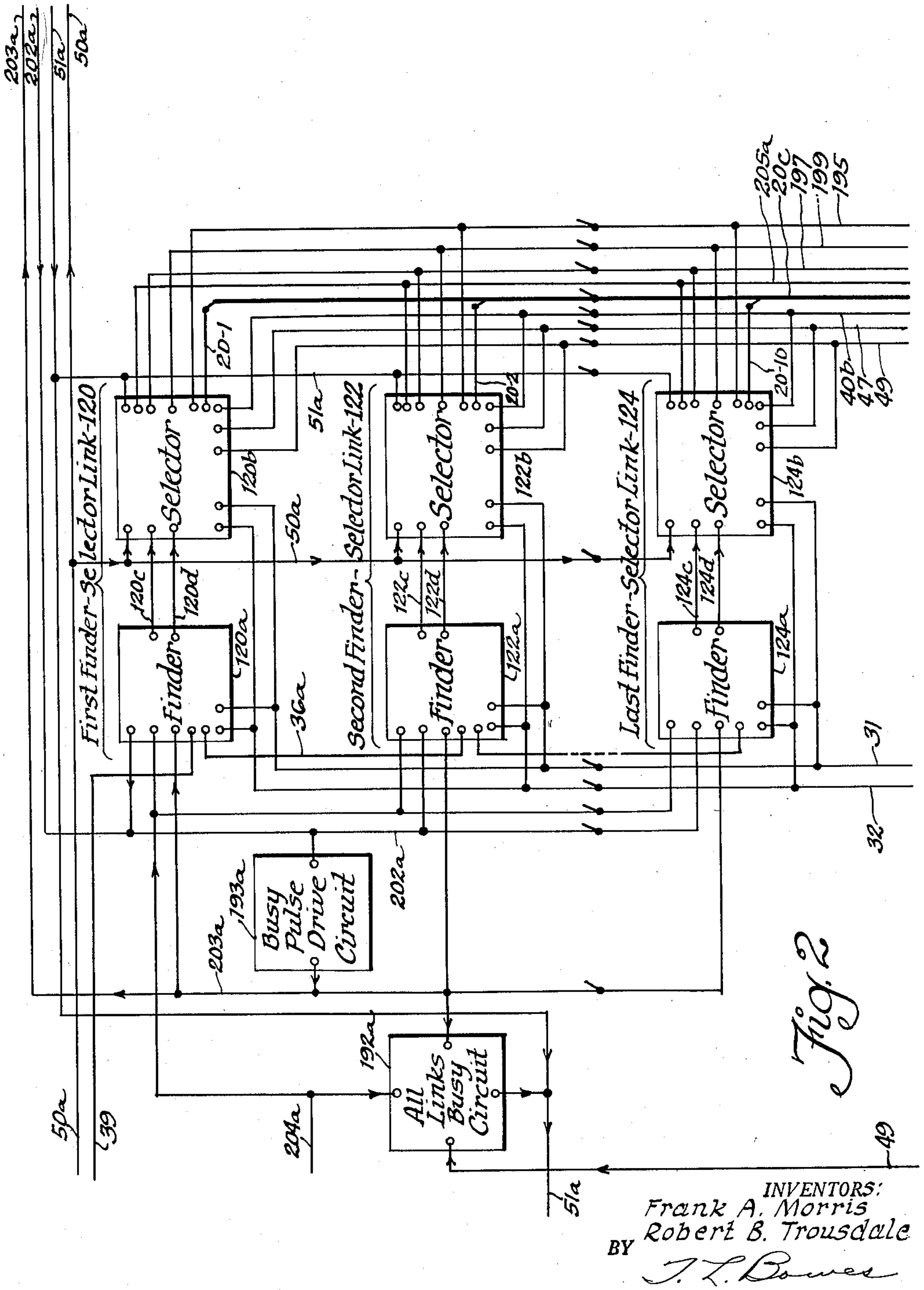

Considering first the equipment included in the first hundreds group 12, this equipment includes one hundred line circuits individual to the one hundred lines of the first hundreds line group, of which three line circuits 9a, 10a and 16a are shown in Fig. 1, a multiplexer 11a, of which only one is required for each hundreds line group, a plurality of identical finder-selector links 120, 122 and 124, a plurality of acceptor-connector links 121, 123 and 125, a distributor 15a, of which only one is required for each hundreds line group, a buffer amplifier 190a, of which only one is required for each hundreds line group, a distributor coupling circuit 191a, of which only one is required for each hundreds line group, an all links busy circuit 192a, of which only one is required for each hundreds line group, a busy pulse drive circuit 193a, of which only one is required for each hundreds line group, and a trunk marking pulse generator 194a, of which only one is required for each hundreds line group.

In general, the equipment associated with each hundreds line group is the same, and corresponding components in each line group have, in general, been given the same reference numerals and different subscripts. Thus, in the second hundreds digit line group 13 there is provided the line circuits 9b, 10b and 16b, the multiplexer 11b, a plurality of identical finder-selector links 130, 132 and 134, a plurality of identical acceptor-connector links 131, 133 and 135, a distributor 15b, a buffer amplifier 190b, a distributor coupling circuit 191b, an all links busy circuit 192b, a busy pulse drive circuit 193b, and a trunk marking pulse generator 194b. In an entirely similar manner, the remaining line groups are provided with equipment common thereto, the equipment common to the last hundreds line group 14 having assigned thereto the subscript "j."

In addition, there is provided a selector forward coupling circuit 186, of which only one is required in the one thousand line system, an idle pulse coupling circuit 187, of which only one is required in the entire system, a selector return coupling circuit 188, of which only one is required for the entire system, an acceptor drive circuit 189, of which only one is required for the entire system, and a connector busy pulse coupling circuit 205, which is also common to all of the lines of the system.

Each of the finder-selector links comprises a finder and a selector. Thus, in the first hundreds group 12, the first finder-selector link 120 comprises the finder 120a and the selector 120b, the second finder-selector link 122 comprises the finder 122a and the selector 122b, and the last finder-selector link 124 comprises the finder 124a and the selector 124b.

Each of the acceptor-connector links comprises an acceptor and a connector. Thus, in the first hundreds group 12, the first acceptor-connector link 121 comprises the acceptor 121a and the connector 121b, the second acceptor-connector link 123 comprises the acceptor 123a and the connector 123b, etc. It will be understood that the number of finder-selector links and the number of acceptor-connector links employed in the system may be chosen as required to handle the necessary traffic. Although only three links have been illustrated in each hundreds line group, from seven to ten links will normally be required in actual practice to handle the traffic of a one thousand line exchange. Inclusion of the additional links in the system may readily be accomplished by connecting appropriate terminals of additional links to the indicated multiple points between the second and last links in each hundreds line group.

As shown, the line circuits respectively terminate different two-conductor lines included within the designated hundreds line group. Thus, the line circuits 9a, 10a and 16a, respectively, terminate three two-conductor lines No. 111, No. 123 and No. 132 within the first hundreds line group which includes the lines Nos. 111–100, inclusive. In a similar manner, the line circuits 9b, 10b and 16b, respectively, terminate the three two-conductor lines No. 211, No. 223 and No. 232 within the second hundreds group 13, and the line circuits 9j, 10j and 16j, respectively, terminate the three two-conductor lines No. 011, No. 023 and No. 032 within the tenth hundreds group 14.

The lines of the system may be used for either private or party line service. In the illustrated embodiment all of the lines, except the line 232, are shown as private lines, and, accordingly, extend only to a single substation having a directory number designation corresponding to the associated line plus a party line ringing digit "1." Thus, in the illustrated embodiment the line 123, which is shown as a private line, extends to the substation A which has assigned thereto the directory number designation No. 1231. On the other hand, the line 232, in the second hundreds group 13, is illustrated as a party line and extends to a plurality of parallel connected substations F, G and H, having respectively assigned thereto the directory number designations No. 2321, No. 2322 and No. 2323. In this connection, it will be understood that any one line, such as the line 232, may have associated therewith a maximum of ten substations such as the substations F, G and H. In the illustrated embodiment, reference will be made to a call placed from the substation A associated with the line 123 and intended for the substation G connected to the line 232, and having assigned thereto the directory number designation No. 2322.

Each line circuit performs the function of repeating intelligence or control signals from its associated substation or substations to a corresponding one of the gate circuits in the multiplexer which serves the corresponding hundreds line group. Also, each line circuit performs the function of repeating intelligence signals derived from a particular gate circuit of the corresponding hundreds line group distributor to its associated substation or substations and of responding to ringing control signals derived from one of the connectors assigned to the same hundreds line group on a call incoming thereto. Thus, the line circuit 10a, for example, performs the functions of repeating intelligence or control signals from its associated substation A to a corresponding one of the gate circuits in the multiplexer 11a, repeating intelligence signals derived from a particular gate circuit of the distributor 15a to its associated substation A, and of responding to ringing control signals derived from one of the connectors 121b, 123b and 125b in the hundreds group 12 by transmitting ringing current to the substation A on a call incoming thereto.

To perform these functions the line circuit 10a is connected by way of the conductors 54a and 54a' to one of the gate circuits provided in the multiplexer 11a and is connected by way of the conductor 44a to one of the gate circuits provided in the distributor 15a. The line circuit 10a is also connected to certain components of the common equipment 17 in the manner described below. The line circuit 9a is connected by way of the conductors 53a and 53a' to the multiplexer 11a and by way of the conductor 43a to one of the gate circuits in the distributor 15a, and this line circuit is also connected to the common equipment 17. The line circuit 16a is likewise connected to the multiplexer 11a over the illustrated conductors 55a and 55a' and over the conductor 45a to the distributor 15a. The other ninety-seven line circuits of the first hundreds group 12 of the system are likewise connected on an individual basis to corresponding gate circuits of the multiplexer 11a and the distributor 15a and on a common basis to certain components of the common equipment 17.

Generally speaking, the multiplexers 11a, 11b–11j, inclusive, perform the functions of sampling the intelligence and control signals derived from the one hundred line circuits individually associated therewith only in the pulse time positions of each pulse frame individually assigned to the lines served by these line circuits, and of modulating the sampled intelligence or control signals on multiplexer signal pulses occurring in these pulse time positions for transmission to the finders, selectors and connectors of the linkage in the same hundreds line group.

Thus, the output terminals of the multiplexer **11*a* are connected by way of the common conductor 50*a* to the multiplexer input terminals of each of the selectors 120*b*, 122*b* and 124*b*, to the multiplexer input terminals of each of the connectors 121*b*, 123*b* and 125*b*, and also by way of the buffer amplifier 190*a* and over the conductor 204*a* to each of the finders 120*a*, 122*a* and 124*a*. The output from the multiplexer 11*a* is also connected by way of the buffer amplifier 190*a* and the conductor 204*a* to the all links busy circuit 192*a*. Similarly, in the second hundreds group 13 the common output channel of the multiplexer 11*b* is connected by way of the common conductor 50*b* to each of the selectors 130*b*, 132*b* and 134*b*, to each of the connectors 131*b*, 133*b* and 135*b*, and through the buffer amplifier 190*b* to the finders 130*a*, 132*a* and 134*a*, and the all links busy circuit 192*b***.

In reverse manner the distributors **15*a*, 15*b*–15*j*, inclusive, individually perform the function of repeating intelligence signals derived from the connectors in the associated hundreds line group in the pulse time positions corresponding to particular calling and called lines to the line circuits respectively terminating these lines. Thus, the input terminals of the distributor 15*a* are connected by way of the distributor coupling circuit 191*a* and the common conductor 51*a* to the output terminals of each of the connectors 121*b*, 123*b* and 125*b*, and the output terminals of each of the selectors 120*b*, 122*b* and 124*b*. Similarly, the input terminals of the distributor 15*b*, in the second hundreds group 13, are connected by way of the distributor coupling circuit 191*b* and the conductor 51*b* to the output terminals of each of the connectors 131*b*, 133*b* and 135*b*, and the output terminals of each of the selectors 130*b*, 132*b* and 134*b*. In performing the described functions, the multiplexers 11*a*, 11*b*–11*j*, inclusive, and the distributors 15*a*, 15*b*–15*j*, inclusive, are controlled by certain components of the common equipment 17** in the manner hereinafter explained.

The finders of the various finder-selector links, such, for example, as the finder **120*a*, do not perform any intelligence transmission functions. On the contrary, they function strictly as control units. Specifically, the finder 120*a* performs the function of determining when the finder-selector link 120 shall be taken into use, determining the calling line within the hundreds group 12 with which the link 120 is to be associated in handling a call, and determining the particular pulse time position of successive pulse frames which is assigned to the calling line and during which signal bearing pulses derived from the multiplexer 11*a* shall be effective to produce a response in the finder and in the associated hundreds line group selector 120*b*. To advise the associated selector of the pulse time position assigned to the calling line, the finder 120*a* transmits finder gate pulses to the selector 120*b* in this pulse time position over the conductor 120*d*. The finder 120*a* also performs the function of conditioning its associated selector 120*b* for operation when the link 120 is definitely associated with a calling line to handle a call initiated on the line. This is accomplished through operation of the finder 120*a* to impress operating potential upon a plurality of the tubes in the selector 120*b* over the +B switch conductor 120*c*. When operatively associated with a particular calling line, the finder 120*a* also performs the function of guarding the calling line against intrusion on an incoming call to the line. This is accomplished through operation of the finder 120*a* to feed busy pulses occurring in the pulse time position assigned to the calling line with which the finder is operatively associated over the common busy pulse out conductor 202*a* to the busy pulse drive circuit 193*a* associated with the first hundreds group 12. From the busy pulse drive circuit 193*a* the busy pulses are fed over the common busy pulse in conductor 203*a* to each of the finders 120*a*, 122*a* and 124*a* in the first hundreds group 12, to each of the connectors 121*b*, 123*b* and 125*b* in the first hundreds group 12, and to the all links busy circuit 122*a* in the first hundreds group 12. The finder 120*a* further performs the function of supplying an allotting signal over the conductor 36*a* to the finder 122*a* of the next succeeding link 122 in the hundreds group 12 when the finder 120*a*** is taken into use so as to provide a self-allotting system for the finder-selector links in each hundreds group of the system.

Figure 3:
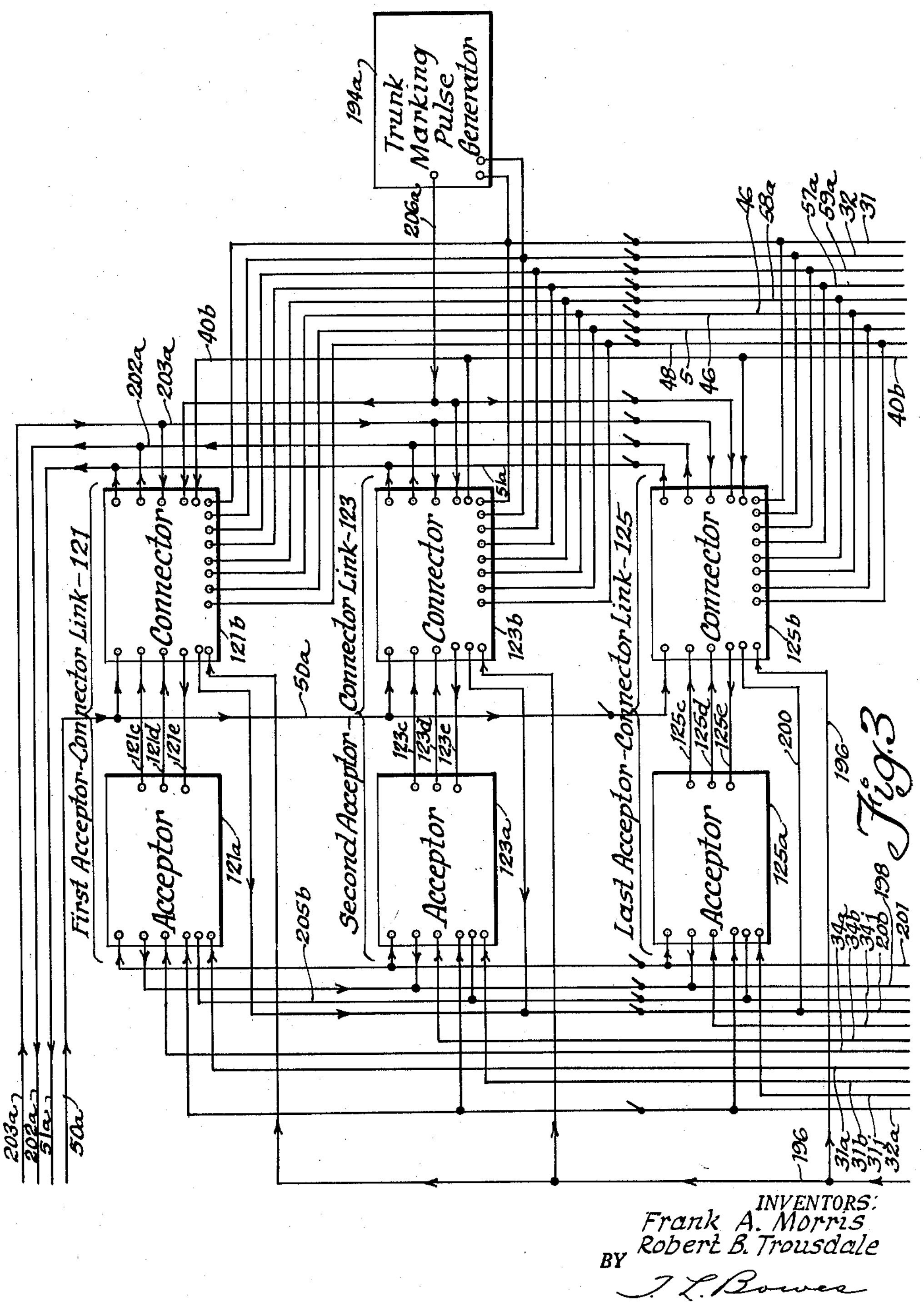
Figure 3A:
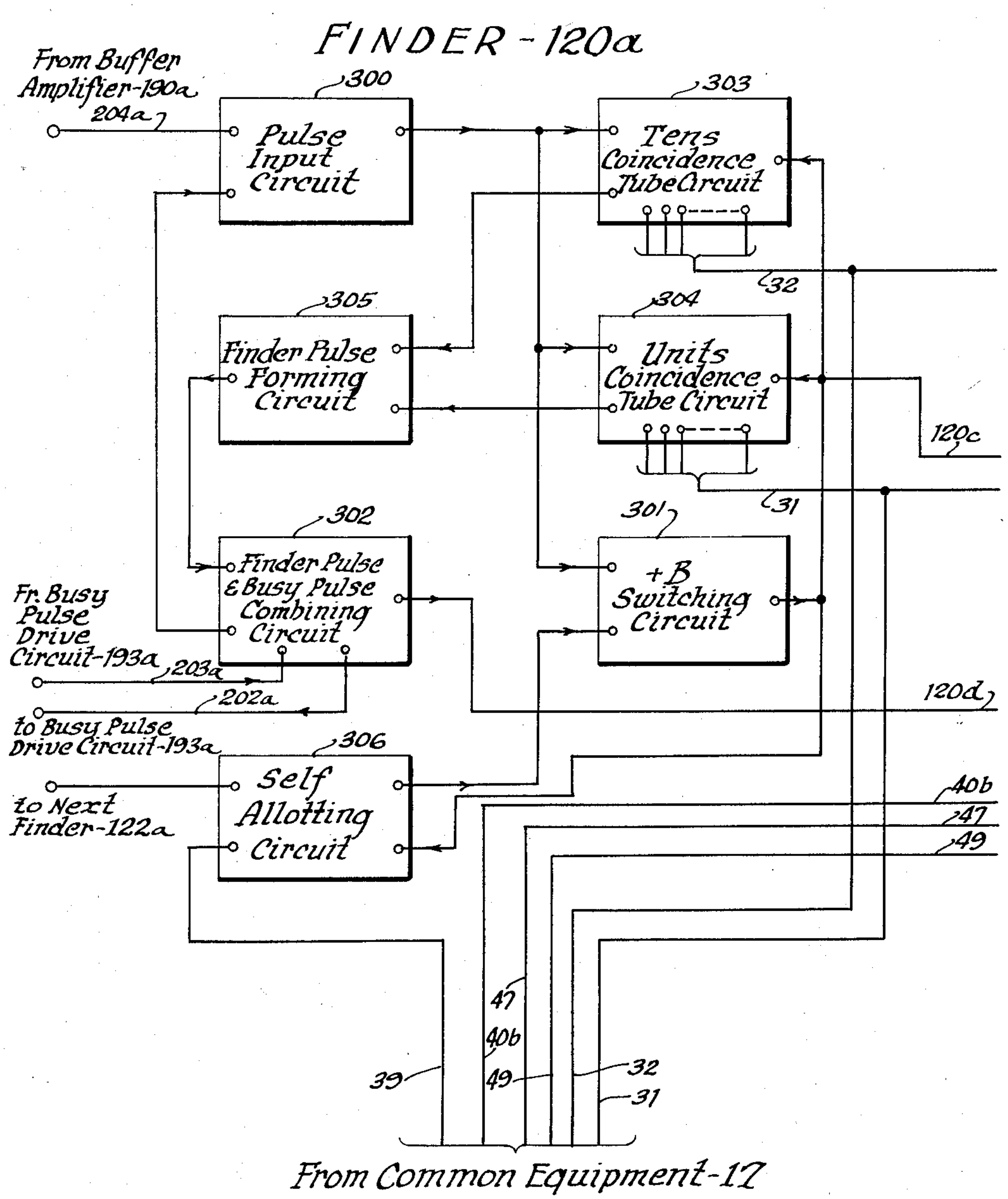

To perform the above functions in the manner fully explained below, the finder **120*a* comprises (see Fig. 3A) a pulse input circuit 300, a +B switching circuit 301, a pulse combining circuit 302, tens and units coincidence tube circuits 303 and 304, a finder pulse forming circuit 305, and a self-allotting circuit 306. It will be noted that the finder 120*a* and the selector 120*b* are connected on an individual link basis by only two conductors, namely, the +B switch conductor 120*c* and the finder gate conductor 120*d*. The finder 122*a* and the selector 122*b* are similarly connected on an individual link basis by means of the finder gate and +B switch conductors 122*c* and 122*d* which respectively correspond to the conductors 120*c* and 120*d* of the link 120**.

Each of the selectors in each hundreds line group performs a plurality of different functions. Thus, the selector **120*b*, for example, is controlled by finder gate pulses delivered thereto over the conductor 120*d* to accept and respond to signal bearing multiplexer pulses occurring in the pulse time position assigned to the calling line with which the finder-selector link 120 is operatively associated. The selector 120*b* also responds to the application of operating potential to the conductor 120*c* and to the finder gate pulses appearing on the conductor 120*d* by feeding a dial tone signal to the distributor 15*a* on selector signal pulses occurring in the pulse time position assigned to the calling line with which the selector 120*b*** is operatively associated thereby to return a dial tone signal to the calling subscriber.

The selector **120*b* responds to dial impulses which constitute the first, or hundreds digit of the called line and originate at the calling line with which the link 120 is operatively associated, by selecting the particular hundreds digit line group containing the called line. After selection of the particular hundreds digit line group which contains the called line, the selector 120*b* then selects the pulse time position assigned to an idle one of the connectors associated with the called hundreds line group and transmits selector forward signal pulses in the time position assigned to the selected idle connector over the common selector forward conductor 195, through the selector forward coupling circuit 186, and over the common conductor 196 to all of the connectors of the system. Incident to the selection of this time position, the selector 120*b* conditions itself to accept selector return pulses which are impressed upon the selector return conductor 199 from the selector return coupling circuit 188 and occur in the pulse time position assigned to the selected idle connector, to store the intelligence carried by these selector return pulses, and to transmit the stored intelligence to the distributor 15*a* on selector signal pulses occurring in the pulse time position assigned to the calling line with which the link 120** is operatively associated. In effect, therefore, the selector functions to shift signal carrying pulses from the pulse time position assigned to the calling line with which it is operatively associated to the pulse time position assigned to an idle connector in the hundreds line group, containing the called line, and also to shift selector return signal pulses carrying intelligence derived from the called line by way of its associated connector from the particular pulse time position assigned to this connector to the particular pulse time position corresponding to the calling line.

In addition, the selector **120*b* performs the auxiliary functions of terminating dial tone transmission to the calling substation when the first line selecting impulse therefrom is dialed into the selector, feeding connector busy pulses to the selected acceptor-connector link in the time position assigned thereto to inform this link that it has been selected, and transmitting busy tone carrying selector signal pulses to the distributor 15***a* in the pulse time position assigned to the calling line in the event there are no idle connectors in the called hundreds line group. The selector 120*b* is also arranged to release in response to the release of a connection involving the link 120 at the calling substation.

Figure 3B:
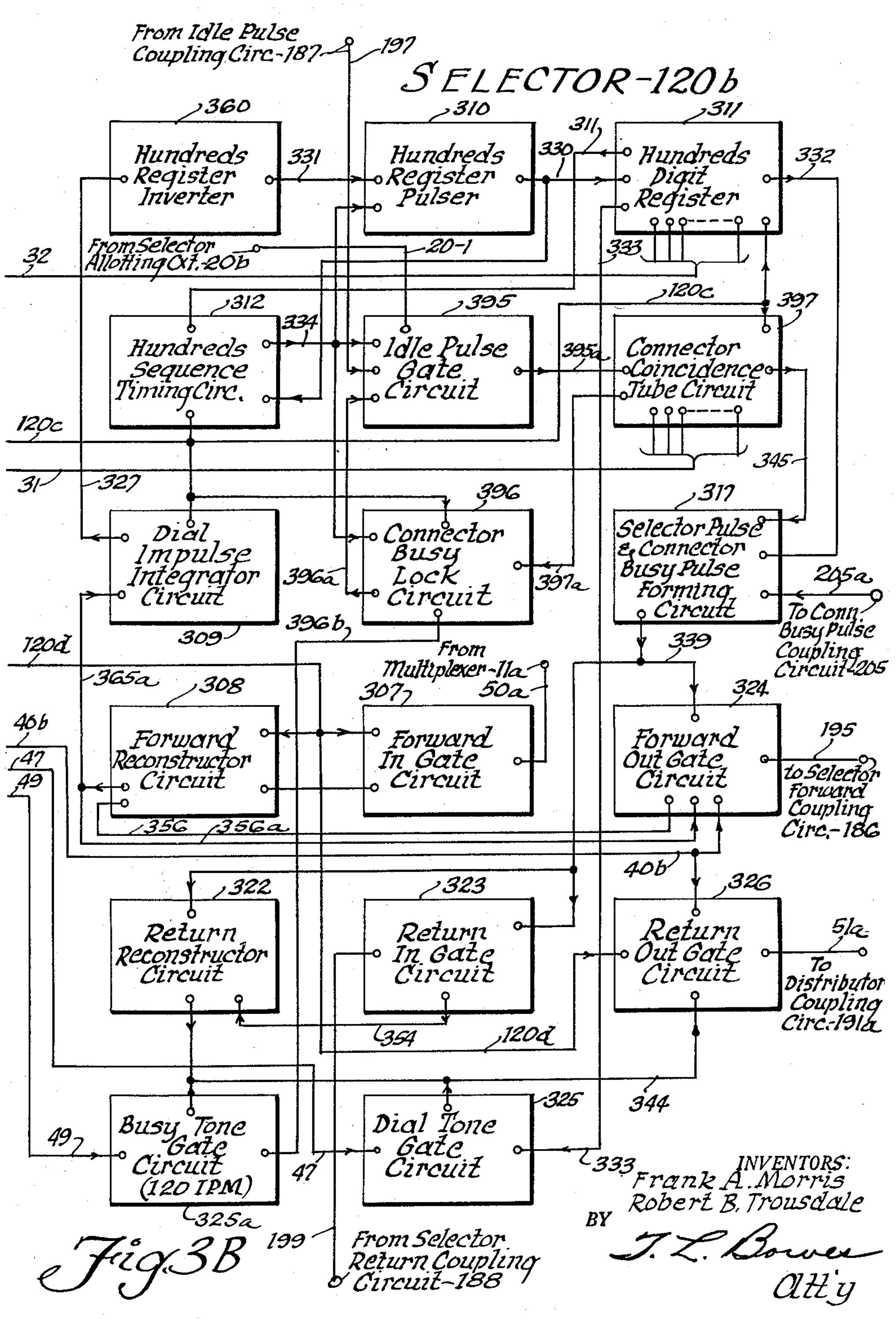

To perform the above-mentioned functions in the manner fully explained below, the selector 120*b*, as diagrammatically illustrated in Fig. 3B and as shown in detail in Figs. 13, 14, 15, 16, 17 and 18, is provided with a forward in gate circuit 307 which responds to finder gate pulses transmitted to the selector over the conductor 120*d* to repeat signal bearing pulses delivered thereto from the multiplexer 11*a* in the pulse time position assigned to the calling line, and a forward reconstructor circuit 308 having the function of detecting or reconstructing and storing the intelligence carried by signal bearing pulses transmitted to the selector from the multiplexer 11*a* in the pulse time position assigned to the calling line. The selector 120*b* further comprises a forward out gate circuit 324 for gating to the selector forward coupling circuit 186 selector forward signal pulses which occur in the time position assigned to the selected connector in the called hundreds line group and carry the intelligence and supervisory signals reconstructed by the circuit 308. In addition, the selector 120*b* includes a return in gate circuit 323 for repeating selector return signal pulses in the pulse time position assigned to the selected connector which bear intelligence or control signals derived from the called line, a return reconstructor circuit 322 for detecting or reconstructing the intelligence or control signals gated by the return in gate circuit 323, and a return out gate circuit 326 which is controlled in accordance with the detected signals stored in the circuit 322 and by the finder gate pulses delivered to the selector 120*b* over the conductor 120*d* to gate to the distributor 15*a* by way of the distributor coupling circuit 191*a* signal bearing selector pulses which occur in the pulse time position assigned to the calling line. More generally, the three circuits 307, 308 and 324 function to repeat intelligence and supervisory signals from the calling line to the selected connector, whereas the three corresponding circuits 323, 322 and 326 function to repeat to the calling line intelligence and control signals derived from the called line by way of the selected connector.

The selector 120*b* additionally comprises a plurality of components for responding to the first digit of dial impulses repeated to the selector on multiplexer pulses occurring in the pulse time position assigned to the calling line, this first digit corresponding to the hundreds line group which contains the called line. In general, the dial pulse responsive equipment of the selector 120*b* comprises a dial impulse integrator circuit 309 which receives dial impulses from the reconstructor circuit 308, a hundreds register inverter 360 to which pulses are repeated by the dial impulse integrator circuit 309, a hundreds register pulser 310 which serves to drive the hundreds digit register 311, and a hundreds sequence timing circuit 312 which functions to initiate certain operations at the end of the first digit dialed into the selector.

The selector 120*b* further comprises an idle pulse gate circuit 395 which is controlled in accordance with the selector alotting circuit 20*b* and the setting imparted to the hundreds digit register 311 at the end of the first digit to select only those idle pulses which identify idle connectors in the called hundreds line group and to supply the selected idle pulses over the conductor 395*a* to the idle connector coincidence tube circuit 397. The coincidence tube circuit 397 operates to select at random one of these selected idle pulses which represents an idle connector in the called hundreds line group. The selector 120*b* also comprises a selector pulse and connector busy pulse forming circuit 317 which is controlled in accordance with the setting imparted to the hundreds digit register 311 at the end of the first digit and the idle pulse selected by the coincidence tube circuit 397 to produce selector pulses which are employed to control the circuits 322, 323 and 324 in the transmission of intelligence and control signal information from the selector 120*b* to the selected connector in the pulse time position assigned thereto. The circuit 317 also develops connector busy pulses which are transmitted over the conductor 205*a*, through the coupling circuit 205 and over the conductor 205*b* to the selected acceptor-connector link to inform this link of seizure by the selector 120*b*. The connector busy lock circuit 396 in the selector 120*b* is controlled jointly by the hundreds sequence timing circuit 312 and the idle connector coincidence tube circuit 397 to lock up the selector 120*b* at the end of a connector busy test interval of predetermined duration in the event that no idle connectors are found in the called hundreds line group. The selector 120*b* also includes the busy tone gate 325*a* and the dial tone gate 325 which have the function of gating busy and dial tones to the calling line under the conditions described generally above. Like the finders, the acceptors of the various links, such as the acceptor 131*a*, in the second hundreds group 13, do not perform any intelligence transmission functions but on the contrary function strictly as control units. Thus, the acceptor 131*a* performs the function of establishing a particular pulse time position within each pulse frame which identifies the acceptor-connector link 131 as serving the lines in a particular hundreds line group, i.e., the hundreds group 13, and also distinguishes the link 131 from the other links 133, 135, etc. which also serve the same hundreds line group 13, and of generating idle pulses in this established pulse time position for the use of selectors in selecting an idle connector within the called hundreds line group. To advise all of the selectors of the system of the pulse time position assigned to the associated connector and the idle or busy condition thereof, the acceptor 131*a* transmits these idle pulses over the conductor 198, through the idle pulse coupling circuit 187, and over the conductor 197 to all of the selectors of the system during periods when the associated connector is idle.

The acceptor 131*a* also performs the function of conditioning its associated connector 131*b* for operating when the link 131 is definitely associated with a call forwarding selector to handle a call initiated on the calling line associated therewith. This is accomplished through operating of the acceptor 131*a* to impress operating potential upon a plurality of the tubes in the connector 131*b* over the +B switch conductor 131*c*. Also, to advise the connector 131*b* of the pulse time position which is permanently assigned thereto, the acceptor 131*a* transmits acceptor gate pulses to the associated connector 131*b* in this pulse time position over the conductor 131*d*. When operatively associated with a particular call forwarding selector, the acceptor 131*a* responds to connector busy pulses transmitted thereto from the call forwarding selector by way of the connector busy pulse coupling circuit 205 by removing these idle pulses from the common idle pulse out conductor 198, thereby guarding the associated connector 131*b* against intrusion on an incoming call to the hundreds group 13.

To perform the above functions in the manner fully explained below, the acceptor 131*a* comprises (see Figs. 4A and 19) an acceptor control gate circuit 400, a +B switching circuit 401, an acceptor gate pulse forming circuit 402, and an idle pulse circuit 410.

Each of the connectors in each hundreds digit line group performs a plurality of different functions. Thus, the connector 131*b* in the second hundreds group 13, for example, is controlled by the acceptor gate pulses delivered thereto over the conductor 131*d* from the acceptor 131*a* to accept and respond to signal bearing selector forward pulses occurring in the same time position, i.e., the time position assigned to the acceptor-connector link 131. The connector 131b, which in the illustrated embodiment is adapted for party line ringing, also responds to dial impulses during a second or tens digit, a third or units digit, anda fourth or party line ringing digit, which originate at the calling line with which the call forwarding selector is operatively associated, to select the particular pulse time position assigned to the called line within the called hundreds line group, and the particular party line ringing signal assigned to the called substation associated with the called line. Incident to the selection of the time position assigned to the called line, the connector 131b conditions itself to accept signal carrying pulses from the multiplexer 11b which occur in the time position corresponding to the selected called line within the second hundreds group 13, to store the intelligence carried by these pulses, and to transmit the stored intelligence to the call forwarding selector on selector return signal pulses occurring in the pulse time position assigned to the connector 131b. In effect, therefore, the connector functions to shift selector forward signal carrying pulses transmitted thereto by the call forwarding selector from the pulse time position assigned to the connector to the pulse time position assigned to the called line within the called hundreds line group and to shift multiplexer signal pulses carrying intelligence derived from the called line from the pulse time position assigned to the called line to the pulse time position assigned to the connector.

In addition, the connector 131b performs the auxiliary functions of feeding busy pulses occurring in the pulse time position assigned to the called line within the hundreds group 13 over the common busy pulse out conductor 202b in this hundreds group 13 to the busy pulse drive circuit 193b, and from the circuit 193b over the common busy pulse in conductor 203b to the other links in the hundreds group 13 thereby to guard the called line against seizure through another link in the second hundreds group 13; testing the pulse time position assigned to the called line to determine the idle or busy condition of that line; transmitting busy tone carrying selector return signal pulses to the call forwarding selector in the pulse time position assigned to the connector 131b in the event the called line tests busy, to inform the calling subscriber of this condition; transmitting a party line ringing signal in accordance with the identity of the called substation association with the called line to the line circuit terminating the called line in the event the called line tests idle; concurrently transmitting selector return signal pulses which are modulated with a corresponding ringback tone signal to the call forwarding selector in the pulse time position assigned to the connector 131b, to inform the calling subscriber that the called line is being rung; and terminating the party line ringing signal and concurrently terminating ringback tone signal modulation in response to answering of the call at the called party line substation. The connector 131b also transmits an extinguishing pulse over the conductor 131e to the acceptor 131a at the end of a conversation timing interval to cause the link 131 to release independently of the calling and called subscribers. The connector 131b is also arranged to release in response to the release of a connection involving the link 131 at the called substation.

Figure 4:
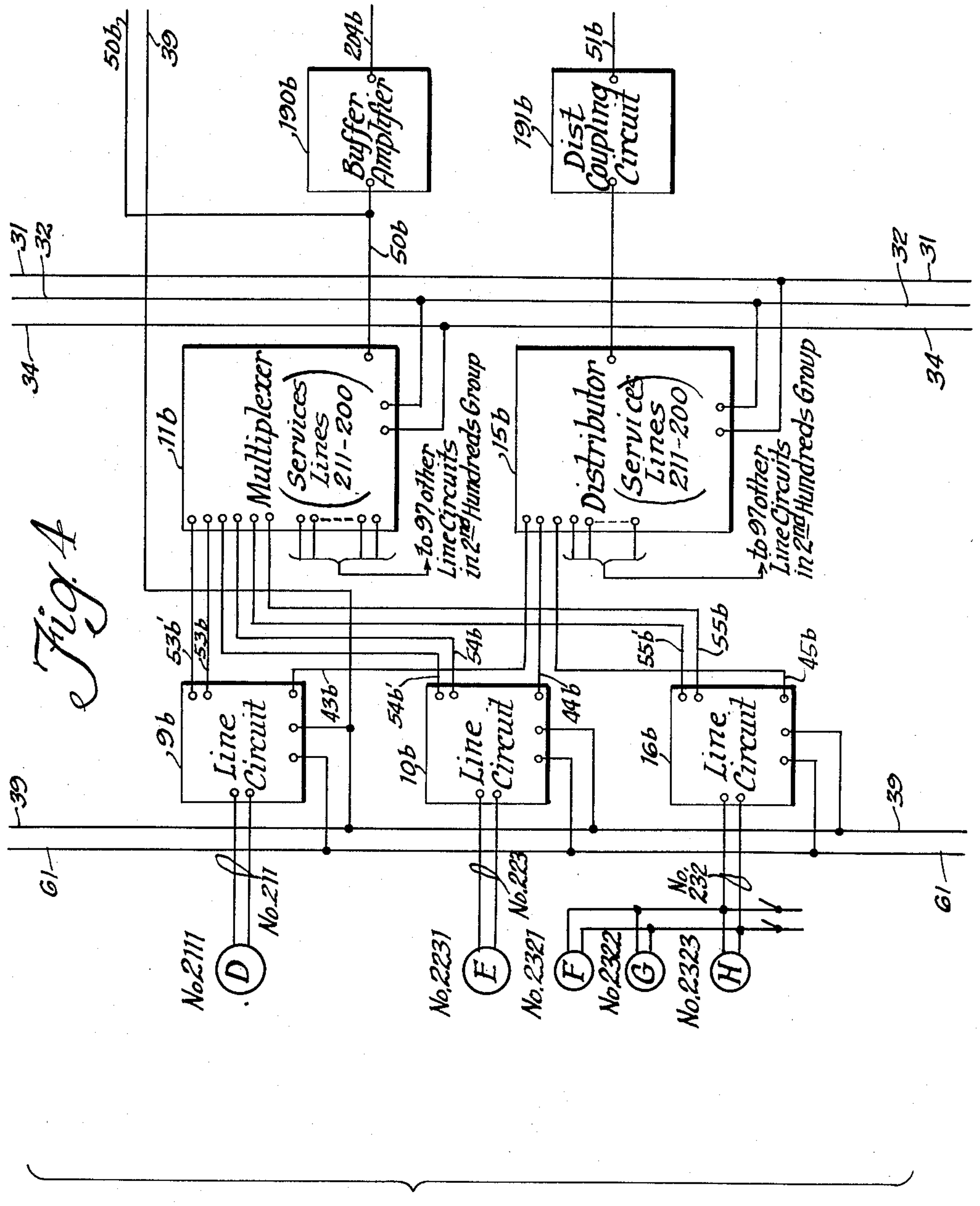
Figure 4A:
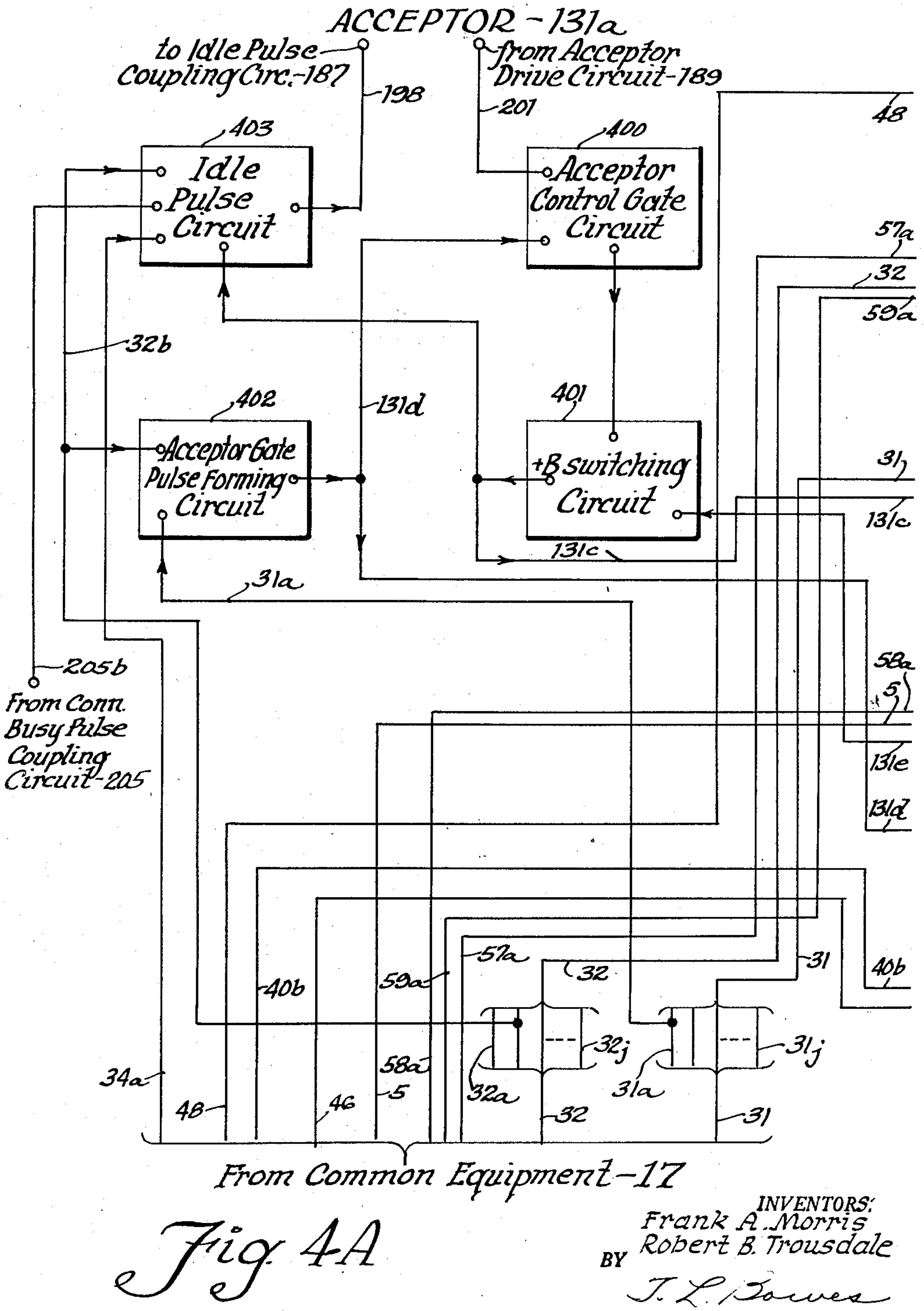
Figure 4B:
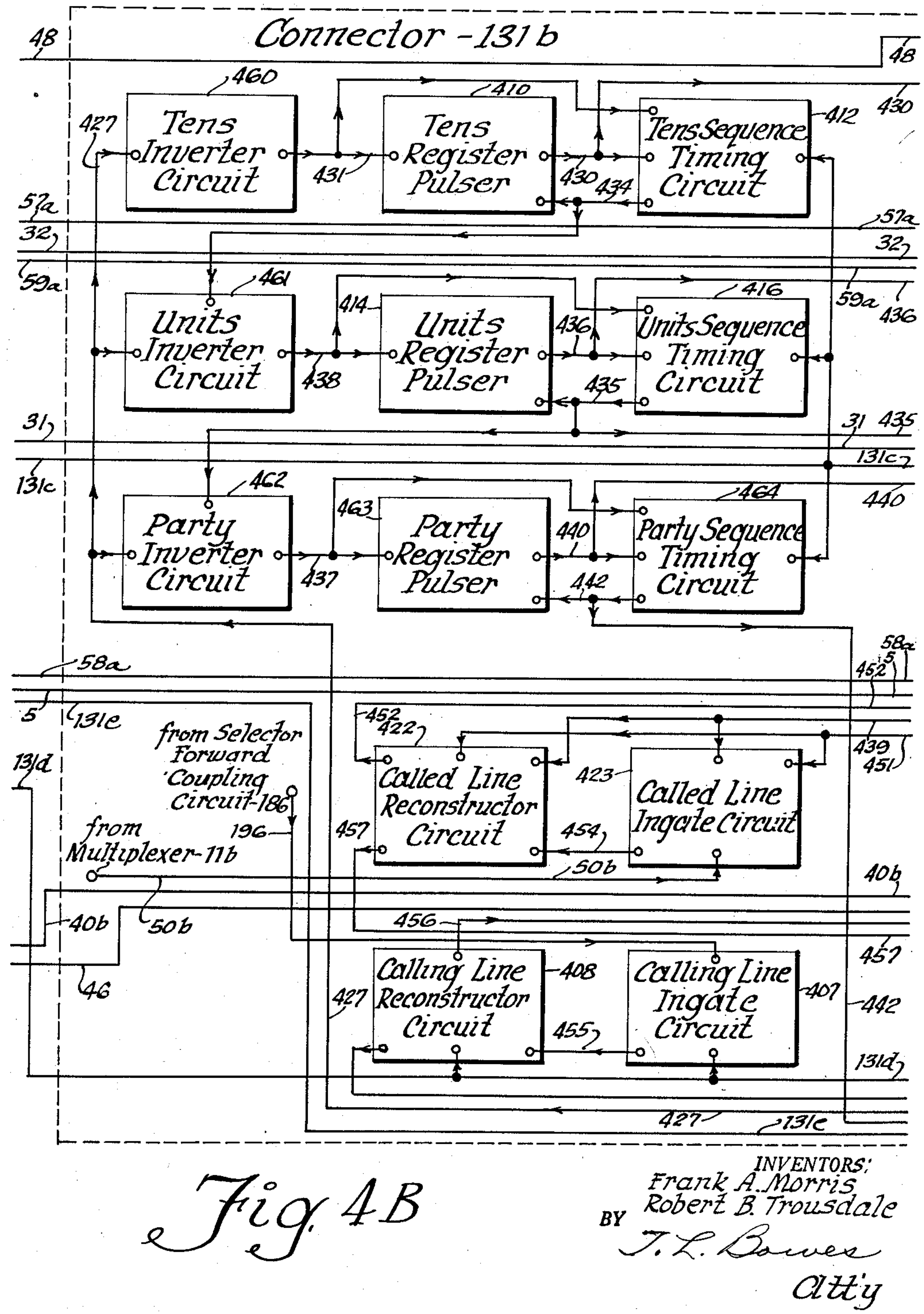
Figure 4C:
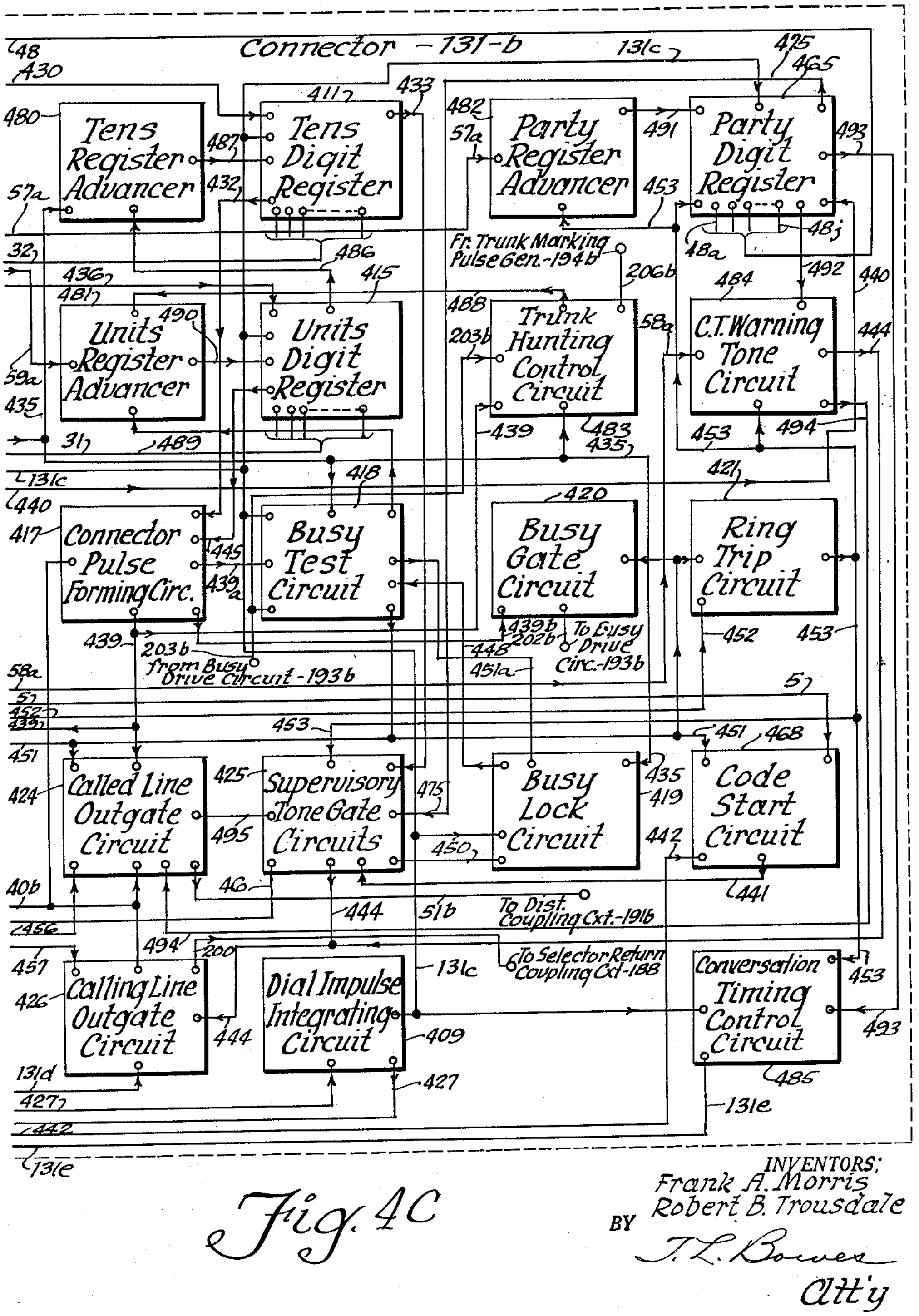
Figure 5:
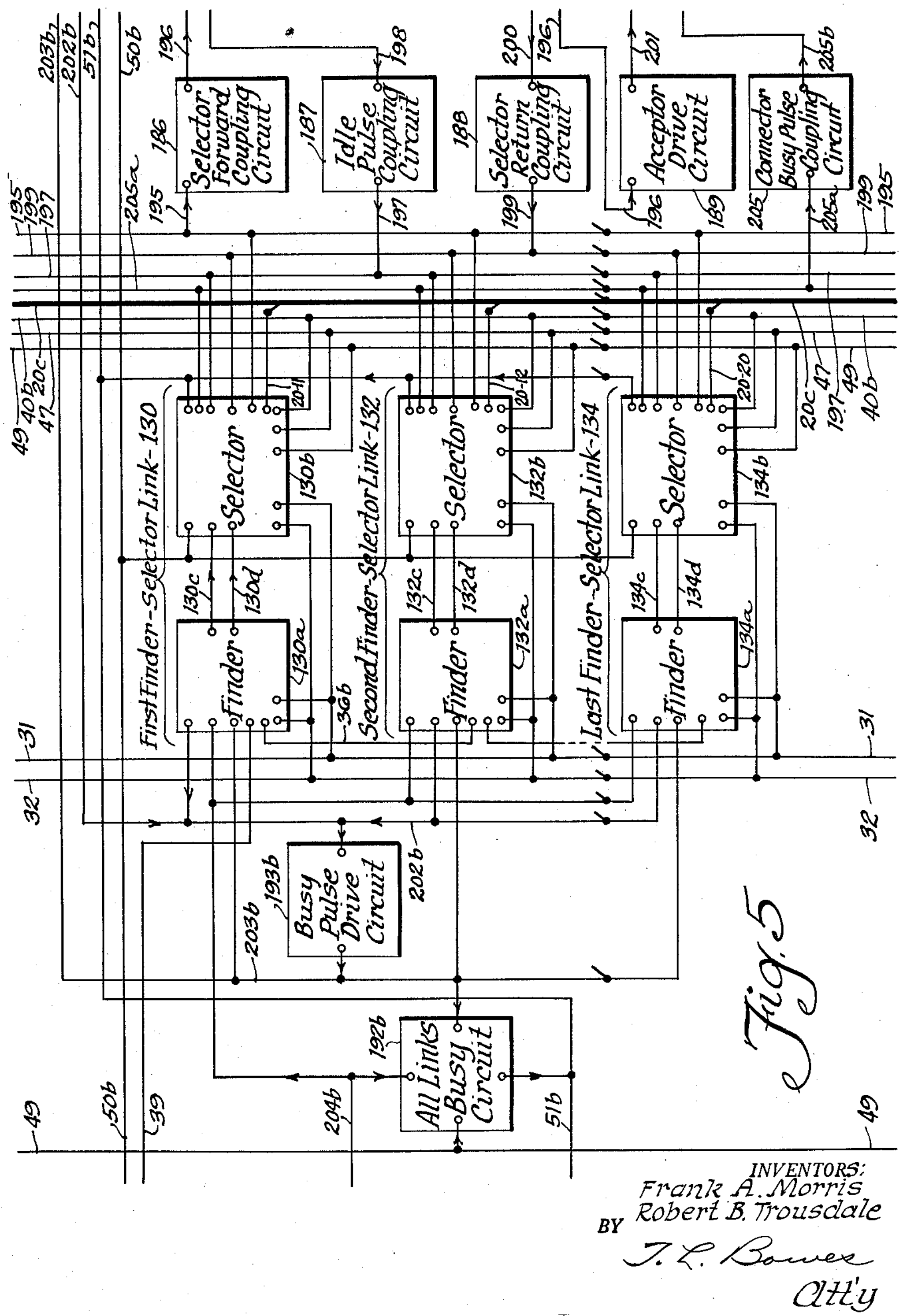
Figure 6:
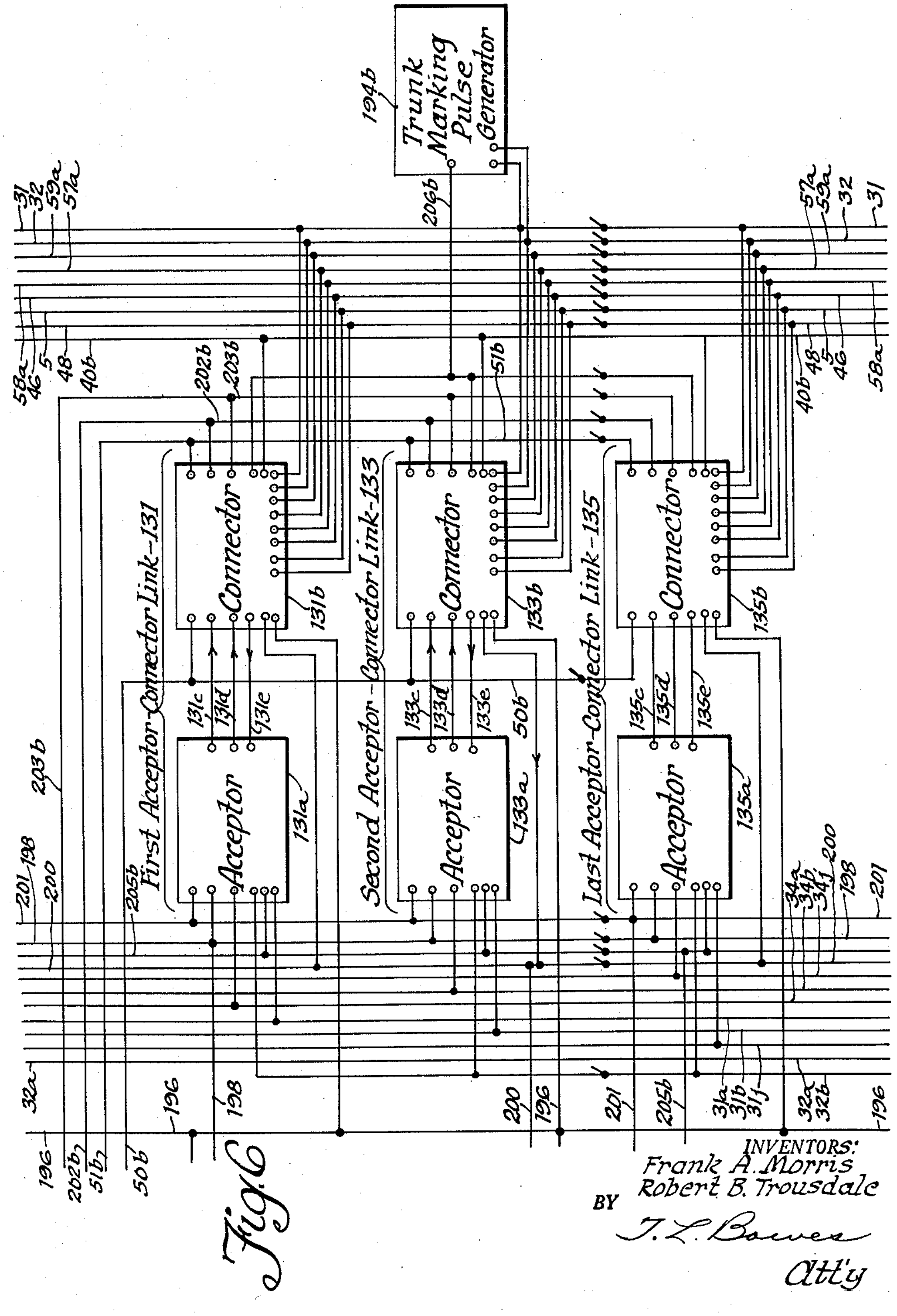
Figure 7:
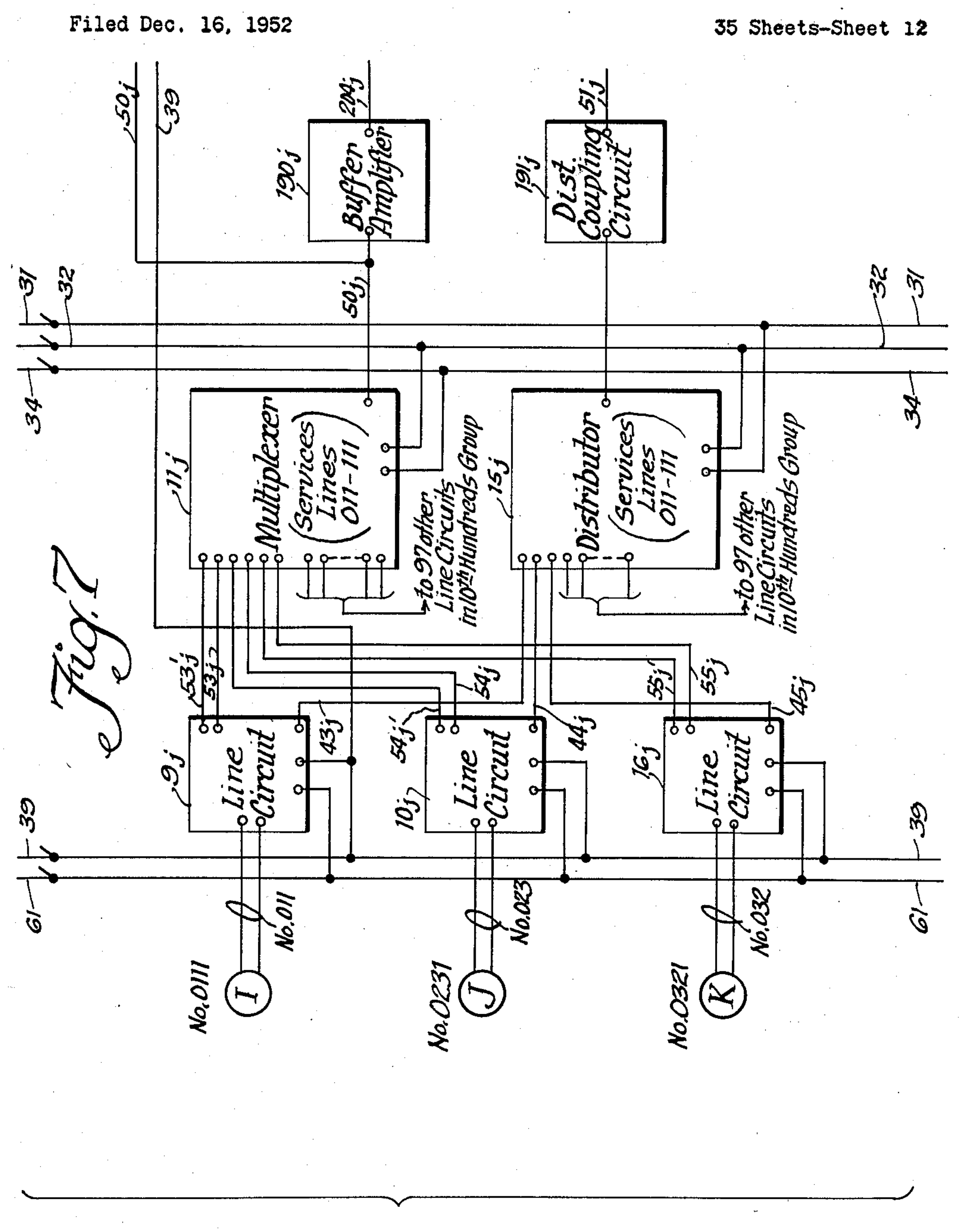
Figure 8:
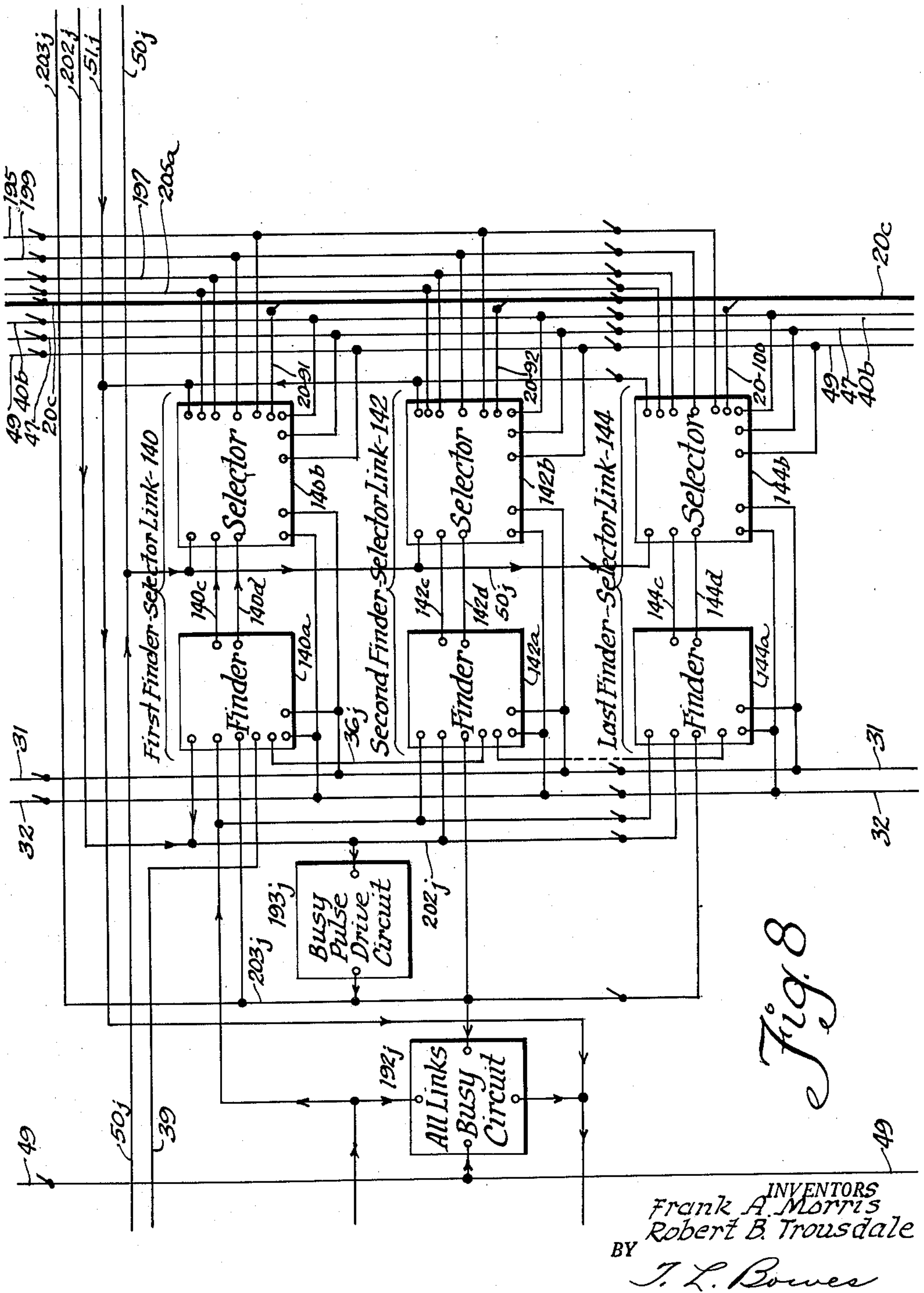
Figure 9:
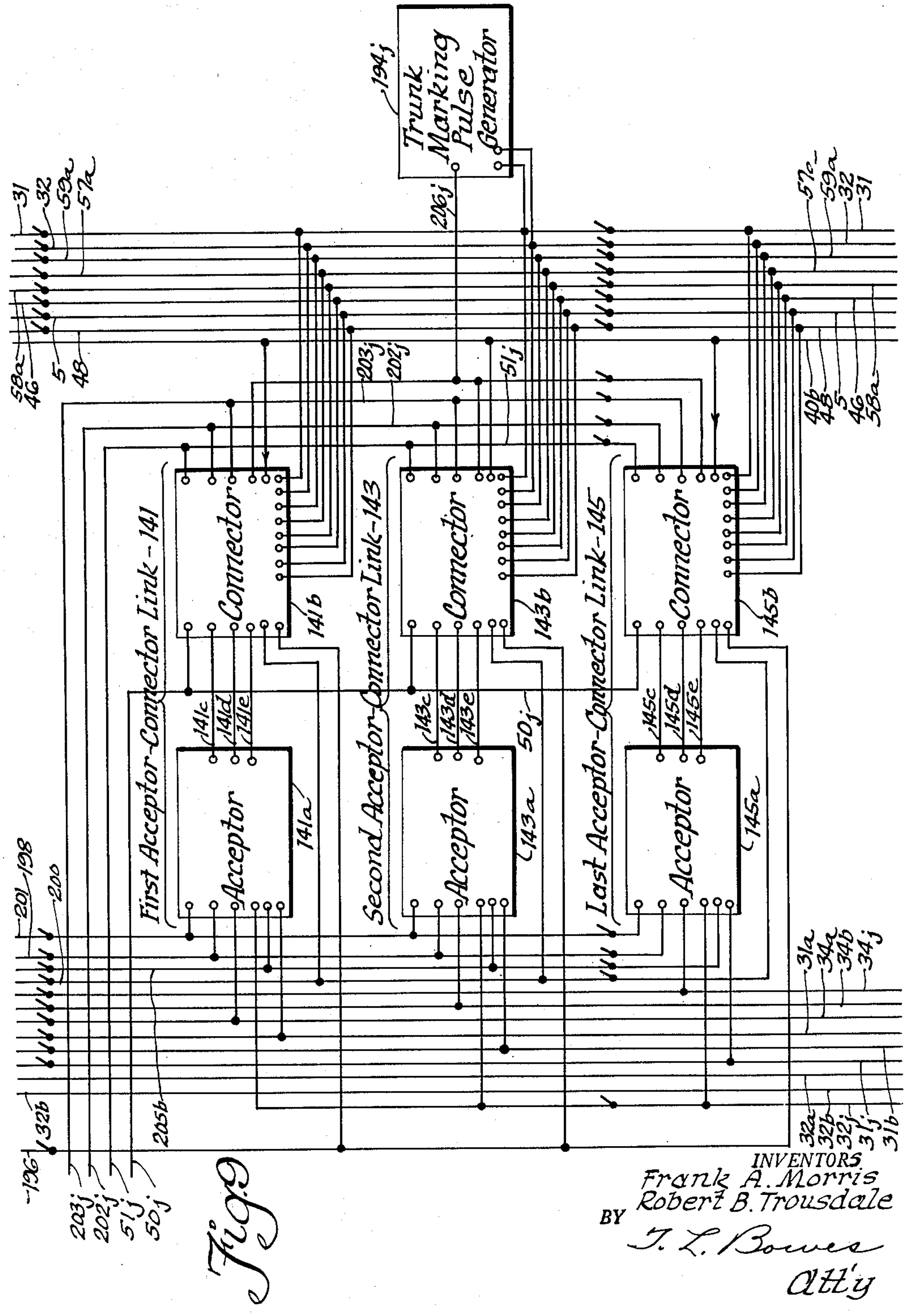

To perform the above-mentioned functions in the manner fully explained below, the connector 131b, as diagramatically illustrated in Figs. 4B and 4C, is provided with a calling line in gate circuit 407 which responds to acceptor gate pulses transmitted to the connector over the conductor 131d to repeat selector forward signal bearing pulses delivered thereto from the call forwarding selector in the pulse time position assigned to the connector 131b, and a calling line reconstructor circuit 408 having the function of detecting or reconstructing and storing the intelligence carried by the selector forward signal bearing pulses transmitted to the selector from the call forwarding selector in the pulse time position assigned to the connector 131b. The connector 131b further comprises a called line out gate circuit 424 for gating to the distributor 15b connector signal pulses carrying the intelligence reconstructed by the circuit 408 in the time position assigned to a particular called line within the second hundreds group 13. In addition, the connector 131b includes a called line in gate circuit 423 for repeating multiplexer pulses from the multiplexer 11b in the pulse time position assigned to the called line which bear intelligence or control signals derived from the called line, a called line reconstructor circuit 422 for detecting or reconstructing the intelligence or control signals gated by the called line in gate circuit 423, and a calling line out gate circuit 426 which is controlled in accordance with the detected intelligence stored in the circuit 422 and by the acceptor gate pulses delivered to the connector over the conductor 131d to gate to the call forwarding selector signal bearing selector return pulses which occur in the time position assigned to the connector 131b. More generally, the three circuits 407, 408 and 424 function to repeat intelligence from the call forwarding selector to the called line, whereas the three corresponding circuits 423, 422 and 426 function to repeat to the call forwarding selector intelligence derived from the called line.

The connector 131b is adapted for party line service and additionally comprises a plurality of components for responding to three digits (second, third and fourth) of dial pulses repeated to the connector on selector forward signal pulses occurring in the pulse time position assigned to the connector 131b, the last digit corresponding to the particular party line ringing signal assigned to the called party line substation. In general, the dial pulse responsive equipment of the connector 131b comprises a dial impulse integrator circuit 409 which receives dial impulses from the reconstructor circuit 408, tens, units, and party inverter circuits 460, 461 and 462, respectively, to which pulses are repeated by the dial impulse integrator circuit 409, tens, units, and party digit registers 411, 415 and 465 which are respectively controlled in accordance with the numerical values of the tens, units and party digits repeated to the circuits 460, 461 and 462 from the integrator circuit 409; tens, units and party register pulsers 410, 414 and 463 which are respectively interposed between the inverter circuit and the digit register of the tens, units and party digit channels; and the tens, units and party sequence timing circuits 412, 416 and 464 which, in effect, function as digit counting components of the connector, i.e., initiate certain operations at the end of the tens, units and party digits dialed into the connector.

The connector 131b further comprises a connector pulse forming circuit 417 which is controlled in accordance with the settings imparted to the tens and units registers 411 and 415 at the end of the units digit to produce connector pulses which are employed to control the circuits 422, 423 and 424 in the transmission of intelligence and control signal information from the connector 131b to the distributor 15b in the pulse time position assigned to the called line.

The busy test facilities of the connector 131b comprise a busy test circuit 418 jointly controlled by the connector pulse forming circuit 417 and busy pulses transmitted to the connector over the common busy pulse in conductor 203b in the second hundreds group 13, a busy lock circuit 419, and a busy gate circuit 420. The trunk hunting facilities of the connector comprise a trunk hunting control circuit 483 jointly controlled by the connector pulse forming circuit 417, the units sequence timing circuit 416, busy pulses transmitted to the connector over the common busy pulse in conductor 203b, and trunk marking pulses transmitted to the connector over the common trunk marking pulse conductor 206*b*, from the trunk marking pulse generator 194*b* in the second hundreds group 13; a units register advancer 481; and a tens register advancer 480.

The conversation timing facilities of the connector 131*b* comprise a conversation timing warning tone circuit 484 jointly controlled by the party digit register 465, the ring trip circuit 421, and a warning tone signal transmitted to the connector over the common conductor 58*a*; a party register advancer 482; and a conversation timing control circuit 485, the circuit 485 operating to produce an extinguishing pulse at the end of a predetermined conversation period which is transmitted to the +B switching circuit 401 in the acceptor 131*a* to effect release of the link 131, as will be described in more detail hereinafter.

In addition, the connector 131*b* comprises the supervisory tone gate circuits 425, having the function of gating a busy tone to the calling line by way of the call forwarding selector and include a ringback tone gate circuit having the functions of gating a particular party line ringback tone signal selected by the party digit register 465 in accordance with the identity of the called substation and transmitting a ringing control signal to the called line out gate circuit 424; a code start circuit 468 which performs the function of delaying the transmission of the selected party line ringback tone signal through the ringback tone gate circuit until the start of each ringing period in the ringing cycle; and a ring trip circuit 421 which is assigned the function of terminating ringing current transmission to the called substation when a call answering operation is performed at the called substation.

Figure 10:
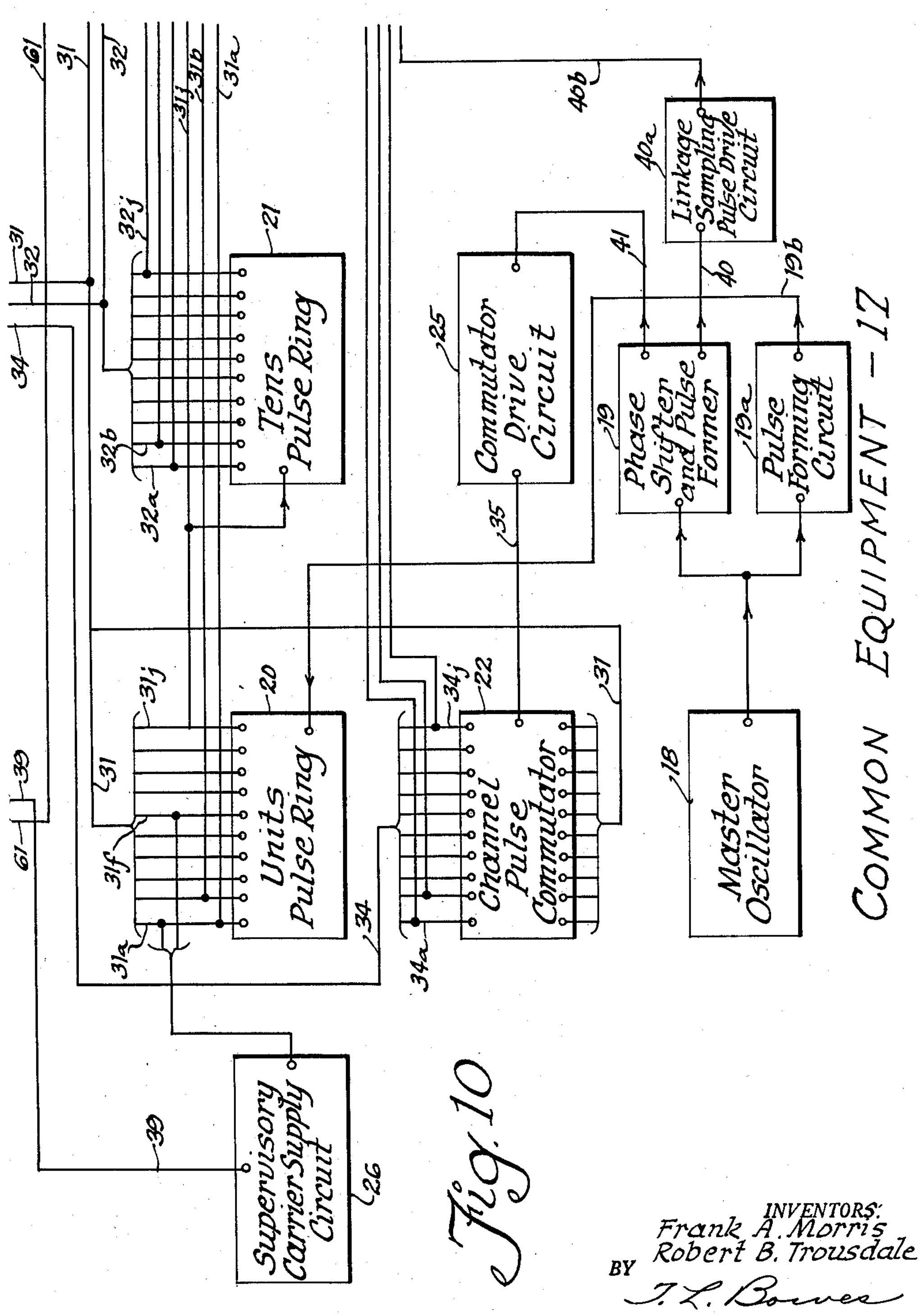
Figure 11:
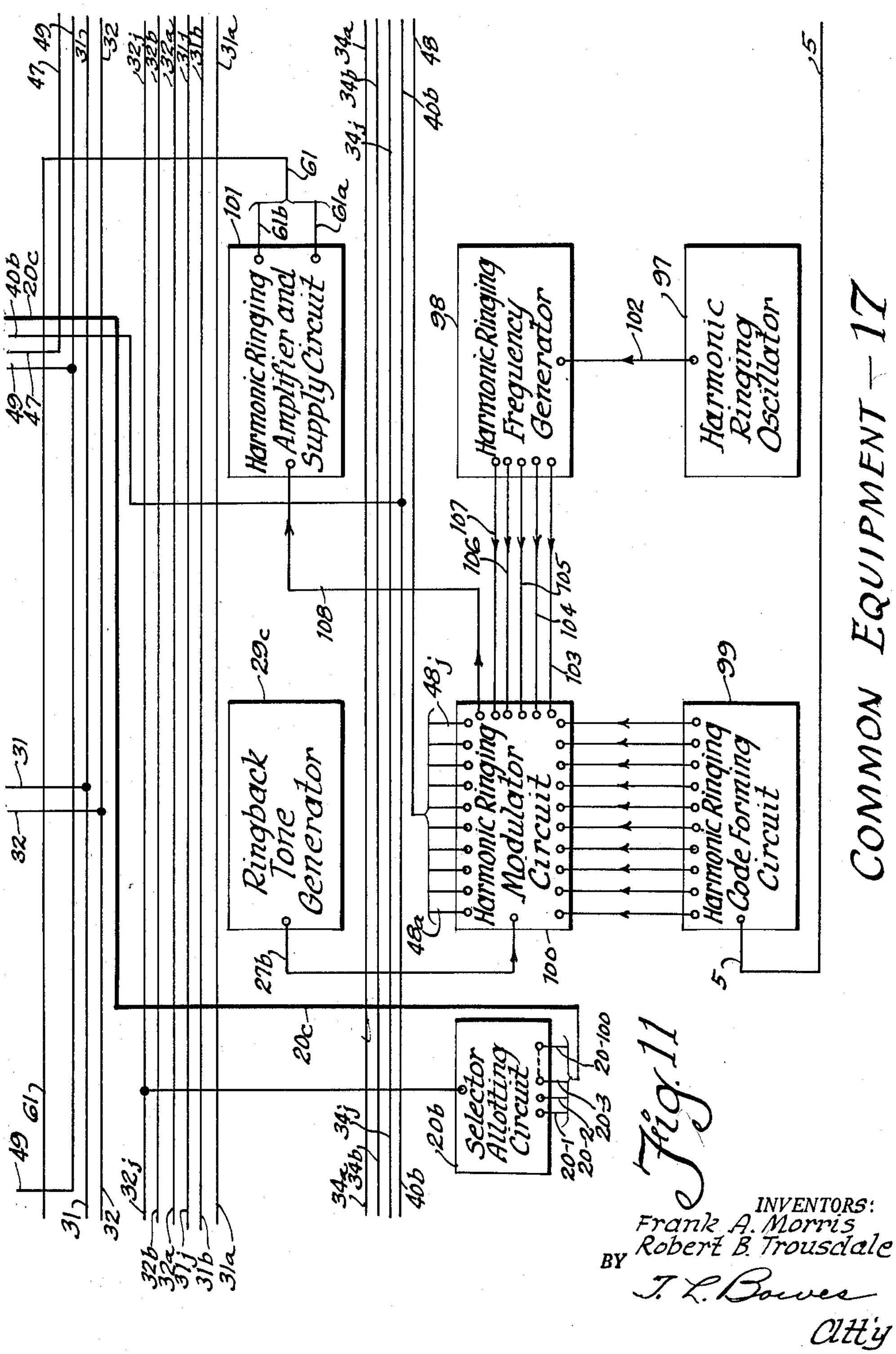
Figure 12:
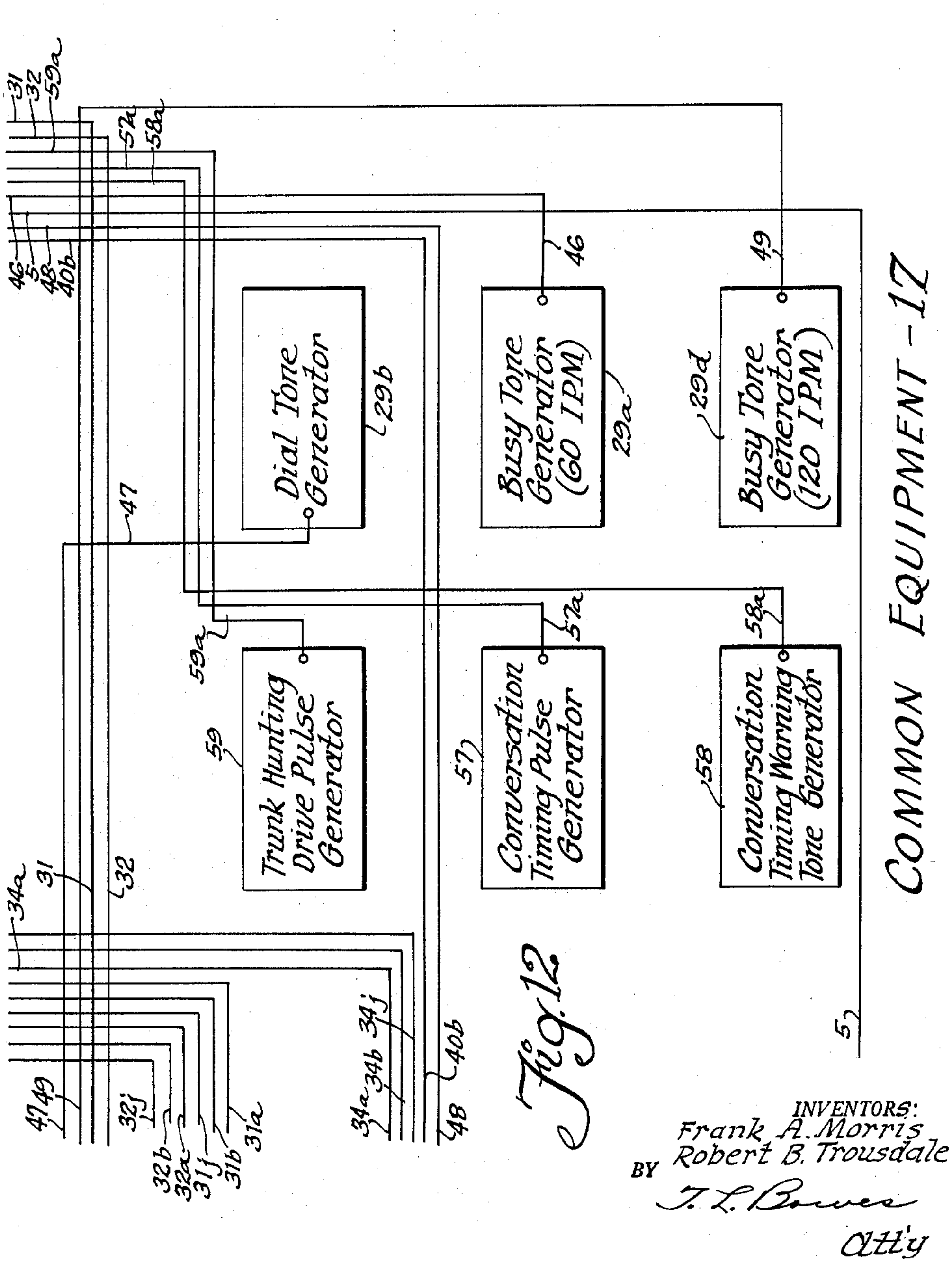

Generally considered, the common equipment 17, which is shown diagrammatically in the horizontally arranged Figs. 10, 11 and 12, includes a master oscillator 18 designed to operate at a fixed high frequency (preferably one megacycle) and having its output terminals arranged to control a phase shifter and pulse former 19 and a pulse forming circuit 19*a*. In the present system the master oscillator 18 is common to all of the line and linkage equipment of the one thousand line system. As controlled by the master oscillator 18, the phase shifter and pulse former 19 functions continuously to develop two identical trains of shaped pulses having a common pulse frequency of one megacycle, which are transmitted over the channels 40 and 41, respectively, to a linkage sampling pulse drive circuit 40*a* and a commutator drive circuit 25. The phase relationship between the pulses respectively produced in the channels 40 and 41 by the network 19 may be shifted as desired through adjustment of certain of the components of this network. The pulse forming circuit 19*a* functions to develop a train of shaped pulses having a repetition rate of one megacycle which is transmitted over the conductor 19*b* to a units pulse ring circuit 20. The units pulse ring circuit 20 functions sequentially to develop the units pulses which define the pulse time positions of each pulse frame, appear on the conductors within the cable 31, and are fed by way of these conductors to the various intelligence transmitting and control components of the system. More specifically, the cable 31 comprises ten units pulse conductors 31*a*, 31*b*–31*j* over which positive units pulses are sequentially transmitted in the order named to the gate circuits of each of the distributors 15*a*, 15*b*–15*j*, to each of the trunk marking pulse generators 194*a*, 194*b*–194*j*, to the units coincidence tube circuits 304 in each of the finders of the system, to the connector coincidence tube circuits 397 in each of the selectors of the system, and to the units digit registers 415 in each of the connectors of the system.

In addition, certain ones of the positive units pulses are impressed upon different ones of the acceptors of the system to establish in conjunction with tens pulses impressed upon these acceptors the individual pulse time positions which are assigned to and identify each of the acceptor-connector links of the system. Thus, considering for example the first hundreds group 12, the acceptor 121*a* in the first link 121 has impressed thereon the positive units pulses from the first units pulse conductor 31*a*, the acceptor 123*a* in the second link 123 thereof has impressed thereon units pulses from the second units pulse conductor 31*b*, and the acceptor 125*a* in the last link 125 in the first hundreds group 12 has impressed thereon units pulses from the tenth conductor 31*j*, based on the assumption that ten acceptor-connector links are provided to serve the first hundreds group 12. In a similar manner, the units pulse conductors are individually connected to the acceptors 131*a*, 133*a* and 135*a* in the second hundreds group 13 and to each of the additional hundreds groups so that each one of the acceptors of the system is assigned a different time position in the basic pulse time position frame. The units pulses appearing on the pulse conductors 31*a*, 31*b*–31*j* are also transmitted to the pulse gate circuits of a channel pulse commutator 22 and the positive units pulses developed upon the two conductors 31*a* and 31*f* are also employed to control or synchronize a supervisory carrier supply circuit 26.

The positive units pulses are sequentially developed on the units pulse conductors 31*a*, 31*b*–31*j*, inclusive, at a frequency rate of one hundred kilocycles, and each tenth positive units pulse, i.e., each pulse appearing on the units pulse conductor 31*j*, is used to step or trigger a tens pulse ring circuit 21 having the function of developing positive tens pulses, each of which spans the time interval of ten successive units pulses. The positive tens pulses, as sequentially produced by the ring circuit 21 on the tens pulse conductors 32*a*, 32*b*–32*j* forming the illustrated cable 32, are supplied to the gate circuits of the multiplexers 11*a*, 11*b*–11*j*, the gate circuits of the distributors 15*a*, 15*b*–15*j*, the trunk marking pulse generators 194*a*, 194*b*–194*j*, the tens coincidence tube circuits 303 in each of the finders of the system, the hundreds digit registers 311 of each of the selectors of the system, and the tens digit registers 411 of each of the connectors of the system, all in the manner more fully explained below. In addition, the positive tens pulses produced on the tens pulse conductors 32*a*, 32*b*–32*j* are individually impressed upon different ones of the acceptors of the system to establish together with the units pulses impressed upon these acceptors the particular pulse time position which is assigned to and identifies each of the acceptor-connector links of the system. For example, the acceptors 121*a*, 123*a* and 125*a* in the first hundreds group 12 have impressed thereon positive tens pulses from the first tens pulse conductor 32*a*. Likewise, the acceptors 131*a*, 133*a* and 135*a* in the second hundreds group 13 have impressed thereon the positive tens pulses from the second tens pulse conductor 32*b*. Finally, the acceptors 141*a*, 143*a* and 145*a* in the tenth hundreds group 14 have impressed thereon the tens pulses appearing on the tenth tens pulse conductor 32*j*. In this connection, it will be understood that the tens pulses appearing on the other tens pulse conductors 32*c*–32*i*, inclusive, are respectively impressed upon the acceptors in the seven hundreds groups not shown in the drawings.

As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b*–34*j* forming the illustrated cable 34 which are fed to the gate circuits in the multiplexers 11*a*, 11*b*–11*j*. These channel pulses occur at the same frequency as the units pulses but are much narrower in width. For example, the channel pulses appearing on the conductor 34*a* are much narrower than the units pulses appearing on the positive units pulse conductor 31a and are preferably so phased relative to the units pulses that each channel pulse occurs well within the limits of the coincident positive units pulse. Linkage sampling pulses as derived from the linkage sampling pulse drive circuit 40a are transmitted over the conductor 40b to the forward and return out gate circuits 324 and 326 in each of the selectors of the system, and to the connector pulse forming circuit 417 and the calling and called line out gate circuits 424 and 426 in each of the connectors of the system.

In order to provide facilities for effecting party line ringing of the called substation on either a fully selective or a semi-selective harmonic ringing basis, the common equipment 17 further includes a harmonic ringing oscillator 97, which functions independently of the other components of the system, and is designed to operate at an audio frequency (preferably 1200 cycles) which is suitable for subdivision into a group of harmonically related ringing frequencies. The oscillator 97 is connected over the conductor 102 to a harmonic ringing frequency generator 98 which operates under the control of the 1200 cycle signal from the oscillator 97 to develop five continuous wave ringing signals of different frequencies which are suitable for exciting the ringing facilities of five different substations connected to one of the lines of the system. In the illustrated embodiment the ringing frequencies developed by the generator 98 correspond to the frequencies of the conventional harmonic ringing series so that conventional frequency sensitive harmonic ringers may be employed in the substations of the system. Thus, continuous wave signals having the frequencies 16⅔ c.p.s., 25 c.p.s., 33⅓ c.p.s., 50 c.p.s., and 66⅔ c.p.s. are respectively impressed upon the output conductors 103–107, inclusive, of the generator 98.

The common equipment 17 further comprises the harmonic ringing code forming circuit 99 which operates independently of the other components of the system to develop two different party line code ringing signals during each of five successive ringing periods, which periods recur during the repetitive ringing cycles established by the circuit 99. In the illustrated embodiment each ringing period lasts for approximately 1½ seconds and is separated from the adjacent ringing periods by a short guard interval, the over-all ringing cycle being approximately 7½ seconds long. During each of the five ringing periods the code forming circuit 99 produces both a long ringing pulse, which lasts for 1½ seconds, and two short ringing pulses each of ½ second duration separated by a ½ second silent period. The series of ten coded ringing pulses formed by the circuit 99 are used to control a harmonic ringing modulator circuit 100 wherein the 1½ second ringing pulses are used as gating pulses sequentially to gate to a common output conductor 108 the different ringing frequencies impressed on the conductors 103–107, inclusive, by the generator 98, and the multiplexed ringing frequencies thus impressed on the conductor 108 are transmitted to a harmonic ringing amplifier and supply circuit 101. The common equipment 17 also includes a ringback tone generator 29c which performs the function of developing a continuous audible ringback tone signal (preferably 200 c.p.s.) which is supplied over the conductor 27b to the harmonic ringing modulator circuit 100. Each one of the ten codes formed by the circuit 99 is used to develop corresponding pulses of ringback tone on the ten ringback tone conductors 48a–48j, inclusive, which form the illustrated ringback tone cable 48. These coded ringback tone pulses are transmitted over the cable 48 to the party digit registers 465 in each of the connectors of the system. The harmonic ringing amplifier and supply circuit 101 filters and amplifies the multiplexed ringing frequencies transmitted thereto over the conductor 108, and provides a combined bias voltage and multiplex ringing current source which is connected to each of the line circuits of the system over the common multiple conductors 61a and 61b forming the illustrated cable 61.

In order to mark certain consecutively numbered groups of the lines in each hundreds group as trunks, there is provided the trunk marking pulse generators 194a, 194b–194j, inclusive, which are individually associated with each hundreds line group. Each of the trunk marking pulse generators is jointly controlled by the positive units pulses transmitted thereto over the cable 31 and the positive tens pulses transmitted thereto over the cable 32 and develops on the common output conductors 206a, 206b–206j, inclusive, thereof, trunk marking pulses which appear in the time positions assigned to each of the lines in each trunk group with the exception of the last line in each group which is unmarked. The trunk marking pulses produced on the conductors 206a, 206b–206j, inclusive, are respectively impressed upon the trunk hunting control circuits 483 in each of the connectors in the associated hundreds group. Thus, the trunk marking pulses produced on the conductor 206a are impressed upon the trunk hunting control circuits 483 in the connectors 121b, 123b–125b in the first hundreds group 12.

To provide a trunk hunting arrangement wherein the tens and units digit registers of the connectors are successively driven to different settings to hunt for an idle line, there is provided in the common equipment 17 a trunk hunting drive pulse generator 59 which operates independently of the other components of the system to develop positive trunk hunting drive pulses of relatively short duration which recur at a relatively low rate (preferably in the order of 100 pulses per second) which are impressed on the common conductor 59a and are connected by way of this conductor to the units register advancers 481 in each of the connectors of the system.

In order to provide facilities for timing the conversation period and for warning the calling and called line subscribers when the call is about to be terminated, the common equipment 17 includes a conversation timing pulse generator 57 and a conversation timing warning tone generator 58. The timing pulse generator 57 operates independently of the other components of the system to develop relatively narrow, positive, conversation timing pulses which preferably have a repetition rate of about one every 40 seconds and are connected by way of the common conductor 57a to the party register advancers 482 in each of the connectors of the system. The conversation timing warning tone generator 58 also operates independently of the other components of the system to develop a continuous wave warning tone signal (preferably 400 c.p.s.) which is connected by way of the common conductor 58a to the conversation timing warning tone circuits 484 in each of the connectors of the system.

The common equipment 17 also includes a busy tone generator 29a, preferably having a 60 i.p.m. rate, which is used for line busying supervisory signals, the output of the generator 29a being connected by way of the common conductor 46 to the supervisory tone gate circuits 425 in each of the connectors of the system, a busy tone generator 29d, preferably having a 120 i.p.m. rate, which is used for linkage busying supervisory signals, the output of the generator 29d being connected by way of the conductor 49 to the busy tone gate circuits 325a in each of the selectors of the system and to the all links busy circuits 192a, 192b–192j in each hundreds groups; and a dial tone generator 29b which is connected by way of the common conductor 47 to the dial tone gate circuits 325 in each of the selectors of the system. The common equipment 17 further comprises a selector allotting circuit 20b which is controlled by tens pulses transmitted thereto from the tens pulse ring 21 by way of the conductor 32, and functions sequentially to apply selector allotting pulses to the one hundred output conductors thereof 20–1, 20–2, 20–3 to 20–100, inclusive, which together comprise the illustrated cable 20c. Each of the conductors 20–1, 20–2, 20–3 to 20–100, inclusive, is connected to one of the selectors of the system and transmits selector allotting pulses to the idle pulse gate circuit 395 to this selector. These selector allotting pulses are of one pulse frame duration and function sequentially to enable the one hundred selectors of the system to select an idle acceptor-connector link in the called hundreds line group. With this arrangement, two or more selectors cannot compete for an idle acceptor-connector link in the same called hundreds line group and double connections are avoided.

The common equipment 17 also comprises a supervisory carrier supply circuit 26, which is synchronized with the units pulse ring 20 over the conductors 31*a* and 31*f* and functions to develop a relatively high frequency (preferably 100 kilocycles) carrier voltage which is connected over the common conductor 39 to each of the line circuits of the system.

In order to render the mode of operation of the system more readily understandable, a pulse chart has been illustrated in Figs. 24 to 27, inclusive, to show the relative widths of the pulses developed by the common equipment components 19, 19*a*, 20, 21 and 22 during two successive pulse frames, as well as the time or phase relationship between the pulses. As there shown, the units pulse ring drive pulses 95*a*, appearing on the conductor 19*b* are produced by the pulse forming circuit 19*a* along the zero potential reference line 95 at a frequency rate of one megacycle and are of positive polarity. Similarly, the channel pulse commutator drive pulses 96*a* appearing on the conductors 41 and 35 and the linkage sampling pulses 96*b* appearing on the conductors 40 and 40*b* are produced by two separate channels of the phase shifter and pulse former network 19 at the same frequency of one megacycle and are of positive polarity. It will be noted that the units pulse ring drive pulses 95*a*, the commutator drive pulses 96*a* and the linkage sampling pulses 96*b* are all very narrow, i.e., persist for very short time intervals, and that the pulses 96*a* and 96*b* are displaced in time relative to the pulses 95*a*. As shown in Fig. 24A of the drawings wherein a few of the pulses 95*a*, 96*a* and 96*b* are shown on an enlarged scale to illustrate the phase relationship therebetween, each commutator drive pulse 96*a* occurs during the first half of the period separating the preceding and succeeding units pulse ring drive pulses 95*a*, and preferably occurs one-quarter microsecond after the corresponding units pulse ring drive pulse 95*a*. The linkage sampling pulses 96*b* are also displaced in time relative to the pulses 95*a* and each linkage sampling pulse occurs just slightly before the middle of the period separating the preceding and succeeding units pulse ring drive pulses 95*a*.

In this connection, it will be understood that the phasing of the pulses 96*a* and 96*b* relative to the pulses 95*a* may be independently controlled so that the pulses 96*a* and 96*b* can have different phase relationships with respect to the pulses 95*a*. By providing separate channels in the circuit 19 for the relative phasing of the pulses 96*a* and 96*b*, the circuit delays encountered in the system can be compensated. Thus, the commutator drive pulses 96*a*, in traversing the circuits of the channel pulse commutator 22 suffer a time delay so that the channel pulses produced by the commutator 22 are delayed relative to the commutator drive pulses 96*a*. Also, these channel pulses, in traversing the circuits of the multiplexer 11, suffer an additional time delay in being converted to multiplexer pulses. The total time delay between the commutator drive pulses 96*a* and the resulting multiplexer pulses is quite appreciable and, in order to position the multiplexer pulses substantially in the center of the units pulses produced by the units pulse ring 20, the setting of the phase shifter and pulse former 19 is adjusted so that the commutator drive pulses 96*a* are generated approximately one-quarter microsecond after the units pulse ring drive pulses 95*a*. On the other hand, the linkage sampling pulses, which are transmitted directly to the selectors and connectors of the system, encounter only a very slight delay in the out gate circuits of these system components so that the other channel of the phase shifter and pulse former 19 is adjusted so that the linkage sampling pulses 96*b* are produced just slightly ahead of the middle of the periods separating the preceding and succeeding units pulse ring drive pulses 95*a*.

The positive units pulses appearing respectively on the units pulse conductors 31*a*, 31*b*—31*j* are produced along the zero potential reference lines 62, 63–71. It will be noted that the units pulses are produced by the units pulse ring circuit 20 at the fundamental frequency rate of one megacycle. However, due to diversion of the pulses successively to different ones of the units pulse conductors *a*, *b–j*, the pulses along any particular zero potential reference line, such, for example, as the line 62, recur only at a frequency rate of one hundred kilocycles. It will also be noted that the units pulses are successively produced on the units pulse conductors 31*a* to 31*j*, inclusive, in the order of alphabetical designation of these conductors. Thus, successive positive units pulses produced along any particular zero potential reference line, as, for example, those occurring during the units pulse periods 62*a*, 62*b*, 62*c*, etc., along the potential reference line 62, are separated by a time interval equaling the sum of nine units pulse time positions and during which units pulses are produced successively along each of the nine other zero potential reference lines.

The positive tens pulses successively produced by the tens pulse ring circuit 21 on the tens pulse conductors 32*a*, 32*b*–32*j* are illustrated as appearing along the ten zero potential reference lines 72 to 81, inclusive. It will be noted that each tens pulse persists for a time interval exactly equaling the time required to produce ten units pulses. Thus, the tens pulse period 72*a* persists for the duration of the interval in which the ten units pulses 62*a*–71*a* are successively produced by the units pulse ring circuit 20. It will also be noted that the starting point of each tens pulse period 72*a*, 73*a*, 74*a*, etc., is exactly coincident with the starting points of the units pulses 62*a*, 62*b*, 62*c*, etc., appearing along the zero potential reference line 62 and impressed upon the units pulse conductor 31*a*, by the units pulse ring circuit 20. Further, each tens pulse period terminates at the exact instant of termination of the units pulses 71*a*, 71*b*, 71*c*, etc., appearing along the zero potential reference line 71 and produced by the units pulse ring circuit 20 on the conductor.

The channel pulses which are successively produced on the ten channel pulse conductors 34*a*, 34*b*–34*j* by the channel pulse commutator 22 and are transmitted to the multiplexers 11*a*, 11*b*–11*j* for signal bearing purposes in the manner indicated above and to different ones of the acceptors of the system for idle pulse generation in the manner described generally above, are of positive polarity, are produced along the zero potential reference lines 82 to 91, inclusive, and occur in time coincidence with the commutator drive pulses 96*a* appearing along the zero potential reference line 96. Like the units pulses, the channel pulses are produced at the fundamental frequency rate of one megacycle, but due to the action of the commutator 22 in diverting these pulses successively to the conductors 34*a*, 34*b*–34*j*, recur only on each of these conductors at a rate of one hundred kilocycles. Thus, the channel pulses 82*a*, 82*b*, 82*c*, et cetera, appearing along the reference line 82 and impressed on the conductor 34*a* are spaced apart timewise by like intervals each of which exactly equals the sum of ten units pulse time periods. During this spacing interval, nine additional channel pulses are successively produced along the reference lines 83, 84–91 to appear on the conductors 34*b*, 34*c*–34*j*. It will also be noted that the channel pulses are very narrow in width, having a persistence interval of the order of one-fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95*a*, as shown in Fig. 24A, to open the gating circuits of the channel pulse commutator 22. The purpose of thus positioning the signal bearing pulses in the units pulse time positions is that of insuring transmission of these pulses through the units gate circuits of the signal handling components of the system while these gate circuits are open despite slight variations in the relative positions of the units pulses and the signal bearing pulses occasioned by circuit delays.

With the above general description of the pulse chart illustrated in Figs. 24–27, inclusive, in mind, it will readily be understood that each pulse frame is divided into one hundred readily identifiable pulse time positions. Thus, the first ten pulse time positions of each pulse frame are defined by the first tens pulse period 72*a* of the frame within which the ten units pulse periods 62*a*, 63*a*, 64*a*–71*a* occur. These ten units pusle time positions are respectively assigned to the first ten lines in each hundreds line group of the system. Thus, in the first hundreds group 12 the lines having the directory number designations 111, 112, 113, 114, 115, 116, 117, 118, 119 and 110 have respectively assigned thereto the ten units pulse periods 62*a*, 63*a*, 64*a*–71*a*. Likewise, in the second hundreds group 13 the first ten lines having the directory number designations 211, 212, 213, 214, 215, 216, 217, 218, 219 and 210 have respectively assigned thereto the same ten units pulse periods 62*a*, 63*a*, 64*a*–71*a*. Similarly, each first group of ten lines in each hundreds line group has respectively assigned thereto the first ten units pulse periods in each pulse frame.

Similarly, the second ten units pulse time positions are defined by the second tens pulse period 73*a* during which the ten units pulse periods 62*b*, 63*b*, 64*b*–71*b* occur. These units pulse periods are assigned to the second group of ten lines in each of the hundreds group of the system. Thus, in the first hundreds group 12 the second group of ten lines having the directory number designations 121, 122, 123, 124, 125, 126, 127, 128, 129 and 120 have respectively assigned thereto the ten units pulse periods 62*b*, 63*b*, 64*b*–71*b*. In the second hundreds group 13 the second group of tens lines having the directory number designations 221, 222, 223, 224, 225, 226, 227, 228, 229 and 220 have respectively assigned thereto the same ten units pulse periods 62*b*, 63*b*, 64*b*–71*b*.

Thus, it will be understood that the pulse time position of each pulse frame which is assigned to the line No. 123 in the first hundreds groups 12 occurs durirng the second tens pulse interval 73*a* of each pulse frame and is coincident with the units pulse period 64*b* of each pulse frame. It will also be apparent that the corresponding channel pulse 84*b* occurs well within the limits of this pulse time position. Similarly, the pulse time position assigned to the illustrated line No. 232 in the second hundreds group 13 occurs during the third tens pulse time interval 74*a* of each pulse frame and is coincident with the second units pulse period 63*c* of each pulse frame. Here again each channel pulse 83*c* corresponding to the line No. 232 in the hundreds group 13, occurs well within the limits of the particular time position assigned to the line No. 232 in each pulse frame.

From the foregoing general description of the pulse chart illustrated in Figs. 24 to 27, inclusive, it will further be understood that each group of ten units pulses which occur during a particular tens pulse interval, is assigned to one of the hundreds groups of the system to identify individual ones of the ten acceptor-connector links serving this hundreds group. Thus, in the first hundreds group 12 the first acceptor-connector link 121 is arbitrarily assigned the first units pulse period 62*a* which occurs during the first tens pulse period 72*a* of each pulse frame. Likewise, the second acceptor-connector link 123 is assigned the second units pulse period 63*a* which occurs during the first tens pulse period 72*a* of each pulse frame. Finally, the last acceptor-connector link 125 in the first hundreds group 12 is assigned the tenth units pulse period 71*a* which occurs during the first tens pulse period 72*a* of each pulse frame, it being understood that a series of ten acceptor-connector links are provided in the first hundreds group 12 each of which is assigned one of the ten units pulse periods which occur during the first tens pulse period 72*a*. In this connection, it will be understood that the assignment of units pulse periods to different acceptor-connector links serving the same hundreds group is only done on an arbitrary basis within a given tens pulse interval so that each tens pulse interval represents a group of acceptor-connector links serving one particular hundreds line group. With this arrangement, access may be had to a group of acceptor-connector links serving a desired hundreds group by selecting the tens pulse interval assigned to this group in response to dialing of the first, or hundreds digit at the calling substation, as will be described in more detail hereinafter.

In the second hundreds group 13, the first acceptor-connector link 131 has assigned thereto the first units pulse period 62*b* which occurs during the second tens pulse period 73*a* of each pulse frame, the second acceptor-connector link 133 has assigned thereto the second units pulse period 63*b* which occurs during the second tens pulse period 73*a* and the last acceptor-connector link 135 has assigned thereto the tens units pulse period 71*b* which occurs during the second tens pulse period 73*a*. In an entirely similar manner, the acceptor-connector linkage in each of the remaining hundreds line groups has individually assigned thereto different units pulse periods within a given tens pulse interval. From the foregoing, it will be apparent that the pulse time position of each pulse frame which is assigned to the first acceptor-connector link 131 in the second hundreds group 13 occurs during the second tens pulse interval 73*a* of each pulse frame and is coincident with the units pulse period 62*b* of each pulse frame. It will also be apparent that the corresponding channel pulse 82*b* occurs well within the limits of the pulse time position 62*b*.

Figure 28:
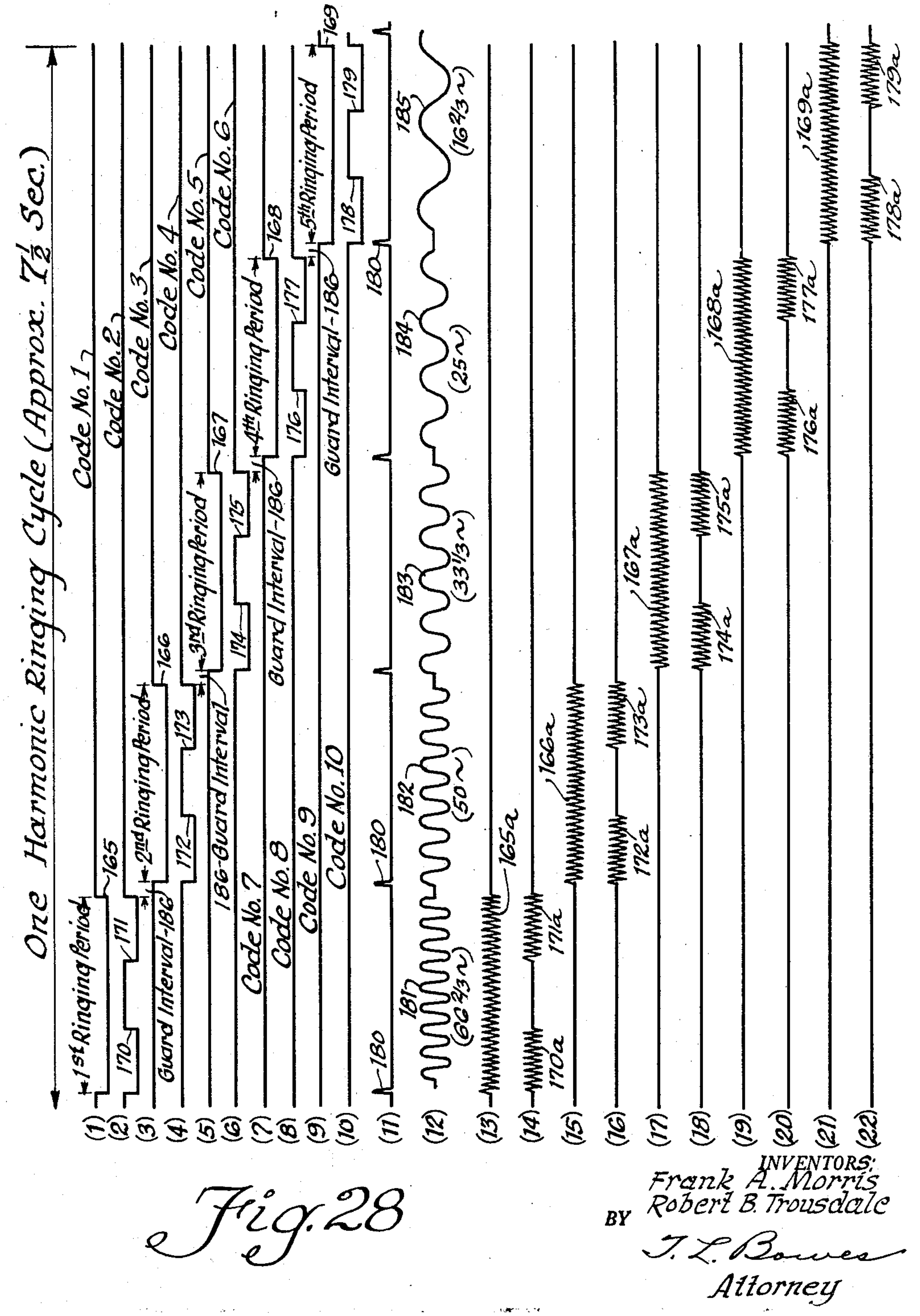

In order further to render the mode of operation of the fully selective or semi-selective harmonic ringing system in the one thousand line system of the present invention more readily understandable, a harmonic code sequence chart has been illustrated in Fig. 28 to show the time and phase relationship of the signals developed by the harmonic ringing code forming circuit 99 and the harmonic ringing modulator circuit 100 in the common equipment 17 during one harmonic ringing cycle. As there shown, the code forming circuit 99 develops a series of long ringing pulses 165, 166, 167, 168 and 169 on five different output code buses thereof which recur in succession during successive harmonic ringing cycles of approximately 7½ seconds duration. The long ringing pulses 165–169, inclusive, define a succession of five ringing periods which are separated by guard intervals 186 of relatively short duration. The code forming circuit 99 also operates to produce on five other code buses thereof a pair of short ringing pulses during each ringing period. Thus, the circuit 99 develops the short ringing pulses 170 and 171 during the first ringing period, the pulses 172 and 173 during the second ringing period, the pulses 174 and 175 during the third ringing period, et cetera. In addition, the code forming circuit 99 develops the positive code start pulses 180 (Fig. 28(11)) which occur substantially at the end of each of the guard intervals 186. The code start pulses 180 are transmitted over the common conductor 5 to each of the connectors of the system to delay the selection of a particular party line ringing signal until the end of a particular ringing period.

The long ringing pulses 165 are employed in the harmonic ringing modulator circuit 100 successively to gate different ringing frequencies to the common output conductor 108 and the composite or multiplexed ringing frequency signal is filtered in the harmonic ringing amplifier and supply circuit 101 so as to provide a ringing voltage wave form substantially as shown in Fig. 28(12). Thus, during the first ringing period the ringing pulse 165 is used to gate a 66⅔ c.p.s. ringing voltage to the common conductor 108. After the guard interval 186, the ringing pulse 166 is employed to gate a 50 c.p.s. ringing voltage to the conductor 108 during the second ringing period. Likewise, the successive ringing pulses 167, 168 and 169 are employed successively to gate to the common output conductor 108 ringing voltages having frequencies of 33⅓ c.p.s., 25 c.p.s. and 16⅔ c.p.s.

In order to produce ringing control signals which may be used to control the application of ringing current to the called line during the particular ringing period and in accordance with the particular ringing code assigned to the called substation connected thereto, and also to produce concurrently therewith corresponding ringback tone signals which may be used to advise the calling line subscriber that the called line is being rung in a particular code sequence, the long and short ringing pulses (Figs. 28(1)–(10), inclusive) developed by the harmonic ringing code forming circuit 99 are used individually to gate to the output conductors **48*a*–48*j*, inclusive, a ringback tone signal for the duration of each ringing pulse. Thus, the ringing pulse 165 developed in the code forming circuit 99 is used to develop a ringback tone signal 165*a* which persists for the duration of the first ringing period. Likewise, the short ringing pulses 170 and 171 are employed to produce the ringback tone signals 170*a* and 171*a* which have a duration of one-half second and are separated by a one-half second silent interval, the signals 170*a* and 171*a* also occurring during the first ringing period. In the same manner, the pulses 166, 172 and 173** are employed to develop the corresponding ringback tone signals shown in Figs. 28(15) and (16) during the second ringing period. In a similar manner, the long and short ringing pulses which are produced during the third, fourth and fifth ringing periods are employed to produce the ringback tone signals shown in Figs. 28(17)–(22), inclusive.

With the above general description of the harmonic code sequence chart illustrated in Fig. 28 in mind, it will readily be understood that each harmonic ringing cycle is divided into five successive ringing periods and during each ringing period there is produced a first party line ringing signal consisting of one long ringing pulse, and a second party line ringing signal consisting of two short pulses, each party line ringing signal being repeated at approximately 7½ second intervals. In the event that a maximum of five substations are associated with any one line of the system, only the long ringing pulses 165–169, inclusive, need be employed and under these conditions the first substation would be provided with ringing facilities which are responsive to a 66⅔ c.p.s. ringing current, the second substation would be provided with ringing facilities which are responsive to 50 c.p.s. ringing current, the third substation would be provided with ringing facilities responsive to 33⅓ c.p.s. ringing current, the fourth substation would be provided with ringing facilities responsive to 25 c.p.s. ringing current, and the fifth substation would be provided with ringing facilities responsive to 16⅔ c.p.s. ringing current. The five substations would be assigned different fourth digit directory number designations and one of the ringback tones **165*a*–169*a*, inclusive, would be selected in the connector in response to the dialing of a fourth digit at the calling substation. If, for example, a substation having ringing facilities responsive to 66⅔ c.p.s. ringing current is selected in the connector, the ringback tone signal 165*a* is selected and is used to control the application of ringing current so that only the 66⅔ c.p.s. signal 181** (Fig. 28(12)) is applied to the called line and only the substation having ringing facilities which respond to this ringing frequency will be rung.

In the event that more than five substations up to a maximum of ten are associated with one of the lines of the system, the substations are divided into pairs and each pair of substations is provided with ringing facilities responsive to the same ringing frequency. Thus, the substations F and G associated with the line No. 232 and assigned the directory number designations 2321 and 2322 would both be provided with ringing facilities responsive to the same ringing current, for example, a 66⅔ c.p.s. ringing current. If the calling subscriber wishes to call substation F, he dials 2321 and the connector responds to the fourth digit of "1" by selecting the ringback tone signal **165*a* so that a 66⅔ c.p.s. ringing current is transmitted over the called line 232 during the entire first ringing period. Only the ringers at the substations F and G will then be rung for a period of approximately 1½ seconds and the subscriber at the substation F will know that the call is intended for him. On the other hand, if the calling subscriber wishes to call the substation G associated with the line No. 232, he dials the number 2322 and the connector responds to the fourth digit of "2" by selecting the ringback tone signal consisting of the short pulses 170*a* and 171*a*** which control the application of 66⅔ c.p.s. ringing current to the line 232 so that the ringing facilities at both the substations F and G are rung in two short rings. The subscriber at the substation G is then notified that his substation is being rung.

In a similar manner, the remainder of the substations on the line No. 232 are paired and provided with ringing facilities responsive to the other four ringing frequencies. However, it will be understood that certain ones of the lines of the system may be adapted for private service, in which case, the private line will, of course, have only one substation associated therewith. Thus, in the illustrated embodiment the line No. 123 is adapted for private service and has associated therewith only the one substation A to which is assigned the directory number designation 1231. When the line No. 123 is called by dialing the number 1231, the connector responds to the fourth digit of "1" by transmitting a 66⅔ c.p.s. ringing current over the line No. 123 and the substation A is provided with ringing facilities responsive to this ringing current so that the substation A is rung during the first ringing period of each harmonic ringing cycle.

Figure 29:
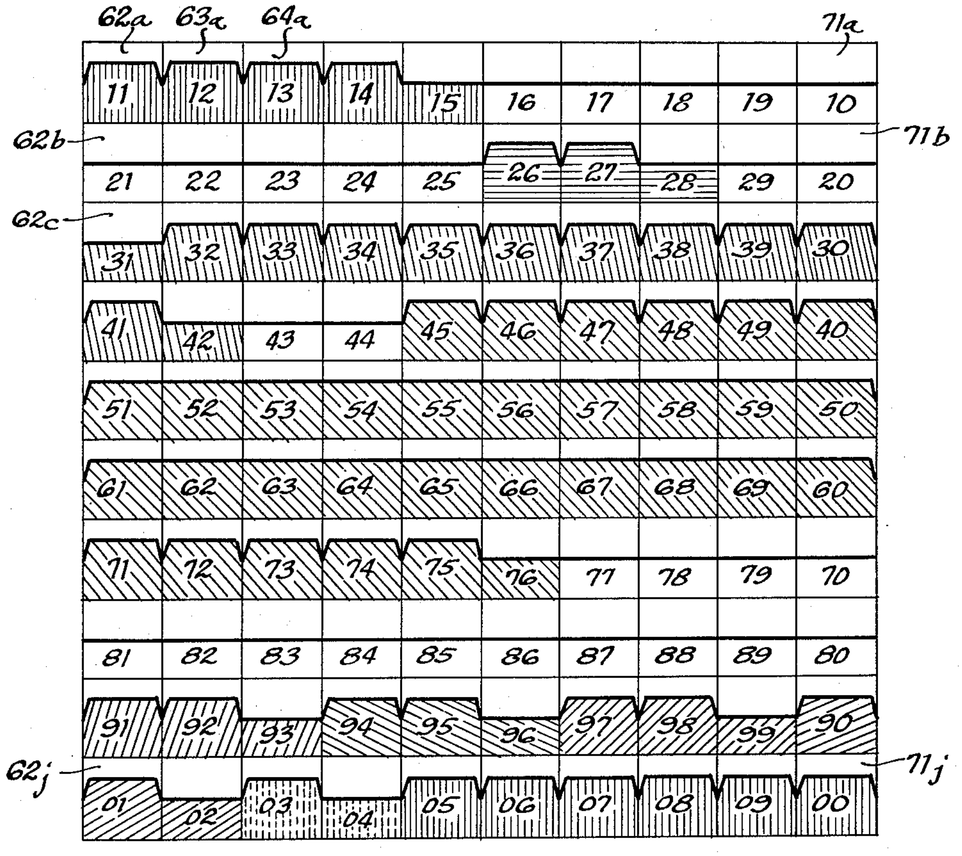

In order to render the mode of operation of the trunk hunting facilities of the present invention more readily understandable, a trunk marking pulse chart has been illustrated in Fig. 29 to show the time and phase relationship of the trunk marking pulses developed by each of the trunk marking pulse generators 194, **194*b*–194*j*, inclusive, individually associated with each hundreds line group. Referring to this figure, the one hundred time positions which comprise one pulse frame are illustrated as a series of ten horizontal strings of blocks corresponding to the ten tens digit levels of the lines in each hundreds line group of the system. In each of the blocks there is shown the last two numbers of the line which is assigned the corresponding units time position. Thus, in the first hundreds line group 12 the first units time position 62*a* in each time position frame is assigned to the line having the directory number designation No. 111, the second units time position 63*a* in each time position frame is assigned to the line having the directory number designation No. 112, the third units time position 64*a* in each time position frame is assigned to the line having the directly number designation No. 113, and the tenth units time position 71*a* is assigned to the line having the directory number designation No. 110. In the second tens digit level, the eleventh units time position 62*b* in each time position frame is assigned to the line having the directory number designation No. 121, and the twentieth units time position 71*b* in each time position frame is assigned to the line having the directory number designation No. 120. Likewise, in the tenth tens digit level the ninety-first units time position 62*j* in each time position frame is assigned to the line having the directory number designation No. 101 and the one-hundredth units time position 71***j* is assigned to the line having the directory number designation No. 100.

In order to mark certain lines of the hundreds group 12 as trunks, the trunk marking pulse generator 194*a* selects certain ones of the units pulses supplied thereto over the multiple conductor cable 31 and gates the selected units pulses by means of appropriate tens pulses supplied thereto over the multiple conductor cable 32 to provide trunk marking pulses which occur once in each time position frame in particular units pulse time positions. As will be described in more detail hereinafter, the last line in each trunk group is unmarked.

In the trunk marking pulse chart of Fig. 29 there are shown nine different trunk groups. One of these trunk groups is comprised of the lines having the directory number designations No. 132 to No. 142, inclusive, and the trunk marking pulse generator 194*a* operates to develop trunk marking pulses during each of the time positions assigned to these lines except the last line No. 142 in this trunk group. It will be evident from Fig. 29 that this trunk group includes lines which are positioned in different tens digit levels. Thus, the lines Nos. 132–139, inclusive, and No. 130 are located in the third tens digit level, whereas the lines Nos. 141 and 142 are located in the fourth tens digit level. Since the line No. 142 is the last line in this trunk group no trunk marking pulse is produced in the time position 63*d* assigned thereto. A second trunk group is shown as comprising a group of thirty-two lines starting with the line No. 145 and ending with the line No. 176. Accordingly, trunk marking pulses are produced in all of the consecutive time positions assigned to these lines except the last line No. 176. It will be noted that this trunk marking group of thirty-five lines includes lines having four different tens digit directory number designations. A third trunk group is illustrated as comprising the lines Nos. 191, 192 and 193, the lines Nos. 191 and 192 being marked by trunk marking pulses. In a similar manner, the lines Nos. 194, 195 and 196 comprise a fourth trunk group, and the lines Nos. 197, 198 and 199 comprise a fifth trunk group. The lines Nos. 190, 101 and 102 comprise a sixth trunk group, only the lines Nos. 190 and 101 being marked by corresponding trunk marking pulses produced in their respective time positions. A two-line trunk group is shown as comprising the lines Nos. 103 and 104 constituting the seventh trunk group. The eighth trunk group includes a plurality of lines in the tenth tens digit level and also a plurality of lines in the first tens digit level. Thus, the eighth trunk group comprises the lines Nos. 105 to 109, inclusive, 100, and 111–115, inclusive. It will be noted that the eighth trunk group includes lines in the last tens digit level as well as the first tens digit level so that the trunk hunting facilities of the system are capable of hunting not only through different tens digit levels but also from the last time position to the first time position, i.e., from the time position 71*j* to the time position 62*a*. A ninth trunk group is illustrated as comprising the three lines Nos. 126, 127 and 128, the lines Nos. 126 and 127 being marked by corresponding trunk marking pulses.

OPERATION OF THE SYSTEM AS A WHOLE

Considering now the general mode of operation of the one thousand line system of the present invention, it will be assumed that the party line substation G (directory No. 2322), connected to the line designated as No. 232 in the second hundreds group 13, is called from the private substation A (directory No. 1231), connected to the line designated as No. 123 in the first hundreds group 12, during a period when the finder-selector link 120 in the first hundreds group 12 is idle and the first acceptor-connector link 131 in the second hundreds group 13 is also idle. When the receiver or hand set at the substation A is lifted from its supporting hook or cradle to initiate the call, a loop circuit including the conductors of the line No. 123 is closed to the line circuit 10*a* with the result that this line circuit immediately operates to change the magnitude of the bias potential which it delivers over the conductor 54*a'* to the gating circuit of the multiplexer 11*a* which individually corresponds to the line No. 123. The multiplexer 11*a* responds to this change in magnitude of the controlling bias potential supplied thereto from the line circuit 10*a* by opening the gate corresponding to the line No. 123. Accordingly, only the multiplexer signal pulses 84*b* occurring during the pulse time position 64*b* of successive pulse frames, are permitted to pass over the common conductor 50*a* to the forward in gate circuits 307 of the selectors 120*b*, 122*b* and 124*b* in the hundreds group 12, and to the calling and called line in gate circuits 407 and 423 of the connectors 121*b*, 123*b* and 125*b* in the hundreds group 12, in parallel. The multiplexer signal pulses 84*b* occurring during the pulse time position 64*b* of successive pulse frames are also transmitted over the conductor 50*a*, through the buffer amplifier 190*a*, and over the conductor 204*a* to the pulse input circuits 300 of the finders 120*a*, 122*a* and 124*a* in the hundreds group 12. At this point, the pulses transmitted from the multiplexer 11*a* over the common conductor 50*a* in the pulse time position 64*b* may be regarded as multiplexer signal pulses 84*b*.

In the illustrated embodiment, the finder-selector links in each hundreds line group of the system are arranged in a predetermined sequence and are allotted one at a time to successive calling lines within each particular hundreds line group by means of the self-allotting circuits 306 in each of the finders. Thus, in the first hundreds group 12, only the finder-selector link 120 is conditioned by means of the self-allotting circuit 306 in the finder 120*a* to handle a call placed on a calling line within the first hundreds group 12. However, when the link 120 is taken into use, the self-allotting circuit 306 in the finder 120*a* diverts a supervisory signal to the finder 122*a* of the link 122 to condition this link to handle the next succeeding call arising in the first hundreds group 12. Accordingly, only the link 120 is conditioned to handle the first call in the hundreds group 12 and the selector 120*b* of this link is as yet inoperative so that only the finder 120*a* initially responds to the multiplexer pulses 84*b* delivered thereto from the multiplexer 11*a* over the above-described path in the pulse time position 64*b*. In this connection, it will be understood that the various hundreds line groups are isolated from each other insofar as the line finding operation is concerned and up to this point in the operation of the system the individual hundreds line groups operate as ten independent one hundred line systems.

In the finder 120*a* the multiplexer pulses 84*b* are repeated by the pulse input circuit 300 thereof to effect substantially immediate operation of the +B switching circuit 301 embodied in this finder whereby operating potential is delivered to the tubes of the circuits 309, 311, 312, 396 and 397 of the selector 120*b* over the +B switch conductor 120*c*, with the result that the selector 120*b* is conditioned for operation, i.e., conditioned to respond to signal carrying multiplexer pulses delivered thereto from the multiplexer 11*a* over the conductor 50*a*. Operation of the +B switching circuit in the finder 120*a* also has the effect of conditioning the tens and units coincidence tube circuits 303 and 304 of this finder for operation under the joint control of the multiplexer pulses 84*b* repeated by the input circuit 300, the positive tens pulses developed by the tens pulse ring circuit 21, and the positive units pulses developed by the units pulse ring circuit 20.

In responding to the tens and units pulses impressed thereon coincidentally with the multiplexer pulses 84*b*, the tens and units coincidence tube circuits 303 and 304 of the finder 120*a* cooperate with the finder pulse forming circuit 305 and the pulse combining circuit 302 of this finder to produce finder gate pulses which are transmitted over the conductor 120d to the circuits 307 and 308 of the selector 120b and have the effect of initially limiting the response of this selector only to multiplexer pulses 84b appearing in the pulse time position 64b. The combining circuit 302 of the finder 120a also gates busy pulses in the pulse time position 64b which are fed over the common busy pulse out conductor 202a to the busy pulse drive circuit 193a in the first hundreds group 12 wherein the busy pulses are amplified and supplied over the common busy pulse in conductor 203a to the finders 120a, 122a and 124a, and the connectors 121b, 123b and 125b in the first hundreds group 12 to prevent these finders and connectors in the first hundreds group 12 from responding to multiplexer pulses occurring in this time position. Thus, the line No. 123 is guarded against intrusion on an incoming call and is prevented from seizing another line finder. In addition, the pulses gated by the circuit 302 to the conductor 120d are impressed upon the pulse input circuit 300 thereby to render the finder 120a responsive only to multiplexer pulses 84b appearing in the pulse time position 64b. In this connection, it will be noted that the line busying operation is performed independently in each hundreds line group and independently of any linkage busying operation. Thus, when the line No. 123 is taken into use only the finders in the first hundreds group 12 and the connectors in this hundreds group are informed that the line No. 123 is busy. However, it will be recalled from the foregoing general description that calls intended for lines in the first hundreds group 12 can reach these lines only through one of the acceptor-connector links 121, 123 and 125, and since these links are informed of all of the busy lines in the first hundreds group 12, a complete line busying system for the entire one thousand lines of the system is provided.

Operation of the +B switching circuit 301 in the finder 120a has the further effect of causing the self-allotting circuit 306 of the finder 120a to divert the supervisory control signal, normally supplied thereto over the conductor 39, to the self-allotting circuit in the finder 122a of the next succeeding finder-selector link 122 over the conductor 36a to condition the link 122 to handle the next incoming call from one of the lines in the first hundreds group 12. In an entirely similar manner, operation of the +B switching circuit in the finder 122a of the link 122, when this link is operatively associated with the next calling line in the group 12, has the effect of diverting the supervisory control signal to the finder of the next succeeding finder-selector link so that as one link is taken into use the seized link allots the next succeeding link in the sequence to handle the next succeeding call.

After the finder 120a has operated to perform the described functions, continued holding of the finder 120a is dependent upon continued acceptance and transmission of multiplexer pulses 84b by the pulse input circuit 300 which, of course, means that the finder 120a will remain associated with the calling line No. 123 only so long as a calling condition persists on this line.

In the event that all of the finder-selector links 120, 122–124 in the first hundreds group 12 are simultaneously in use, i.e., that ten lines in the first hundreds group 12 are calling simultaneously, the all-links busy circuit 192a operates to transmit busy tone modulated pulses, appearing in the time position assigned to the line which is unable to obtain linkage in the hundreds group 12, to the distributor 15a by way of the distributor coupling circuit 191a and the distributor 15a transmits the busy tone signal to this calling subscriber to inform him that all of the available linkage is taken and that he will be unable to complete the call.

To perform this operation, the all-links busy circuit 192 is supplied with finder drive pulses from the buffer amplifier 190a by way of the conductor 204a, with busy pulses developed on the output conductor 203a of the busy pulse drive circuit 193a in the first hundreds group 12, and with a busy tone signal derived from the busy tone generator 29d in the common equipment 17 by way of the conductor 49. The busy pulses produced on the output conductor 203a of the busy pulse drive circuit 193a are employed in the all-links busy circuit 192a to cancel the finder drive pulses appearing in the same time position on the conductor 204a. Accordingly, when a calling line in the first hundreds group 12 is seized by one of the finder-selector links 120, 122–124 in the hundreds group 12, the seized finder develops busy pulses in the same time position as that assigned to the seized calling line, as described heretofore, and these busy pulses are transmitted through the busy pulse drive circuit 193a to the all-links busy circuit 192a and are employed to cancel the corresponding finder drive pulses. However, if all of the finder-selector links 120, 122–124 in the first hundreds group 12 are seized at the same time by calling lines within this hundreds group, the next calling line in this hundreds group will not be seized by a finder-selector link in this hundreds group so that no busy pulses will be produced since no finder is available to develop the busy pulses. Accordingly, since no busy pulses are transmitted to the all-links busy circuit 192a under these conditions, the finder drive pulses which appear in the unseized calling line time position are modulated with a busy tone signal derived from the conductor 49 and are transmitted over the conductor 51a, and through the distributor coupling circuit 191a to the distributor 15a wherein the busy tone signal is reconstructed and transmitted over the unseized calling line to inform the subscriber at this line that no linkage is available and that he will be unable to complete the call. In this connection, it will be understood that the all-links busy circuit 192a will operate to inform a calling subscriber that he is unable to complete the call under any conditions wherein the finder drive pulses corresponding to this calling subscriber are not cancelled by corresponding busy pulses in the same time position. These conditions may be due to all of the finder-selector linkage in the hundreds group 12 being engaged or, in the alternative, may be due to the available linkage being faulty and unable to attach itself, or further, that the linkage is out of service for repair. It will also be noted that the finder-selector link busying operation is performed independently in each hundreds line group, the all-links busy circuits 192a, 192b–192j being provided in each hundreds group to inform calling subscribers within that group of the availability of finder-selector linkage therein.

As indicated above, when the +B switching circuit 301 of the finder 120a operates to apply operating anode potential to the conductor 120c, the circuits 309, 311, 312, 396 and 397 of the selector 120b are conditioned for operation. The hundreds digit register 311 in turn supplies a bias potential to the dial tone gate circuit 325 and this circuit then functions to transmit a dial tone signal derived from the dial tone generator 29b by way of the conductor 47 to the return out gate circuit 326 over the conductor 344. The circuit 326, in responding to the dial tone signal and also to the finder gate pulses delivered thereto over the conductor 120d and the commutator drive pulses 96a delivered thereto over the conductor 35, functions to repeat over the channel conductor 51a and through the distributor coupling circuit 191a to the distributor 15a, selector signal pulses modulated in accordance with the dial tone signal in the pulse time position 64b assigned to the calling line. The distributor 15a responds to the selector signal pulses thus transmitted thereto by repeating the same through the gate circuit thereof associated with the line circuit 10a, reconstructing the dial tone and transmitting the reconstructed dial tone signal over the conductor 44a to the line circuit 10a. In the line circuit 10a the dial tone signal is transmitted over the line No. 123 to signal the calling subscriber that the dialing operation may be initiated.

The first digit of dial impulses which is dialed into the selector **120*b* is utilized to effect selection in this selector of the group of time positions assigned to the acceptor-connector links serving the called hundreds line group. More particularly, in the illustrated call to the line No. 232 in the second hundreds group 13, the first digit of dial impulses is employed to select the pulse time positions 62*b*, 63*b*, 64*b*–71*b* (Figs. 24–27, inclusive) which are assigned to the second hundreds group 13 and into which time positions calls intended for lines in the second hundreds group 13 must be shifted in order to enter this hundreds line group. Since the time positions 62*b*, 63*b*, 64*b*–71*b* are spanned by the single tens pulse 73*a*, the selection of the called hundreds line group is effected by selecting the corresponding tens pulse produced on one of the conductors 32*a*, 32–32*j*. More specifically, the directory number digit "2" must be dialed into the selector 120*b* to effect selection of the group of pulse time positions spanned by the tens pulse 72*a* assigned to the second hundreds line group 13** within which is located the called line No. 232.

During the open circuit period of each dial impulse, the control bias supplied by the line circuit **10*a* to the gate circuit of the multiplexer 11*a* which corresponds thereto is returned to its on hook value to interrupt the transmission of multiplexer pulses 84*b* to the pulse input circuit 300 of the finder 120*a* and to the in gate circuit 307 of the selector 120*b*. During the make period of each impulse dialed at the calling substation A, multiplexer signal pulse transmission from the multiplexer 11*a* to the finder 120*a*, by way of the buffer amplifier 190*a*, and to the selector 120*b* in the pulse time position 64*b* is resumed. As controlled by the finder gate pulses delivered to the circuits 307 and 308 from the circuit 302 over the conductor 120*c*, the circuits 307 and 308 function to repeat any intelligence or control signals derived from the calling line No. 123 to the dial impulse integrator circuit 309. The circuit 309 differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 309 develops coincident impulses which are impressed upon the hundreds register inverter circuit 360 over the conductor 327. The hundreds register inverter circuit 360 transmits therethrough the two impulses impressed thereon by the dial impulse integrator circuit 309 during dialing of the first digit "2" at the calling substation A, and the tens register pulser responds to these two impulses by developing two coincident register drive pulses which are supplied to the hundreds digit register circuit 311 and the hundreds sequence timing circuit 312 over the conductor 330. In responding to the two register drive pulses thus transmitted thereto, the hundreds digit register 311 is driven to a setting wherein tens pulses appearing on the positive tens pulse conductor 32*b* in the second tens pulse time position 73*a* of each pulse frame may be transmitted through the second tens gate of this register and over the conductor 332 to the selector pulse and connector busy pulse forming circuit 317**.

Transmission over the conductor 330 of the two register drive pulses individually corresponding to the two break periods of the first digit dialed at the calling substation A to the hundreds sequence timing circuit 312 has the effect of conditioning this circuit to block the hundreds pulser 310 from developing register drive pulses during dialing of the second, third and fourth digits and to render the idle pulse gate circuit 395 operative to transmit therethrough those ones of the idle pulses which are produced on the idle pulse in conductor 197 and which occur during the second tens pulse time position **73*a* of each pulse frame as selected in the hundreds digit register 311. The hundreds sequence timing circuit 312 also has the effect of enabling the connector busy lock circuit 396** to initiate a connector busy test interval as will be described in more detail hereinafter.

Immediately the first register drive pulse is repeated to the hundreds digit register 311 to drive this register off normal, a control potential is developed on the conductor 333 which biases the gate tube of the dial tone gate circuit 325 beyond cutoff such that dial tone transmission through this gate tube to the return out gate circuit 326 over the conductor 344 is terminated. Thus, transmission of the dial tone signal to the calling substation A is arrested.

While the hundreds digit register 311 is operative to select the hundreds line group which contains the called line, as indicated by the first digit dialed at the substation A, there remains to be performed the further operation of selecting an idle one of the acceptor-connector links in the called hundreds line group. Furthermore, this selection of an idle acceptor-connector link in the called hundreds line group must be performed during the interdigit pause between the first and second digits so that the dial impulses during the second, third and remaining digits may be employed in the seized acceptor-connector link to select the called line within the called hundreds line group and, if necessary, to select the party line ringing signal assigned to the called party line substation associated with the called line.

To perform the above-described seizure of an idle acceptor-connector link within the called hundreds line group, there is provided an idle pulse channel common to all of the lines of the system by means of which the idle condition of all of the acceptor-connector links of the system is indicated to all of the selectors of the system. More specifically, the acceptor-connector links serving a given hundreds line group are individually assigned different ones of the total number of time positions assigned to each hundreds line group. In the illustrated embodiment each hundreds line group is assigned a series of ten consecutive pulse time positions so that a maximum of ten acceptor-connector links may be employed in each hundreds line group, and each acceptor-connector link serving a given hundreds line group is assigned a different one of these ten pulse time positions. Thus, in the first hundreds group 12 the first acceptor-connector link 121 is assigned the first pulse time position in each pulse frame, i.e., the pulse time position **62*a*, the second acceptor-connector link 123 is assigned the second pulse time position 63*a*, and the last or tenth acceptor-connector link 125 in the hundreds group 12 is assigned the tenth pulse time position 71*a* in each pulse frame. In a similar manner, the acceptor-connector links 131, 133—135 are assigned the time positions 62*b*—71*b*** which occur during the second tens pulse period of each pulse frame. It will, therefore, be understood that in the over-all system a maximum number of one hundred acceptor-connector links may be employed, each of which is assigned a different pulse time position within the basic pulse time position frame.

In order to indicate the idle condition of each acceptor-connector link the acceptor associated with each link is equipped to produce idle pulses on the common idle pulse out conductor 198. In the illustrated embodiment these idle pulses appear on the common conductor 198 when the corresponding acceptor-connector link is idle and disappear immediately upon seizure of this link by a call forwarding selector. The idle pulses produced on the conductor 198 are coupled through the idle pulse coupling circuit 187 and transmitted over the idle pulse in conductor 197 to the idle pulse gate circuits 395 of all of the selectors of the system. With no calls in progress, the idle pulse in conductor 197 carries idle pulses which identify ten groups of ten acceptor-connector links, these idle pulses occurring in the one hundred time positions of the basic pulse time position frame.

Since the call forwarding selector 120b is not called upon to select an idle acceptor-connector link in any other than the selected hundreds line group, the idle pulse gate circuit in the selector 120b is provided to transmit therethrough only those idle pulses appearing on the idle pulse in conductor 197 which occur during the selected tens pulse time position 73a assigned to the called hundreds group 13, and the selected idle pulses which occur during the tens pulse time position 73a are transmitted over the conductor 395a to the connector coincidence tube circuit 397. The connector coincidence tube circuit 397 selects at random one of the idle pulses transmitted thereto over the conductor 395a from the idle pulse gate circuit 395 and gates to the output conductor 345 thereof units pulses which occur in the same time position as the selected idle pulse.

If no idle pulses are transmitted through the idle pulse gate circuit 395, i.e., if all of the acceptor-connector links in the called hundreds group are busy, the connector coincidence tube circuit 397 remains continuously conditioned for response to an idle pulse until the end of the connector busy test interval, preferably in the order of one-quarter of a second. At the end of the connector busy test interval, the connector busy lock circuit 396 functions to close the idle pulse gate circuit 395 so that idle pulses are no longer transmitted through this circuit to the connector coincidence tube circuit 397 and hunting for an idle acceptor-connector link in the called hundreds line group ceases. Also, at the end of the connector busy test interval, the connector busy lock circuit 396 supplies an enabling bias potential to the busy tone gate circuit 325a and this circuit then functions to transmit a busy tone signal, preferably of 120 impulses per minute, which is derived from the busy tone generator 29a by way of the conductor 49 to the return out gate circuit 326 over the conductor 344. The circuit 326 functions to repeat to the distributor 15a selector signal pulses modulated in accordance with this busy tone signal in the pulse time position 64b assigned to the calling line so that the calling subscriber is informed that all of the acceptor-connector linkage in the called hundreds line group is busy and the system is unable to complete his particular call.

In the event that one or more idle pulses are transmitted through the idle pulse gate circuit 395, indicating that one or more acceptor-connector links in the called hundreds line group are idle, the connector coincidence tube circuit 397 responds to one of these idle pulses by gating units pulses to the output conductor 345 thereof in the same pulse time position. Also, when one of the gate tubes in the circuit 397 is fired by an idle pulse, a disabling potential is transmitted over the conductor 397a to the connector busy lock circuit 396 thereby disabling the connector busy lock circuit 396 and permitting further progress of the call.

The selector pulse and connector busy pulse forming circuit 317 operates to combine the tens and units pulses respectively transmitted thereto from the hundreds digit register 311 and the connector coincidence tube circuit 397 over the conductors 322 and 345 to produce a resultant selector pulse which appears on the conductor 339. More specifically, the positive tens pulses 73a, which are transmitted to the selector pulse forming circuit 317 over the conductor 332 and represent the block of time positions assigned to the called hundreds line group 13, are combined with the positive units pulses appearing on the conductor 31a, which are gated by the coincidence tube circuit 397 and in the illustrated embodiment represent the units pulse time position assigned to the idle first acceptor-connector link 131 in the called line hundreds group 13. Mixing of these pulses in the circuit 317 results in the production of a selector pulse which occurs once during each pulse frame in the pulse time position 62b assigned to the selected idle acceptor-connector link 131. In this connection, it will be understood that if all of the acceptor-connector links in the called hundreds line group are busy, no units pulses are impressed upon the circuit 317 from the connector coincidence tube circuit 397, and no selector pulses are produced on the output conductor 339 of the selector pulse and connector busy pulse forming circuit 317 under these conditions.

The selector pulses developed by the circuit 317 are transmitted over the conductor 339 to the selector components 322, 323 and 324. The forward out gate circuit 324 responds to these selector pulses by gating certain linkage sampling pulses 96b derived from the linkage sampling pulse drive circuit 40a over the conductor 40b. More specifically, the linkage sampling pulses transmitted over the conductor 40b are gated by the selector pulses produced on the conductor 339 in the pulse time position 62b assigned to the selected idle acceptor-connector link 131 in the called hundreds line group 13 whereby very narrow selector forward signal pulses are released over the conductor 195 to the selector forward coupling circuit 186. From the selector forward coupling circuit 186 these selector forward signal pulses are transmitted over the conductor 196 to all of the connectors of the system. The forward out gate circuit 324 in the selector 120b also responds to voice and supervisory signals originating at the calling substation A and detected or reconstructed and stored in the forward reconstructor circuit 308 by modulating these voice or supervisory signals derived from the calling line reconstructor circuit 308 upon the selector forward signal pulses developed by the out gate circuit 324 in the pulse time position 62b assigned to the selected acceptor-connector link 131. Accordingly, supervisory signals, including the dial impulses constituting the second, third and fourth digits dialed at the calling substation A, are modulated upon the selector forward signal pulses produced by the forward out gate circuit 324 and impressed upon all of the connectors of the system. In addition to being transmitted to all of the connectors of the system, the selector forward signal pulses are transmitted to all of the acceptors of the system over a path which includes the conductor 195, the selector forward coupling circuit 186, the conductor 196, the acceptor drive circuit 189 and the conductor 201.

The selector pulse and connector busy pulse forming circuit 317 also operates to impress connector busy pulses appearing in the time position assigned to the selected acceptor-connector link 131 upon the connector busy pulse out conductor 205a and these connector busy pulses are transmitted through the connector busy pulse coupling circuit 205 and over the conductor 205b to all of the acceptors of the system.

Considering now the manner in which the selected acceptor-connector link 131 becomes operatively associated with the call forwarding selector 120b, it is pointed out that the acceptor 131a functions in a manner which is generally similar to the line finders of the system to condition the associated connector 131b for operative association with the call forwarding selector 120b. However, unlike a line finder, the acceptor 131a is conditioned to accept only selected forward signal pulses which occur in the particular pulse time position which is assigned to and identifies the acceptor-connector link 131 both as to the hundreds group position of this acceptor-connector link, and the order in which the acceptor-connector link occurs within its own hundreds group 13. In this connection, it will be noted that the acceptors of the system, such as the acceptors 131a, 133a—135a in the second hundreds group 13, are all continuously conditioned to accept selector forward signal pulses occurring in the respective time positions assigned thereto. Thus, a fixed allotment of the acceptors to individual pulse time positions is provided instead of the shifting allotment of finders to successive calling lines as described heretofore in connection with the finder 120a.

In the acceptor 131*a*, the connector busy pulses which are transmitted thereto over the conductor 205*b* from the connector busy pulse coupling circuit 205, are sent to the idle pulse circuit 403 (Fig. 4A) in the acceptor 131*a* to effect the immediate termination of the transmission of idle pulses to the common idle pulse out conductor 198 from the idle pulse circuit 403. As a result, idle pulses appearing in the time position 62*b* assigned to the acceptor-connector link 131, are removed from the common idle pulse out conductor 198 immediately upon selection of the acceptor-connector link 131 in the call forwarding selector 120*b*. Removal of these idle pulses from the conductor 198 is recognized by the other selectors of the system as an indication that the acceptor-connector link 131 is occupied with a call and these other selectors are, therefore, prevented from seizing the link 131 on a call incoming to the hundreds group 13.

In the acceptor 131*a* the selector forward signal pulses, which are transmitted through the acceptor drive circuit 189 and over the conductor 201, are repeated by the acceptor control gate circuit 400 to effect substantially immediate operation of the +B switching circuit 401 embodied in the acceptor 131*a*, whereby operating potential is delivered to the tubes of the circuits 409, 411, 412, 415, 416, 418, 419, 464, 465 and 485 of the associated connector 131*b* over the +B switch conductor 131*c* with the result that the connector 131*b* is conditioned for operation, i.e., conditioned to respond to signal carrying selector forward pulses delivered thereto from the call forwarding selector 120*b* over a path which includes the conductor 195, the selector forward coupling circuit 186 and the conductor 196.

The acceptor gate pulse forming circuit in the acceptor 131*a* is continuously supplied with tens pulses appearing on the conductor 32*b* in the second tens pulse time position of each pulse frame and is also supplied with units pulses appearing on the units pulse conductor 31*a* in the first units time position in each tens pulse period. These tens and units pulses are combined in the pulse forming circuit 402 to produce acceptor gate pulses which occur in the pulse time position 62*b* in each pulse frame and are transmitted over the conductor 131*d* to the circuits 407, 408 and 426 of the connector 131*b* and have the effect of continuously limiting the response of this connector only to selector forward signal pulses 82*b* appearing in the pulse time position 62*b*. These acceptor gate pulses are also supplied to the acceptor control gate circuit 400 so as continuously to condition this circuit to accept only selector forward signal pulses from the acceptor drive circuit 189 in the pulse time position 62*b*.

After the acceptor 131*a* has operated to perform the above-described functions, continued holding of the acceptor 131*a* is dependent upon continued acceptance and transmission of selector forward signal pulses 82*b* by the acceptor control gate circuit 400 which, of course, means that the acceptor will remain associated wtih the call forwarding selector 120*b* only so long as this selector continues to impress selector forward signal pulses on the conductor 195 in the time position 62*b*. However, in the acceptor-connector stage continued holding of the acceptor 131*a* is also dependent upon the conversation timing control circuit 485 in the connector 131*b* as described in more detail hereinafter.

Considering now the operation of the connector 131*b* in completing the call, it is pointed out that the entire procedure of selecting the called hundreds line group, selecting an idle acceptor-connector link within the called hundreds line group, transmitting selector forward signal pulses in the time position assigned to the selected acceptor-connector link, and operative association of the selected acceptor-connector link with the call forwarding selector all takes place during the interdigit pause between the first and second digits dialed at the calling substation A. Accordingly, by the time the second digit of dial impulses is produced at the calling substation A, the acceptor-connector link 131 is operatively associated in tandem relation with the finder-selector link 120, and the connector 131*b* is conditioned for response to the remaining digits which are dialed at this calling substation.

The second and third digits are dialed into the connector 131*b* by way of the call forwarding selector 120*b* in order to effect selection in the connector 131*b* of the pulse time position 63*c* assigned to the called line No. 232, and a fourth succeeding digit, which is called a party line ringing digit, must be dialed into the connector 131*b* in order to effect selection on a decimal basis of the particular party line ringing signal assigned to the called substation G associated with the called line No. 232 and having the directory number designation "2322" assigned thereto. In this connection, it will be understood that the fourth digit "2" is designated as a party line ringing digit, and the consecutively dialed numbers "2," "3" and "2" are respectively called the hundreds, tens and units digits of the directory number in this specification.

More specifically, the digits "3," "2" and "2" must be dialed successively into the connector 131*b* to effect selection of the pulse time position 63*c* which is assigned to the line No. 232 and to effect selection of the code #2 party line ringing signal assigned to the called substation G connected to the line No. 232. During the open circuit period of each dial impulse the control bias applied by the line circuit 10*a* to the gate circuit of the multiplexer 11*a* which serves the calling line No. 123 is returned to its on hook value to interrupt the transmission of multiplexer pulses 84*b* over the conductor 204*a* to the pulse input circuit 300 of the finder 120*a* and to the in gate circuits 307 and 323 of the selector 120*b*. During the make period of each impulse dialed at the calling substation A, multiplexer signal pulse transmission from the multiplexer 11*a* to the finder 120*a* and the selector 120*b* in the pulse time position 64*b* is resumed. As controlled by the finder gate pulses delivered to the circuits 307 and 308 in the selector 120*b* from the circuit 302 over the conductor 120*d*, the circuits 307 and 308 function to repeat any intelligence or control signals derived from the calling line No. 123 to the forward out gate circuit 324. More specifically, during the dialing operation, the reconstructed dial impulses developed by the forward reconstructor circuit 308 in the selector 120*b* are transmitted over the conductor 356*a* to the forward out gate circuit 324, and are employed in the circuit 324 to interrupt the transmission of selector forward signal pulses through the circuit 324 to the operatively associated acceptor-connector link 131 in the time position 62*b* assigned thereto. The selector 120*b* thus functions to convert multiplexer pulses 84*b* into the selector forward pulses 82*b* while preserving the interruptions in transmission of the multiplexer pulses during the dialing operation, which interruptions correspond to the dial impulses originating at the calling substation A. Thus, during each open circuit period of each dial impulse, the interruption in the transmission of the multiplexer pulses 84*b* over the conductor 50*a* is converted into a corresponding interruption in the transmission of selector forward pulses 82*b* over the conductor 195, through the selector forward coupling circuit 186, and over the conductor 196 to all of the acceptor-connector links of the system, including the acceptor-connector link 131. However, as stated heretofore, only the link 131 is conditioned to respond to selector forward signal pulses occurring in the time position 62*b*.

As controlled by the acceptor gate pulses delivered to the circuits 407 and 408 in the connector 131*b* from the circuit 402 in the acceptor 131*a* over the conductor 131*d*, the circuits 407 and 408 function to repeat any intelligence or control signals derived from the calling line No. 123 by way of the call forwarding selector 120*b* to the dial impulse integrator circuit 409 in the connector 131*b*. The circuit 409 differentiates between intelligence modulated selector forward pulses and dial impulse modulated selector forward pulses so that only the latter appear at the output terminals of this circuit. More specifically, during each dial impulse generated at the calling substation A and routed to the connector 131*b* by way of the call forwarding selector 120*b*, the impulse integrator circuit 409 develops impulses which are impressed upon the tens, units and party inverter circuits 460, 461 and 462 over the conductor 427. Pending operation of the tens sequence timing circuit 412, the units inverter circuit 461, which also performs the function of a units digit start gate, and the party inverter circuit 462, which also performs the function of a party digit start gate, are held non-responsive to the three impulses transmitted thereto by the dial impulse integrator circuit 409 during dialing of the second digit "3" at the calling substation A. However, the tens register pulser 410 responds to these three impulses repeated thereto by the tens inverter circuit 460 over the conductor 431 by developing three coincident register drive pulses of uniform amplitude and duration which are supplied to the tens digit register circuit 411 and the tens sequence timing circuit 412 over the conductor 430. In responding to the three register drive pulses thus transmitted thereto, the tens digit register 411 is driven to a setting wherein tens pulses appearing on the positive tens pulse conductor 32*c* in the third pulse time position 74*a* of each pulse frame may be transmitted through the third tens gate of this register and over the conductor 432 to the connector pulse forming circuit 417. Transmission of the three register drive pulses individually corresponding to the three break periods of the second digit dialed at the calling substation A over the conductor 430 to the tens sequence timing circuit 412 has the effect of conditioning this circuit to block the tens register pulser 410 from developing register drive pulses during dialing of the third and fourth digits and to render the units inverter circuit 461 operative to repeat the pulses delivered thereto by the dial impulse integrator circuit 409 during dialing of the third digit at the calling substation A.

During the interdigit pause which separates dialing of the second and third digits at the calling substation, the tens sequence timing circuit 412 assumes a stable operating condition wherein a controlling potential is impressed upon the conductor 434 to bias the tens register pulser 410 against developing further register drive pulses in response to impulses transmitted thereto through the tens inverter circuit 460 from the dial impulse integrator circuit 409. The above-described control potential is also supplied over the conductor 434 to the units inverter circuit 461 to render this circuit operative to repeat impulses delivered thereto from the dial impulse integrator circuit 409 to the units register pulser 414 and the units sequence timing circuit 416 over the conductor 438.

During dialing of the third digit "2" at the calling substation A, the dial impulse integrator circuit 409 responds by transmitting two impulses to each of the inverter circuits 460, 461 and 462. As noted above, however, the party inverter circuit 462 is still held non-responsive to these impulses and the tens register pulser 410 is now blocked against responding to these impulses. Thus, only the units inverter circuit 461 repeats the two impulses to the units register pulser 414 over the conductor 438 and the latter circuit responds to these impulses by developing corresponding register drive pulses of uniform amplitude and duration which are supplied to the units digit register 415 and the units sequence timing circuit 416 over the conductor 436. As a consequence, the units digit register 415 is operated or driven to open the second units gate circuit therein, thereby to establish a path for the transmission of units pulses appearing in the time positions 63*a*, 63*b*, 63*c*, et cetera, to the connector pulse forming circuit 417 over the conductor 445. The two pulses repeated to the units sequence timing circuit 416 over the conductor 436 serve to condition this circuit for operation at the end of the second digit.

During the interdigit pause which separates dialing of the third and fourth digits at the calling substation, the units sequence timing circuit 416 assumes a stable operating condition wherein a controlling potential is impressed upon the conductor 435 to bias the units register pulser 414 against development of register drive pulses in response to further impulses repeated thereto through the units inverter circuit 461 from the dial impulse integrator circuit 409. This controlling potential is also supplied over the conductor 435 to the party inverter circuit 462 to render this circuit operative to repeat impulses delivered thereto from the dial impulse integrator circuit 409 during a fourth digit to the party register pulse 463, and to the party sequence timing circuit 464 over the conductor 437. The potential impressed upon the conductor 435 is also supplied to the tens register advancer 480, the trunk hunting control circuit 483, the busy test circuit 418 and the busy lock circuit 419 to render these circuits operative to perform their respective functions as described below.

The connector pulse forming circuit 417 operates to mix the tens and units pulses respectively transmitted thereto from the registers 411 and 415 over the conductors 432 and 445 to produce a resultant connector pulse which appears on the conductors 439, 439*a*, and 439*b*. More specifically, the tens pulses 74*a* appearing on the positive tens pulse conductor 32*c* and gated by the tens digit register 411 are transmitted to the connector pulse forming circuit 417 over the conductor 432 where they are mixed with the positive units pulses appearing in the time position 63*c* which are gated by the units register 415 and transmitted to the circuit 417 over the conductor 445. Mixing of these pulses in the circuit 417 results in the production of a connector pulse which occurs during each pulse frame in the pulse time position 63*c* assigned to the called line. These pulses are transmitted over the conductor 439 to the connector components 422, 423, 424 and 483, and over the conductor 439*b* to the connector component 420. The connector pulse forming circuit 417 also operates to select one of the linkage sampling pulses 96*b* derived from the drive circuit 40*a* by way of the conductor 40*b* which occurs in the time position 63*c* assigned to the called line and the selected narrow linkage sampling pulse is transmitted to the busy test circuit 418 over the conductor 439*a*.

Effectively, the busy test circuit 418 and the busy lock circuit 419 cooperate to perform the busy test operation in the connector 131*b*. More specifically, if the called line No. 232 is busy, i.e., occupied with a call, busy pulses are present on the common busy pulse in conductor 203*b* in the hundreds group 13 in the pulse time position 63*c* assigned to this called line. The manner in which such busy pulses are repeated through the busy pulse drive circuit 193*b* in the hundreds group 13 to the conductor 203*b* from another link in the hundreds group 13 occupied with the call involving the called line No. 232 will be apparent from the foregoing explanation. These busy pulses are impressed upon the busy test circuit 418 simultaneously with linkage sampling pulses 96*b* appearing in the time position 63*c* assigned to the called line, which, as stated above, are developed by the connector pulse forming circuit 417 and impressed upon the busy test circuit 418 over the conductor 439*a*. Coincidence between the selected linkage sampling pulse and the busy pulses has the effect of preventing the busy test circuit from operating. Thus, the busy condition of the called line is indicated.

In the event the called line is busy, the busy lock circuit 419 as controlled over the conductor 435 from the units sequence timing circuit 416 measures a predetermined time interval, i.e., a called line busy test interval, following which it operates to feed a bias potential back over the conductor 448 which has the effect of positively blocking the busy test circuit 418 against subsequent operation. In operating, the busy lock circuit 419 also controls the busy tone gate of the network 425 over the conductor 450 to permit a busy tone signal to be repeated from the busy tone generator 29a by way of the conductor 46, the busy gate circuit in the network 425, the conductor 444, the calling line out gate circuit 426, the selector return coupling circuit 188, the call forwarding selector 120b, the distributor 15a and the line circuit 10a to the calling line No. 123. Thus, the calling subscriber is advised of the busy condition of the called line. In this connection, it will be understood that the busy tone generators 29a and 29d may have different impulse rates so that the calling subscriber can tell what portion of the system is busy. Thus, the busy tone generator 29d may have an impulse rate of one hundred twenty impulses per minute or two impulses per second so that the calling subscriber will know that either the finder-selector linkage in his hundreds group is busy (due to the all links busy circuit 192a) or that the acceptor-selector linkage in the called hundreds group is busy (due to the busy tone gate 325a in the call forwarding selector). On the other hand, the busy tone generator 29a may have an impulse rate of 60 impulses per minute or one impulse per second so that the calling subscriber will know that the called line is itself occupied by a call. Since the linkage busy condition usually persists for a very short interval of time, the calling subscriber is thus informed as to how long he should wait before attempting to place the same call again.

If, in the illustrated call, the called line No. 232 is idle, no busy pulse will appear in the pulse time position 63c assigned to this called line. Since coincidence between the selected linkage sampling pulse and the called line busy pulse is lacking, the busy test circuit 418 operates immediately the first linkage sampling pulse appearing in the time position 63c is impressed thereon from the connector pulse forming circuit 417 over the conductor 439a. In operating, the circuit 418 impresses a positive potential upon the cut-through conductor 451a which is applied to the busy lock circuit 419 to prevent the latter circuit from operating at the end of the busy test interval. The positive potential applied to the cut-through conductor 451a in the busy test circuit 418 when this circuit operates is also applied to the units register advancer 481 over the conductor 489 to prevent this unit from responding to trunk hunting drive pulses as will be described in more detail hereinafter. When the busy test circuit 418 operates, it also impresses a positive potential upon another cut-through conductor 451 which is applied to the called line out gate circuit 424 to condition the latter circuit to repeat connector signal pulses in the time position 63c to the distributor 15b in the called hundreds group 13, and is also applied to the busy gate circuit 420 so that busy pulses are released to the common busy pulse out conductor 202b in the time position 63c assigned to the called line No. 232. The positive potential developed on the cut-through conductor 451 is also applied to the called line in gate circuit 423 and the called line reconstructor circuit 422 thereby to condition these circuits to accept signals derived from the called line. This feature of making operation of the circuits 423 and 422 dependent upon operation of the busy test circuit to indicate that the called line is idle, is necessary in order to prevent the calling subscriber from listening in on a conversation being held on the called line when the called line is busy.

In the event the called line No. 232 tests busy and this called line is a member of one of the trunk groups discussed generally heretofore, the trunk hunting facilities in the connector 131b operate to hunt for an idle trunk within the remaining lines in the called trunk group. Effectively, the trunk hunting control circuit 483, the tens register advancer 480 and the units register advancer 481 cooperate to perform the trunk hunting operation in the connector 131b. More specifically, if the called line No. 232 is busy, i.e., occupied with a call, busy pulses are present on the common busy pulse in conductor 203b in the time position 63c assigned to the called line, and these busy pulses are impressed upon the trunk hunting control circuit together with connector pulses which also appear in the time position 63c assigned to the called line, the connector pulses being impressed upon the trunk hunting control circuit 483 over the conductor 439. Simultaneously with the transmission of busy pulses and connector pulses to the trunk hunting control circuit 483, the trunk marking pulses produced in the manner described generally above in connection with Fig. 29 in the trunk marking pulse generator 194b serving the second hundreds line group 13 are also impressed upon the trunk hunting control circuit 483 over the conductor 206b. Coincidence of these connector pulses, busy pulses and trunk marking pulses indicates that the called line is busy and is a member of a trunk group. The trunk hunting control circuit 483 responds to the coincidence between the connector pulses, the busy pulses, and the trunk marking pulses by developing a control potential which is transmitted over the conductor 488 to the units register advancer 481 to enable the advancer 481 to respond to trunk hunting drive pulses which are developed by the trunk hunting drive pulse generator 59 in the common equipment 17 and are transmitted to the units register advancer 481 over the conductor 59a. The units register advancer 481, once it is enabled, produces register drive pulses of uniform amplitude and duration in response to each trunk hunting drive pulse transmitted thereto over the conductor 58a, and each register drive pulse is transmitted to the units digit register 415 over the conductor 490. Each register drive pulse produced by the units register advancer 481 operates to advance the setting of the units digit register 415 by one time position so that the time position of the connector pulses produced on the conductor 439 by the connector pulse forming circuit 417 is advanced one units time position for each trunk hunting drive pulse impressed upon the enabled units register advancer 481. Each time the time position of the connector pulses is advanced by the units register advancer in the manner described above, the busy test circuit 418 compares the new time position of the connector pulses with the busy pulses which are impressed upon the busy test circuit 418 over the conductor 203b. If the new position of the connector pulses coincides again with busy pulses impressed upon the conductor 203b, thereby indicating that the next line in a called trunk group is busy, the busy test circuit is prevented from operating and the units register advancer 481 continues to advance the setting of the units digit register under the control of the trunk hunting drive pulses until the connector pulses are shifted to a time position in which they do not coincide with busy pulses impressed on the common busy pulse in conductor 203b or until the time position assigned to the last line in a called trunk group is reached, in which case no trunk marking pulse is present. Under these conditions, coincidence between the connector pulses, the busy pulses, and the trunk marking pulses ceases so that the trunk hunting control circuit 483 removes the control potential from the conductor 488 thus preventing the units register advancer from responding to further trunk hunting drive pulses and terminating further increase in the setting of the units digit register 415. In the event the last line in the called trunk group is busy, the busy lock circuit 419 functions in the manner described above at the end of the called line busy test interval to feed a bias potential back over the conductor 448 which has the effect of positively blocking the busy test circuit 418 from subsequent operation. However, the called line busy test interval is of sufficient duration to permit the trunk hunting facilities to advance the time position of the connector pulses in the manner described above through substantially the entire pulse time position frame, if necessary, before the busy lock circuit 419 operates to lock up the connector and advise the calling subscriber of the busy condition of all of the lines of the called line trunk group.

In order to provide for trunk hunting through a group of consecutive time positions which are positioned in different tens digit levels, facilities are provided in the units digit register 415 for recycling this register each time the register is driven beyond a setting of "10." Simultaneously therewith there is produced a control pulse in the units digit register 415 which is transmitted over the conductor 486 to the tens register advancer 480. The tens register advancer 480 responds to the pulses impressed thereon over the conductor 486 by advancing the setting of the tens digit register 411 by one tens pulse interval each time the units digit register 415 is recycled.

In order to provide for trunk hunting through a group of lines such as the eighth trunk group illustrated in Fig. 29, i.e., wherein some of the lines occur in the last tens digit level and other succeeding lines occur in the first tens digit level, the tens digit register 411 is also provided with facilities for recycling this register after it has been advanced to a setting of "10."

Considering, for example, the operation of the trunk hunting facilities during the above-described call to the line No. 232, this line is a member of the trunk group including the lines Nos. 232–239, inclusive, 230, 241 and 242. The lines Nos. 232–239 and 230 are included in the third tens digit level, whereas the lines Nos. 241 and 242 are included in the fourth tens digit level. When the two digits "3" and "2" are successively dialed into the connector 131*b*, connector pulses are produced in the time position 63*c* assigned to the line No. 232 in the manner described above. Trunk marking pulses are produced by the trunk marking pulse generator 194*b* in this same time position and if busy pulses are also impressed upon the common busy pulse in conductor 203*b* in the time position 63*c*, the coincidence of the connector pulses, busy pulses and trunk marking pulses causes the units register advancer to advance the setting of the units digit register 415 by one time position so that the connector pulses are shifted to the time position 64*c*, i.e., the time position assigned to the line No. 233. Since the line No. 233 is also marked by trunk marking pulses appearing in the time position 64*c*, the above-described coincidence may still occur if busy pulses are impressed on the conductor 203*b* in the time position 64*c*, thus indicating that the line No. 233 is also busy. Continued coincidence of the connector pulses, busy pulses and trunk marking pulses permits the units register advancer to respond to successive trunk hunting drive pulses so that the connector pulses are advanced to the time position 71*c*, i.e., the time position assigned to the line No. 230. If the line No. 230 is also busy, the coincidence between the trunk marking pulses, connector pulses and busy pulses continues and the units register advancer continues to respond to trunk hunting drive pulses. The next trunk hunting drive pulse operates to recycle the units digit register 415 and simultaneously therewith the tens digit register 411 is advanced one setting to the tens pulse time position 75*a* so that the connector pulses are shifted from the thirtieth time position in each pulse frame to the thirty-first time position, i.e., the time position 62*d* assigned to the line No. 241. If the line No. 241 also tests busy, the connector pulses are again shifted to the time position 63*d*, i.e., the time position assigned to the line No. 242. However, since the line No. 242 is not marked by a trunk marking pulse, the units register advancer is prevented from responding to further trunk hunting drive pulses and the connector pulses remain in the time position assigned to the line No. 242 regardless of the idle or busy condition of this line. If the line No. 242 is idle, the busy test circuit 418 functions in the manner described above to impress a positive potential upon the cut-through conductors 451, 451*a* and 489, whereupon the connector 131*b* continues with the placement of the call. On the other hand, if the line No. 242 also tests busy, the busy test circuit is prevented from operating and the busy lock circuit 419 operates at the end of the called line busy test interval to block the busy test circuit 418 against subsequent operation and advise the calling subscriber of the busy condition of all of the lines of the called trunk group.

Assuming that the line No. 232 is idle when called, when the called line out gate 424 is conditioned for operation through application of the described positive potential to the cut-through conductor 451, it responds to the connector pulses impressed upon the connector pulse conductor 439 by the connector pulse forming circuit 417 by gating certain linkage sampling pulses derived from the drive circuit 40*a* over the conductor 40*b*. More specifically, the linkage sampling pulses transmitted over the conductor 40*b* by the drive circuit 40*a* are gated by the connector pulses produced on the conductor 439 in the pulse time position 63*c* assigned to the called line No. 232, whereby very narrow connector signal pulses are released over the conductor 51*b* to the distributor 15*b* which are well within the limits of the pulse time position 63*c* assigned to the called line. However, it will be understood that until ringing of the called line is effected, the above-described connector signal pulses supplied to the distributor 15*b* in the pulse time position 63*c* are ineffective to establish talking communication with any of the substations associated with the called line. The positive potential applied to the cut-through conductor 451 is also impressed upon the ring trip circuit 421 to enable this circuit to terminate ringing at the proper time and is applied to the code start circuit 468.

The above-described busy test and trunk hunting operations are initiated during the interdigit pause which separates the third and fourth digits and are performed independently of the selection of a party line ringing signal. During dialing of the fourth digit "2" at the calling substation A, the dial impulse integrator circuit 409 responds by transmitting two impulses to each of the inverter circuits 460, 461, and 462. As noted above, however, the tens and units register pulsers 410 and 414 are now prevented from responding to these impulses. Thus, only the party inverter circuit 462 repeats the two impulses to the party register pulser 463 over the conductor 437 and the latter circuit responds to these impulses by developing corresponding register drive pulses which are supplied over the conductor 440 to the party digit register 465 and the party sequence timing circuit 464. As a consequence, the party digit register is operated or driven to open the second party gate circuit therein, thereby to establish a path for the transmission of the interrupted ringback tone signal (Fig. 28(14)) which corresponds to the code #2 party line ringing signal assigned to the called substation G, over the conductor 475 to the ringback tone gate tube to the network 425.

At the end of the fourth digit dialed into the connector 131*b* the party sequence timing circuit 464 operates to change the potential level on the conductor 442 to a value such that the party register pulser 463 is prevented from responding to further impulses. Concurrently, the change in potential level on the conductor 442 has the effect of rendering the code start circuit 468 operative to develop a control potential in response to the next occurring code start pulse transmitted thereto from the harmonic ringing code forming circuit 99 over the conductor 5, which control potential is impressed upon the ringback tone gate tube of the network 425 by way of the conductor 441. When this control potential is impressed upon the ringback tone gate circuit of the network 425 this circuit is rendered operative to gate the interrupted ringback tone signal corresponding to the code #2 party line ringing signal selected by the party digit register 465 to the calling line out gate circuit 426 over the conductor 444. The interrupted ringback tone signal is modulated on the signal pulses developed by the calling line out gate circuit 426 and thus is transmitted by way of the selector return coupling circuit 188 and the call forwarding selector 120*b* to the distributor 15*a* wherein the interrupted ringback tone is reconstructed and supplied to the line circuit 10*a*. In the line circuit 10*a*, the ringback tone signal, which it will be recalled consists of the two short ringing pulses 170 and 171 (Fig. 28(2)), is transmitted over the calling line No. 123 to the calling substation A. Thus, the calling subscriber is informed that the called substations F and G associated with the called line No. 232 are being rung during the ringing intervals of the code #2 party line ringing signal assigned to the called substation G. This feature of making operation of the ringback tone gate circuit dependent upon operation of the code start circuit 468 to develop a control potential is necessary in order to prevent the ringback tone gate circuit from opening in the middle of any one ringing period and gating only a portion of a given ringing signal which would result in an erroneous party line ring.

The ringback tone signal which is interrupted or keyed in accordance with the ringing intervals of the code #2 ringing signal assigned to the called substation G, and which is gated by the ringback tone gate circuit in the manner described above, is concurrently used to control the ringing operation at the line circuit 16*b* and the transmission of ringing current over the called line No. 232. Thus, the interrupted ringback tone signal gated by the ringback tone gate circuit is rectified to reproduce the code #2 party line ringing signal originally developed in the harmonic ringing code forming circuit 99 and consisting of two short ringing pulses. These ringing pulses are supplied as positive pulses over the conductor 495 to the called line out gate circuit 424 for the duration of each positive ringing pulse. The called line out gate circuit 424 is thus controlled to release connector signal pulses to the distributor 15*b* in the pulse time position 63*c* which are approximately fifty percent larger in amplitude than those used to convey intelligence signals to the distributor 15*b* after the call is answered at the called substation G. These large amplitude signal pulses are diverted by the distributor 15*b* to the line circuit 16*b* and serve to control the ringing control facilities in this line circuit. More specifically, the large amplitude connector signal pulses which appear on the conductor 51*b* during the ringing intervals of the selected party line ringing signal are detected in the distributor 15*b* so as to reproduce the ringing pulses, and the ringing pulses are impressed upon a line ringing circuit in the line circuit 16*b*. Opening of the line ringing circuit in the line circuit 16*b* during each ringing pulse results in the transmission of ringing current over the called line No. 232 during each short ringing pulse interval. Since the ringing pulses 170 and 171 (Fig. 28(2)) occur during the first ringing period when a 66⅔ c.p.s. ringing current is impressed upon the common ringing cable 61, the frequency of the ringing current transmitted to the called line No. 232 during these two short ringing intervals is 66⅔ c.p.s. As discussed generally above, the substations F and G associated with the called line 32 are both provided with ringing facilities which respond to 66⅔ c.p.s. ringing current so that both ringers at these substations are rung for two short pulses during the first ringing period of each harmonic ringing cycle. Ringing of both the party line substations F and G persists until the call is answered at the called party line substation G or until the call is abandoned at the calling substation A.

Assuming that the call is answered at the substation G, the line circuit 16*b* functions to change the magnitude of the control potential supplied over the conductor 55*b'* to the multiplexer 11*b* with the result that the gate circuit assigned to the line circuit 16*b* in the multiplexer 11*b* is opened to permit multiplexer pulses 83*c* occurring in the pulse time position 63*c* of each pulse frame to be transmitted through the multiplexer 11*b* and over the conductor 50*b* to the multiplexer input terminals of each of the selectors and connectors in the hundreds line group 13 and by way of the buffer amplifier 190*b* to each of the finders in the hundreds group 13.

The multiplexer pulses 83*c* are impressed upon the calling and called line in gate circuits 407 and 427 in the connector 131*b*. In the calling line in gate circuit 407, the repeated multiplexer pulses 83*c* are not in coincidence with the acceptor gate pulses impressed upon the circuit 407 over the conductor 131*d* and, hence, are not repeated to the reconstructor circuit 408. However, in the called line in gate circuit 423 the multiplexer pulses 83*c* occur in time coincidence with the connector pulses impressed upon the circuit 423 over the connector pulse conductor 439 from the connector pulse forming circuit 417. As a consequence, the call answering signal carried thereby is gated to the reconstructor circuit 422 where it is detected to produce a potential on the conductor 452 which has the effect of tripping the ring trip circuit 421.

In operating, the ring trip circuit 421 functions to develop a positive potential on the ring trip conductor 453 which has the effect of closing the ringback tone gate circuit in the network 425 with the result that transmission of the interrupted or coded ringback tone signal to the calling substation is arrested. The called line out gate circuit 424 responds to the closure of the ringback tone gate circuit in the network 425 by decreasing by approximately fifty percent the amplitude of the connector signal pulses transmitted over the conductor 51*b* to the distributor 15*b*. The ringing control facilities of the line circuit 16*b* respond to this decrease in the amplitude of the connector signal pulses delivered thereto by terminating the transmission of ringing current to the called substation G. Thus, the ringing operation is arrested.

The positive potential produced on the ring trip conductor 453 also has the effect of conditioning the conversation timing control circuit 485 for operation at the end of a predetermined conversation timing period. The positive potential on the conductor 453 also has the further effect of supplying anode potential to the conversation timing warning tone gate tube in the conversation timing warning tone circuit 484. This potential also is supplied over the conductor 453 to the party digit register 465 to reset this register to zero, and is further applied to the party register advancer 482 over the conductor 453 to condition this circuit to respond to conversation timing pulses which are developed in the conversation timing pulse generator 57 and supplied over the common conductor 57*a* to the party register advancers 482 in each of the connectors of the system.

Following the described operations in the selector 120*b* and the connector 131*b*, a two-way talking or communication circuit is fully established between the calling substation A in the first hundreds group 12 and the party line called substation G in the second hundreds group 13. Thus, voice or other signals developed at the substation A and transmitted over the line No. 123 to the line circuit 10*a* serve to vary directly the bias voltage impressed upon the corresponding gate circuit of the multiplexer 11*a* over the conductor 54*a* in accordance with the instantaneous amplitude of such signals. As a consequence, the multiplexer pulses 84*b* released by the multiplexer 11*a* over the conductor 50*a* to the selectors of the system in the pulse time position 64*b* are modulated in accordance with the voice or other signals developed at the calling substation A. These signal modulated multiplexer pulses cannot be accepted by any finder in the hundreds line group 12 other than the finder 120*a*, or any selector in the hundreds line group 12 other than the selector 120*b*, or any connector in the hundreds line group 12 because of the busy pulses fed to the busy pulse out conductor 202*a* from the circuit 302 in the finder 120*a*. In the finder 120*a* the multiplexer pulses 84*b* maintain the +B switching circuit 301 operated to hold the link 120 associated with the line circuit 10*a*.

The signal modulated multiplexer pulses 84*b* are also transmitted through the forward in gate circuit 307 in the selector 120*b* and over the conductor 355 to the forward reconstructor circuit 308 where they occur in time coincidence with the finder gate pulses impressed upon the reconstructor circuit over the conductor 120*d* in the pulse time position 64*b*. As a consequence, the voice signal components thereof are detected or reconstructed and stored in the reconstructor circuit 308. This stored signal information is impressed upon the forward out gate circuit over the conductor 356. In the forward out gate circuit the signals derived from the reconstructor circuit 308 are modulated upon the selector forward signal pulses developed by the out gate circuit 324 in the pulse time position 62*b* assigned to the selected acceptor-connector link 131 in the second hundreds group 13. The signal modulated selector forward pulses 82*b* are released by the selector 120*b* to the acceptors and connectors of the system over a path which includes the conductor 195, the selector forward coupling circuit 186, and the conductor 196. These signal modulated selector forward pulses cannot be accepted by any acceptor of the system other than the acceptor 131*a* or any connector of the system other than the connector 131*b* because each acceptor-connector link is conditioned to respond only to selector forward pulses occurring in the time position assigned thereto as determined by the acceptor gate pulse forming circuit 402 in each of the acceptors of the system. In the acceptor 131*a* the selector forward pulses 82*b* maintain the +B switching circuit 401 operated to hold the acceptor-connector link 131 associated with the call forwarding selector 120*b*. The signal modulated selector forward pulses 82*b* are also transmitted through the calling line in gate circuit 407 in the connector 131*b* and over the conductor 455 to the calling line reconstructor circuit 408 where they occur in time coincidence with the acceptor gate pulses impressed upon the reconstructor circuit over the conductor 131*d* in the pulse time position 62*b*. As a consequence, the voice signal components thereof are detected or reconstructed and stored in the reconstructor circuit 408. This stored signal information is impressed upon the called line out gate circuit 424 over the conductor 456. In the called line out gate circuit 424 the signals derived from the calling line reconstructor circuit 408 are modulated upon the signal pulses developed by the out gate circuit 424 in the time position 63*c* assigned to the called line No. 232. These modulated connector signal pulses are transmitted to the distributor 15*b* over a path which includes the conductor 51*b* and the distributor coupling circuit 191*b* wherein the signal components of the connector signal pulses are detected and released by the distributor 15*b* to the line circuit 16*b*. In the line circuit 16*b* the detected signals are transmitted over the line No. 232 to the called substation G where they are audibly reproduced by the receiver of the instrument provided at this substation.

Voice signals developed at the called party line substation G and transmitted over the line No. 232 to the line circuit 16*a* cause the bias potential delivered over the conductor 55*b* to the corresponding gate circuit of the multiplexer 11*b* to vary in exact accordance therewith. As a consequence, these voice signals are modulated upon the multiplexer pulses 83*c* occurring within the pulse time position 63*c* assigned to the called line No. 232 and are released through the gate circuit of the multiplexer 11*b* and over the conductor 50*b* to the selectors and connectors in the second hundreds group 13 and by way of the buffer amplifier 190*b* to the finders in the hundreds group 13. These pulses cannot be accepted by any finder in the second hundreds group 13 for the reason that busy pulses, fed to the busy pulse out conductor 202*b* in the time position 63*c* assigned to the called line No. 232 by the busy gate circuit 420 of the connector 131*b* in the second hundreds group 13, prevent all of the finders in the second hundreds group 13 from accepting or responding to the described multiplexer pulses appearing in the time position 63*c*.

In the connector 131*b* the signal modulated multiplexer pulses 83*c* are impressed upon the calling and called line in gate circuits 407 and 423 and are repeated by the circuit 423 over the conductor 454 to the called line reconstructor circuit 422. Due to lack of coincidence between the signal bearing multiplexer pulses 83*c* and the acceptor gate pulses impressed upon the calling line in gate circuit 407 over the conductor 131*d*, the circuit 407 does not gate these pulses to the reconstructor circuit 408. By virtue of the coincidence between the signal bearing multiplexer pulses 83*c* and the connector pulses appearing coincidentally on the conductor 439, both of which are impressed upon the called line reconstructor circuit 422, this circuit detects or reconstructs and stores the voice signal components carried by the multiplexer pulses 83*c*. The signals thus detected by the reconstructor circuit 422 are impressed upon the calling line out gate circuit 426 over the conductor 457. In the out gate circuit 426 the voice signals modulate the selector return pulses developed in this circuit by gating of the linkage sampling pulses impressed on this circuit over the conductor 40*b* by the acceptor gate pulses impressed on the circuit 426 over the conductor 131*d*.

The signal modulated selector return pulses developed in the calling line out gate circuit 426 are released by the connector 131*b* to all of the selectors of the system over a path which includes the conductor 200, the selector return coupling circuit 188 and the conductor 199. These signal modulated selector return pulses cannot be accepted by any selector of the system other than the selector 120*b* because only the selector 120*b* is conditioned to respond to selector return pulses in the time position assigned to the seized acceptor-connector link 131, and the idle pulses appearing in the time position 62*b* assigned to the acceptor-connector link 131 are removed from the idle pulse in conductor 197 to prevent any other finder-selector links from seizing the acceptor-connector link 131.

In the selector 120*b* the signal modulated selector return pulses 82*b* are impressed upon the return in gate circuit 323 and are repeated by this circuit over the conductor 354 to the return reconstructor circuit 322. By virtue of the coincidence between the signal bearing selector return pulses 82*b* and the selector pulses appearing coincidentally on the conductor 339, both of which are impressed upon the return reconstructor circuit 322, this circuit detects or reconstructs and stores the voice signal components carried by the selector return pulses 82*b*. The signals thus detected by the reconstructor circuit 322 are impressed upon the return out gate circuit 326 over the conductor 344. In the out gate circuit 326 these voice signals modulate the pulses developed in this circuit through gating of the linkage sampling pulses 96*b* impessed on the circuit over the conductor 40*b* by the finder gate pulses impressed on the circuit over the conductor 120*d*. The voice signal modulated pulses developed in the return out gate circuit 326 are supplied to the distributor 15*a* over a path which includes the conductor 51*a* and the distributor coupling circuit 191*a*, and the signal components thereof are detected in the distributor 15*a* and released to the line circuit 10*a*. In the line circuit 10*a* the detected signals are transmitted over the line No. 123 to the calling substation A where they are audibly reproduced by the receiver of the telephone instrument provided at this substation.

As will be apparent from the foregoing explanation, a fully complete two-way talking circuit is established between the calling and called line substations. Moreover, this circuit effectively comprises two mutually non-interfering channels between the calling line No. 123 in the first hundreds group 12 and the called line No. 232 in the second hundreds group 13 such that voice signals simultaneously produced at both substations will be transmitted without interference through the switching equipment of the system to the appropriate destination point or substation.

As stated generally heretofore, the party register advancer 482 in the connector 131*b* is conditioned to respond to conversation timing pulses impressed upon the conductor 57*a* immediately after tripping of the ring trip circuit 421 when the called party answers. Concurrently with the conditioning of the party register advancer 482, the party digit register 465 is reset to zero since this register is no longer required for the gating of a ringback tone signal after the called party answers and a two-way talking circuit is established in the manners described above. The conversation timing pulses are produced at periodic intervals and the party register advancer 482 responds to each conversation timing pulse by producing a register drive pulse which is supplied to the party digit register 465 over the conductor 491 to advance this register one step for each conversation timing pulse. The conversation timing pulses may occur, for example, at forty-second intervals so that the party digit register 465 is advanced one stage for each forty-second interval of the call. When the ninth counting tube of the party digit register 465 is extinguished by the tenth conversation timing register drive pulse produced by the party register advancer 482, a positive potential is developed on the conductor 492 which is transmitted to the conversation timing warning tone circuit 484.

The conversation timing warning tone circuit 484 responds to the positive potential developed on the conductor 492 by releasing a warning tone signal derived from the conversation timing warning tone generator 58 in the common equipment 17 by way of the conductor 58*a*, to the calling line out gate circuit 426 over the conductor 444. This warning tone signal is also released by the conversation timing warning tone circuit 484 to the called line out gate circuit 424 by way of the conductor 494. The warning tone signal transmitted to the calling line out gate circuit 426 is modulated on the selector return signal pulses developed by this circuit and thus is transmitted by way of the selector return coupling circuit 188 and the call forwarding selector 120*b* to the distributor 15*a* wherein the warning tone signal is reconstructed and supplied to the line circuit 10*a*. In the line circuit 10*a* the warning tone signal is transmitted over the calling line No. 123 to the calling substation A. The warning tone signal transmitted to the called line out gate circuit 424 is used to modulate the connector signal pulses developed by this circuit which are transmitted over the conductor 51*b*, through the distributor coupling circuit 191*b* to the distributor 15*b* and this warning tone signal is detected in the distributor 15*b* and supplied by way of the line circuit 16*b* to the called substation G. As a result, both the calling and called subscribers are informed by means of the above-described warning tone signal that the conversation timing period is almost over and that they have approximately forty seconds in which to complete the call.

When the tenth counting tube in the party digit register 465 is extinguished by the eleventh conversation timing register drive pulse produced by the party register advancer 482, a positive potential is developed on the conductor 493 which is transmitted to the conversation timing control circuit 485. The circuit 485 responds to the above-described potential produced on the conductor 493 by developing a conversation timing extinguishing pulse which is transmitted over the conductor 131*e* to the acceptor 131*a* wherein this pulse is transmitted to the +B switching circuit 401 to effect release of this circuit as will be described in more detail hereinafter.

In describing the manner in which the system components 10*a*, 11*a*, 120, 131, 15*b* and 16*b* are partially or wholly released upon termination of the call by either party and independently of the above-described conversation timing facilities, it may be assumed first that the called party at the party line substantion G is the first to hang up. In such case, the bias potential delivered from the line circuit 16*b* over the conductor 55*b* to the corresponding gate circuit of the multiplexer 11*b* is restored to its normal value when the called line loop circuit is opened with the result that multiplexer pulses 83*c* appearing in the time position 63*c* are no longer transmitted over the conductor 50*b* to the finders, selectors and connectors in the second hundreds group 13. Such termination of multiplexer pulse transmission in the time position 63*c* to the linkage in the second hundreds group 13 has no effect other than that of inactivating the connector components 423 and 422 and the removal of modulation components from the selector return pulses transmitted by way of the circuit 426 to the call forwarding selector 120*b*. Busy pulses in the time position 63*c assigned to the called line continue to be fed to the busy pulse out conductor 202***b* in the second hundreds group 13, from the busy gate circuit 420 of the connector 131*b*, thereby to prevent substations associated with the called line No. 232 from originating a call or accepting an incoming call. This, of course, means that if the subscriber at the substation G picks up his receiver or hand set before the connection is released at the calling substation A, a two-way talking circuit between the calling and called lines is re-established.

When the calling line subscriber disconnects by replacing the receiver or hand set at the substation A on its supporting hook or cradle, the loop circuit extending by way of the line No. 123 to the line circuit 10*a* is opened with the result that the bias potential supplied over the conductor 54*a'* to the corresponding gate circuit of the multiplexer 11*a* is restored to its normal value. As a consequence, this gate circuit is biased to terminate the transmission of multiplexer pulses 84*b* occurring in the pulse time position 64*b* over the conductor 50*a* to the finders, selectors, and connectors in the first hundreds group 12. When the transmission of multiplexer pulses 84*b* to the pulse input circuit 300 of the finder 120*a* is thus terminated, this circuit is rendered inactive to repeat pulses to the finder circuits 301, 303 and 304. After a predetermined time interval measured by the overall time constant of the +B switching circuit 301, this circuit responds to cessation of multiplexer pulse transmission thereto by removing the operating potential from the conductor 120*c*. As a consequence, the tens and units coincidence tube circuits 303 and 304 of the finder 120*a* are restored to normal to interrupt the production of finder gate and busy pulses in the pulse time position 64*b* by the finder pulse forming circuit 305. Thus, the application of pulses to the combining circuit 302, and hence to the busy pulse out conductor 202*a* in the pulse time position 64*b* assigned to the calling line No. 123, is arrested. Removal of operating potential from the conductor 120*c* has the effect of rendering the self-allotting circuit 306 of the finder 120*a* operative to reassociate the finder-selector link 120 with another calling line in the first hundreds group 12 to handle another call on one of these lines. Cessation of busy pulse transmission to the busy pulse out conductor 202*a* in the pulse time position 64*b* has the effect of marking the calling line No. 123 as idle to permit initiation of a second call on this line or seizure of the line on a call incoming thereto.

Removal of operating potential from the conductor 120c also has the effect of restoring the component circuits 309, 311, 312 and 397 of the selector 120b to normal thereby to condition the selector 120b to handle another call. Concurrently therewith selector forward pulse production on the conductor 195 in the pulse time position 62b assigned to the acceptor-connector link 131 is terminated, and connector busy pulse transmission over the conductor 205a is likewise terminated.

When the transmission of connector busy pulses in the time position 62b assigned to the acceptor-connector link 131 is thus terminated, the idle pulse circuit 410 in the acceptor 131a is returned to normal so that idle pulses appearing in the time position 62b assigned to the link 131 are produced on the idle pulse out conductor 198 and are transmitted to all of the selectors of the system to inform these selectors that the link 131 is free for use in completing another call to one of the lines in the second hundreds group 13.

When the transmission of selector forward pulses 82b to the acceptor control gate circuit 400 of the acceptor 131a is thus terminated, this circuit is rendered inactive to repeat pulses to the +B switching circuit 401 and after a predetermined time interval, measured by the overall time constant of the +B switching circuit 401, this circuit responds to the cessation of selector forward pulse transmission thereto by removing operating potential from the conductor 131c. Removal of operating potential from the conductor 131c has the effect of restoring the component circuits 409, 411, 412, 415, 416, 418, 419, 464, 465 and 485 of the connector 131b to normal thereby to condition this connector to handle another call incoming to the hundreds group 13. It will be noted that normalizing of the circuits of the connector 131b has the effect of restoring the components of this connector to the condition which prevailed at the time the acceptor-connector link 131 was taken into use to complete the call just described. It will further be noted that when the calling subscriber is the first to release the connection, the finder-selector link 120 is immediately released under the control of the +B switching circuit 301 embodied in the finder 120a and the acceptor-connector link 131 is also released so that the called line No. 232 in the hundreds group 13 is no longer busied. However, in such case the line circuit 16b associated with the called line No. 232 immediately assumes a setting indicating that the line No. 232 is calling with the result that an idle one of the finder-selector links 130, 132 and 134 in the second hundreds group 13 is reassigned to the called line No. 232 under the control of the self-allotting circuits thereof, and the usual dial tone signal is returned to the subscriber at the line No. 232. This signal has the effect of indicating to this subscriber that the connection has been released at the calling substation and that he should hang up.

As will be evident from the immediately preceding explanation, the key components involved in effecting release of the tandem connected finder-selector link 120 and the acceptor-connector link 131 in the illustrated call, either automatically at the end of the conversation timing interval or under the control of the calling or called line subscribers, are the +B switching circuit 301 in the finder 120a and the +B switching circuit 401 in the acceptor 131a. So long as multiplexer pulses are repeated to the switching circuit 301 by the pulse input circuit 300 in the time position assigned to the calling line, this circuit positively prevents release of the finder-selector link 120 and holds the calling line out of service, i.e., prevents use of the same in initiating outgoing calls or accepting incoming calls. In the same manner, so long as selector forward pulses are repeated to the +B switching circuit 401 in the acceptor 131a by the acceptor control gate circuit 400 in the time position assigned to that particular acceptor-connector link, the circuit 401 positively prevents release of the acceptor-connector link 131 and holds the called line in the called line group out of service, i.e., prevents use of the same in initiating outgoing calls or accepting incoming calls. However, when either multiplexer pulse transmission or selector forward pulse transmission is arrested for a period of time greater than approximately one-fourth of a second, the controlled switching circuit immediately effects release of the associated link regardless of the extent of progress of the call and regardless of whether or not the connection has been released at the called substation. This normalizing of the +B switching circuits 301 and 401 will effect release of the links 120 and 131 upon abandonment of the call which the links are assigned to handle at any point in the progress of setting up the desired connection.

In the event that the conversation timing period expires and the conversation timing control circuit 485 in the connector 131b is operated, this circuit produces a conversation timing extinguishing pulse which is transmitted to the +B switching circuit 401 in the acceptor 131a over the conductor 131e, more particularly to the cathode of the +B switch tube 1909 (Fig. 19) in the circuit 401, so that operating potential is removed from the conductor 131c and the component circuits 409, 411, 412, 415, 416, 418, 419, 464, 465 and 485 of the connector 131b are restored to normal and all gas tubes in these circuits are de-ionized. However, since the selector 120b continues to transmit selector forward pulses in the time position 62b assigned to the acceptor-connector link 131b, the acceptor-connector link 131 is reseized and the +B switching circuit 401 in the acceptor 131a is refired to again produce operating potential on the conductor 131c. However, since all of the indicated circuits in the connector 131b have been returned to normal, the talking paths therethrough are permanently interrupted so that the two-way talking connection is broken. Furthermore, since the busy gate circuit 420 in the connector 131b no longer transmits busy pulses in the time position 63c assigned to the called line No. 232 to the other linkage in the second hundreds group 13, the line circuit 16b immediately assumes a setting indicating that the line No. 232 is calling, with the result that an idle one of the finder-selector links 130, 132 and 134 in the second hundreds group 13 is reassigned to the called line No. 232 and the usual dial tone signal is returned to the called subscriber thereby indicating that the connection has been released at the end of the conversation timing interval and that he should hang up. When the two-way talking circuit between the calling and called substations is broken in the manner described above at the end of the conversation timing interval, the calling subscriber does not hear a busy tone but instead is informed that the connection is broken by the silence at the other end of the line.

DETAILED DESCRIPTION OF THE SYSTEM

In considering the detailed circuitry of the system components briefly described above, operation of these components will be analyzed insofar as possible in terms of functions which they perform in establishing the above-described connection between the substation A and the substation G in response to the call initiated at the substation A. Before considering the details of the system components, however, it is pointed out generally that corresponding reference characters have been used throughout the drawings to identify corresponding circuit elements of the system. It is also pointed out that all pulse carrying conductors, such, for example, as the signal pulse transmission conductors 50a and 51a are in the form of coaxial cables or transmission lines having low pulse attenuating properties at the pulse frequencies employed. In certain instances, the coaxial cables provided to connect two or more components of the system have been illustrated, but it should also be remembered that all of the other illustrated pulse carrying conductors are of the proper type. On the other hand, all illustrated conductors which function as direct current potential or audio signal carrying conductors are in the form of open or shielded wire.

Throughout the following detailed description of the system, the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular system component, those circuit elements which perform entirely conventional functions in the circuits, namely, functions which will be readily understood by those skilled in the art, have not been identified in the drawings or referred to in the following description of the system components.

As used in this specification, the terms "electronic" and "electronic means" refer to and are intended to define means comprising electron conducting devices, such, for example, as electron tubes, gas tubes, crystal rectifiers, semi-conductors and the like, together with interconnecting circuit components therefor, and to exclude all electromechanical devices embodying moving mechanical parts such, for example, as relays, stepping switches, and the like.

Also, in order to reduce the complexity of this specification those system components which are substantially identical to the corresponding system components of the co-pending application of Robert B. Trousdale and Frank A. Morris, Serial No. 134,974, filed December 24, 1949, and assigned to the same assignee as the present invention, or the corresponding system components of the co-pending application of Robert B. Trousdale, Serial No. 301,215, filed on July 28, 1952, and assigned to the same assignee as the present invention, will be only briefly described in this specification, reference being had to these co-pending applications for a complete and detailed description of the particular system components. Furthermore, the master oscillator 18, the phase shifter and pulse former 19, the pulse forming circuit 19*a*, the commutator drive circuit 25, the units pulse ring circuit 20, the tens pulse ring circuit 21 and the channel pulse commutator 22 may all be substantially identical to the corresponding system components described in detail in the co-pending application of Robert B. Trousdale, Serial No. 263,264, filed December 26, 1951, and reference may be had to this application for a complete and detailed description of these system components.

*Busy tone generator 29a*

This generator is identical to the corresponding system component described in detail in the co-pending application, Serial No. 134,974, identified above and is provided for the purpose of supplying a signal voltage which is utilized in signalling calling subscribers when the lines to which calls are routed are tested and found busy.

*Busy tone generator 29d*

This generator is identical to the busy tone generator 29*a* except for the fact that the audible tone signal is interrupted at a rate of one hundred twenty impulses per minute instead of at a rate of sixty impulses per minute as in the busy tone generator 29*a*. In other respects, the generators 29*a* and 29*d* are identical. It will be recalled that the 120 I.P.M. busy tone signal is employed in the selector stages of the equipment and also in the all links busy circuits 192*a*, 192*b*–192*j* to inform the calling subscribers either that no finder-selector linkage is available in the calling line hundreds group or that no acceptor-connector linkage is available in the called line hundreds group.

*Dial tone generator 29b*

This generator is identical to the corresponding system component described in detail in the co-pending application, Serial No. 134,974, identified above, and is provided for the purpose of producing a signal voltage which is employed to signal calling subscribers that dialing operations may be initiated. The circuitry of this generator is uniquely arranged to produce a wobbly dial tone signal, i.e., a one-hundred-eighty-cycle signal modulated at fifteen cycles which accurately simulates dial tone signals of similar character commonly in use at the present time.

*Ringback tone generator 29c*

This generator is substantially identical to the corresponding system component described in detail in the co-pending application, Serial No. 134,974, identified above, and is provided for the purpose of generating a low frequency signal voltage which is used to signal a calling substation that a called substation is being rung. More particularly, this generator is designed to produce a signal voltage having a frequency of approximately two hundred cycles per second to which is added a lower frequency component of approximately twenty cycles per second. However, the output of the ringback tone generator 29*c* of the present invention is supplied over the conductor 27*b* to the harmonic ringing modulator circuit 100, whereas in the co-pending application, Serial No. 134,974, identified above, the output of the ring back generator 29*c* is supplied to a ringing keying circuit to provide the conventional ringing sequence of one second on and four seconds off. In the system of the present invention, the continuous wave output of the ringback tone generator 29*c* is gated in the modulator circuit 100 in the manner described generally above to provide two different ringback tone signals during each of the five harmonic ringing periods in each ringing cycle, as determined by the harmonic ringing code forming circuit 99.

*Supervisory carrier supply circuit 26*

This circuit is identical in many respects to the corresponding system component described in detail in the co-pending application, Serial No. 134,974, identified above, and is provided to produce a sine wave signal voltage which is in synchronism with the master oscillator 18 and has a frequency of approximately one hundred kiloclycles which is supplied to the various line circuits of the system over the common conductor 37 for call forwarding operations in the manner described more fully below. However, in the supply circuit 26 of the present invention a supervisory carrier drive circuit is included in the circuit 26 to provide a relatively high power low impedance drive source from which the sine wave signal voltage of the circuit 26 may be supplied to all of the finders of the system to permit a self-allotment of the finder-selector links of the system to calling lines within the associated hundreds line group. The supervisory carrier drive circuit embodied in the supply circuit 26 is substantially identical to the corresponding portion of the system component identified as the "link coupling circuits 24" disclosed and described in detail in my co-pending application, Serial No. 257,712, filed on November 23, 1951, and assigned to the same assignee as the present invention.

*Selector allotting circuit 20b*

As described generally heretofore, this circuit is provided for the purpose of allotting the selectors of the system so that two or more selectors which are handling calls intended for the same hundreds line group do not select the same idle pulse and hence are prevented from setting up a double connection. In this connection, it will be understood that the selector allotting circuit 20*b* in the illustrated embodiment wherein ten percent trunking is provided, has one hundred output conductors 20–1, 20–2, 20–3 to 20–100, inclusive, one for each selector of the system. However, if a fewer number of selectors is employed, the circuit 20*b* may have correspondingly fewer output conductors.

The details of the circuit **20*b* are shown in Fig. 33 of the drawings. Referring to this figure, a selector allotting circuit 20*b* comprises an input tube 3300, a pulser tube 3301, a series of one hundred switching tubes connected in endless series to form a one hundred tube ring circuit, of which the first tube 3302, the second tube 3303, the third tube 3304 and the one hundredth tube 3305 are shown in the drawings, and a series of one hundred cathode follower output tubes which are individually controlled by the switching tubes of the ring circuit, the first output tube 3306, the second output tube 3307, the third output tube 3308, and the one hundredth output tube 3309 being illustrated in Fig. 33. The tubes 3300, 3301 and 3306–3309, inclusive, are preferably of the commercial type 6C4, and the switching tubes 3302–3305**, inclusive, are preferably of the secondary emission type such as disclosed in Skellett Patent No. 2,293,177.

The one hundred tube ring circuit in the selector allotting circuit **20*b* is generally similar to the ring circuit described in the prior patent of Robert B. Trousdale, No. 2,512,984, and reference may be had to this patent for a detailed description thereof. However, for the purposes of the present invention, it may be stated that any tens pulse produced by the tens pulse ring 21 may be employed to derive ring drive pulses which occur at the rate of one pulse for each time position frame. In the illustrated embodiment, the tenth tens pulse 81*a*, appearing on the conductor 32*j*, is coupled through the condenser 3310 to the control grid of the tube 3300 and is repeated across the cathode resistor 3311 of this tube. The pulser tube 3301 is arranged as a blocking oscillator and produces relatively sharp positive pulses across the output winding 3312 thereof in response to each pulse repeated to the control grid thereof from the resistor 3311. A rectifier 3313 blocks the negative overshoot from the ring drive pulses produced across the winding 3312 and these pulses are coupled through the condenser 3314 to the common ring drive conductor 3315 of the one hundred tube ring circuit. Each ring drive pulse has the effect of cutting off all of the tubes of the ring circuit for the duration of the pulse. If it is assumed that the tube 3302 was conducting just prior to a given ring drive pulse, it will be seen that all other switching tubes are prevented from conducting due to the flow of current from the tube 3302 through the common cathode resistance 3316 and 3317. However, when the tube 3302 is cut off by a ring drive pulse in the conductor 3315, the potential increase at the first anode 3302*a* thereof is coupled through the condenser 3318 to the control grid of the next tube 3303 in the ring and after the ring drive pulse has disappeared from the conductor 3315 has the effect of rendering the tube 3303 conductive. The tube 3303 is held fully conductive by means of the feedback network 3319, connected between the dynode 3303*b* and the control grid of the tube 3303, until the next ring drive pulse appears on the conductor 3315 at which time the tube 3303 is cut off and the cycle is repeated. It will thus be evident that the tubes 3302–3305, inclusive, are sequentially rendered conductive for one time position frame out of every hundred time position frames and positive selector allotting pulses of this duration may be derived from the dynodes 3302*b*, 3303*b*, et cetera, of these tubes. These positive allotting pulses are respectively transmitted to the control grids of the output tubes 3306–3309, inclusive, and are sequentially developed on the output conductors 20–1, 20–2, 20–3 to 20–100 thereof. Accordingly, the selectors of the system are sequentially allotted during the selection of an idle acceptor-connector link so that double connections are avoided. Thus, during the period when an allotting pulse is produced on the conductor 20–1, the selector 120*b*** is permitted to select an idle acceptor-connector link in the called hundreds line group and all other selectors of the system are prevented from selecting a link during this period.

In the event that it is desired to space the selector allotting pulses apart so as to give the seized acceptor time to remove its idle pulse from the common idle pulse out conductor 198, the number of tubes in the ring circuit may be increased and the output conductors 20–1, 20–2 to 20–100 connected only to spaced ones of the switching tubes so that spaced allotting pulses are sequentially supplied to the selectors of the system. Such an arrangement may be desired, for example, if the +B switching circuit 401 in the seized acceptor is employed to control removal of the idle pulses from the idle pulse conductor 198, since the circuit 401 provides a certain time delay before it operates, as will be described in more detail in connection with the acceptor **131*a***.

*Harmonic ringing oscillator 97*

This circuit is identical to the corresponding system component described in detail in my co-pending application, Serial No. 301,215, identified above, and is designed to provide a highly accurate and stable reference frequency which may be used to derive the five different ringing frequencies employed in the harmonic ringing system described generally above. Preferably, the oscillator 97 has a frequency of 1200 c.p.s. and the output thereof is transmitted over the conductor 102 to the harmonic frequency generator 98.

*Harmonic ringing frequency generator 98*

This circuit is identical to the corresponding system component described in detail in my co-pending application, Serial No. 301,215, identified above, and is provided for the purpose of deriving the five ringing frequencies of the harmonic series from the 1200 cycle reference frequency produced by the harmonic ringing oscillator 97. The five different ringing frequencies are transmitted over the conductors 103–107, inclusive, to the harmonic ringing modulator circuit 100.

*Harmonic ringing code forming circuit 99*

This circuit is identical to the corresponding system component described in detail in my co-pending application, Serial No. 301,215, filed on July 28, 1952, and assigned to the same assignee as the present invention, and is provided for the purpose of establishing a series of five successive ringing periods of approximately one and one-half seconds duration each which recur in repetitive ringing cycles, each ringing period being separated by a short guard interval of approximately one-tenth of a second; and of developing during each ringing period two differently coded ringing signals so that a total of ten harmonic ringing signals are produced during each harmonic ringing cycle. The coded ringing pulses produced by the circuit 99 are employed to modulate or key the continuous ringback tone signal from the ringback tone generator **29*c***.

*Harmonic ringing modulator circuit 100*

This circuit is identical to the corresponding system component described in detail in my co-pending application, Serial No. 301,215, identified above, and performs the functions of producing interrupted tone signals which individually correspond to the code numbers 1–10, inclusive, developed by the harmonic ringing code forming circuit 99 and illustrated in Fig. 28 of the drawings, and of sequentially impressing the five different ringing frequencies upon the common output conductor 108 during the five different ringing periods of each harmonic ringing cycle. The multiplexed ringing frequencies appearing on the conductor 108 are transmitted to the harmonic ringing amplifier and supply circuit 101.

*Harmonic ringing amplifier and supply circuit 101*

This circuit is identical to the corresponding system component described in detail in my co-pending application, Serial No. 301,215, identified above, and performs the functions of amplifying the commutated or multiplexed ringing frequencies to a sufficient power and voltage level to operate the tuned bell ringers in the subscribers' subsets; filtering the square waves from the ringing frequency sources to obtain a multiplexed wave form suitable for ringing purposes; and eliminating the transient disturbances resulting from abrupt switching from one ringing frequency to another. The multiplex ringing frequency signal is impressed upon the conductors 61*a* and 61*b* forming the illustrated cable 61 and is transmitted to all of the line circuits of the system.

*Conversation timing pulse generator 57*

This circuit is identical to the corresponding system component shown and described in detail in my co-pending application, Serial No. 301,215, identified above, and provided for the purpose of developing conversation timing pulses which have a repetition rate of approximately one pulse every forty seconds and which are supplied to all of the connectors of the system over the common conductor 57*a*.

*Conversation timing warning tone generator 58*

This circuit is identical to the corresponding system component shown and described in detail in my co-pending application, Serial No. 301,215, identified above, and is provided for the purpose of developing a warning tone signal, preferably a four hundred cycle sinusoidal wave, which is used as a warning tone signal to indicate to the calling and called subscribers that the conversation is about to be terminated automatically. The warning tone signal developed by the generator 58 is transmitted to all of the connectors of the system over the conductor 58*a*.

*Trunk hunting drive pulse generator 59*

This circuit is identical to the corresponding system component shown and described in detail in my co-pending application, Serial No. 301,215, identified above, and is provided for the purpose of developing trunk hunting drive pulses which are utilized in the connectors of the system to perform the trunk hunting operation in the event that a trunk hunting operation is necessary to set up the call. The trunk hunting drive pulses produced in the circuit 59 are transmitted to all of the connectors of the system over the conductor 59*a*.

*All links busy circuits, 192a, 192b–192j, inclusive*

These circuits are individually identical to the corresponding system component shown and described in detail in the co-pending application of Frank A. Morris, Serial No. 241,351, filed on August 10, 1951, and assigned to the same assignee as the present invention. The all links busy circuits are individually associated with the different hundreds groups of the system and each of these circuits performs the function of transmitting a busy tone signal having an interruption rate of 120 i.p.m. to the calling subscriber to indicate that there are no idle finder-selector links available in the calling line hundreds group. Essentially, the all links busy circuit performs this function by removing modulation from the multiplexer pulses produced in the time position assigned to the calling line which is unable to find linkage and of remodulating these pulses with a 120 i.p.m. busy tone signal and transmitting the remodulated pulses to the distributor in the calling line hundreds group for distribution back to the calling line.

*Buffer amplifiers 190a, 190b–190j, inclusive, and acceptor drive circuit 189*

These circuits are each identical to the buffer shown and described in detail in the co-pending application of Robert B. Trousdale, Serial No. 301,087, filed on July 26, 1952, and assigned to the same assignee as the present invention. Each of the buffer amplifier circuits performs the function of isolating the associated multiplexer from the finders in the same hundreds group and of increasing the amplitude of the multiplexer pulses to provide reliable operation of the finders in this hundreds line group. The pulses developed at the output side of the buffer amplifier may be called finder drive pulses. Thus, the buffer amplifier 190*a* effectively isolates the multiplexer 11*a* from the finders 120*a*, 122*a* and 124*a* in the first hundreds line group 12 and supplies finder drive pulses to these finders. In the same manner, the acceptor drive circuit 189 performs the function of isolating the selectors of the system from the acceptors of the system and provide relatively large amplitude acceptor drive pulses corresponding to the selector forward pulses transmitted through the selector forward coupling circuit 186.

*Busy pulse drive circuits 193a, 193b–193j, inclusive*

Each of these circuits is identical to the corresponding portion of the system component shown and described in detail in the co-pending application of Robert B. Trousdale, Serial No. 257,712, identified above, wherein the corresponding system component is identified as the "link coupling circuits 24" and the busy pulse drive channel thereof corresponds exactly to the busy pulse drive circuits of the present invention. However, it will be noted that each of the busy pulse drive circuits 193*a*, 193*b*–193*j* of the present invention is associated only with a particular hundreds group so that line busying of the system is performed on a hundreds group basis.

*Truck marking pulse generators 194a, 194b–194j, inclusive*

Each of these generators is identical to the corresponding system component shown and described in detail in the co-pending application of Robert B. Trousdale, Serial No. 301,215, identified above, and is provided for the purpose of generating trunk marking pulses which are supplied to the connectors in the same hundreds group to mark certain lines in that hundreds group as trunks.

*Selector forward coupling circuit 186, selector return coupling circuit 188, idle pulse coupling circuit 187, connector busy pulse coupling circuit 205, distributor coupling circuits 191a, 191b–191j, inclusive*

Figure 20:
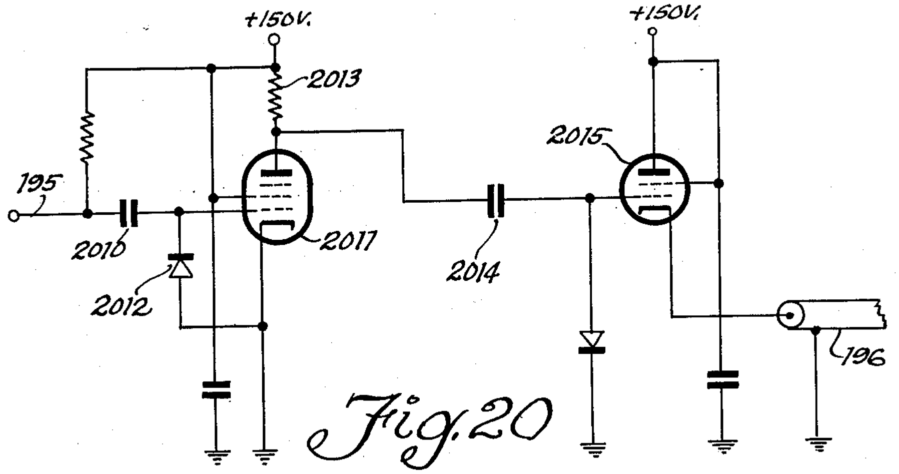
Fig. 20 illustrates schematically one of the buffer amplifiers and one of the coupling circuits embodied in the system of Figs. 1–12, inclusive.

The above-identified coupling circuits are all identical and one of these coupling circuits, namely, the selector-forward coupling circuit 186, is shown in detail in Fig. 20 of the drawings. It will be recalled from the general description of the system that the coupling circuits are provided for the purpose of driving the relatively low impedance cables which interconnect the linkage of the system. Also, these coupling circuits perform the further function of inverting the signal pulses impressed upon the input circuits thereof. Thus, considering the coupling circuit 186 shown in detail in Fig. 20, selector forward pulses which are impressed upon the conductor 195 through the forward out gate circuits 324 of the selectors of the system, are coupled through the condenser 2010 to the control grid of a pentode type amplifier 2011, preferably of the commercial type 6AU6, and the crystal rectifier 2012 is connected between the first control grid and cathode of the tube 2011 to provide a positive clamping action for the negative pulses supplied to this control grid. These pulses are amplified and inverted in the tube 2011 and appear as amplified positive selector forward pulses across the anode resistor 2013 of the tube 2011. These amplified selector forward pulses are coupled through the condenser 2014 to the control grid of a cathode follower tube 2015, preferably of the commercial type 6L6, and are transmitted to the 300 ohm coaxial cable 196 which forms the cathode load resistor for the tube 2015. The selector forward pulses thus produced across the low impedance cable 196 are transmitted to all of the connectors of the system in the manner described above. In a similar manner, the idle pulses produced on the conductor 198 are amplified and inverted in the idle pulse coupling circuit 187 and are transmitted to all of the selectors of the system over the cable 197. Likewise, the selector return pulses which are impressed upon the conductor 200 from the connectors of the system are amplified and inverted in the selector return coupling circuit 188 and are transmitted to the selectors of the system over the cable 199. Furthermore, the connector busy pulses developed by the selectors of the system are amplified and inverted in the connector busy pulse coupling circuit 205, and transmitted over the cable 205*b* to all of the acceptors of the system. Also, the selector signal pulses and connector signal pulses impressed upon one of the conductors 51*a*, 51*b*–51*j*, inclusive, are amplified and inverted in the corresponding one of the distributor coupling circuits 191*a*, 191*b*–191*j*, inclusive, and are transmitted thereafter to the corresponding distributor in the same hundreds line group.

*Line circuits 10a and 16b*

As previously indicated, the two identified line circuits are respectively utilized to terminate the private line No. 123 in the first hundreds groups 12 and the party line No. 232 in the second hundreds group 13 at the exchange end of the system. These two line circuits, as well as the line circuits terminating all of the other lines of the system, are identical in circuitry and mode of operation and may be identical to the corresponding system component shown and described in detail in the co-pending application of Robert B. Trousdale, Serial No. 301,215, identified above.

*Multiplexers 11, 11b–11j, inclusive*

As pointed out in the general description of the system, these circuits, which are individually associated with each hundreds line group, are provided for the general purpose of sampling control and intelligence signals developed on calling and called lines of the associated hundreds groups in the time positions of each pulse frame individually assigned to the lines from which the signals are respectively derived and transmitting multiplexer pulses modulated with the sampled control and intelligence signals over the respective multiplexer output conductors 50*a*, 50*b*–50*j*, inclusive, to the associated finders, selectors and connectors in each hundreds group of the system. Each of these multiplexer circuits is capable of sampling signals appearing on each of the hundreds lines of the associated hundreds group at a sampling repetition rate of ten kilocycles.

Each of the multiplexers 11*a*, 11*b*–11*j*, inclusive, may be identical to the corresponding system component described in the co-pending application, Serial No. 134,974, identified above, or the co-pending application of Robert B. Trousdale, Serial No. 205,641, filed January 12, 1951, and assigned to the same assignee as the present invention. However, it will be appreciated from the foregoing general description that a given type of multiplexer is designed to operate with the intelligence and supervisory signal channels of a given type of line circuit. Thus, the type of line circuit disclosed in the co-pending application, Serial No, 134,974, is adapted to supply the intelligence and control signals over the same conductor to the corresponding gate tube of the associated multiplexer, whereas, in the co-pending application, Serial No, 205,641, the intelligence and control signals are supplied over separate paths to separate control grids of the corresponding gate tube in the associated multiplexer. Since the intelligence and supervisory channels of the line circuits of the present invention are of the latter type, it will be understood that a multiplexer of the type shown in co-pending application, Serial No. 205,641, is to be used with these line circuits. However, it will be understood that either type of line circuit or multiplexer combination may be employed insofar as the over-all system of the present invention is concerned.

*Finder 120a*

This circuit, as well as all of the other finders of the system, is identical to the corresponding system component shown and described in detail in the co-pending application of Robert B. Trousdale, Serial No. 301,087, filed on July 26, 1952, and assigned to the same assignee as the present invention, and is provided for the purpose of identifying the time position of a calling line within the associated hundreds group upon the initiation of a call upon this line; operatively associating the finder with the calling line by providing a finder gate pulse in the calling line time position which is forwarded to the associated selector 120*b*; providing operating potential for certain circuit components of the associated selector 120*b*; providing a busy pulse in the calling line time position which is transmitted to all of the other finders and connectors in the same hundreds group; and recognizing an extended on-hook condition at the calling line as abandonment or dismissal of the call and effecting release of the associated selector 120*b* thereafter by removing the operating potential from the associated selector.

In this connection, it will be understood that other types of line finders may be employed in the system of the present invention. For example, the type of line finder shown and described in detail in co-pending application, Serial No. 134,974, identified above, may be employed. However, if a line finder of the latter type is employed, it is necessary to provide in the common equipment 17 tens and units pulse rings 21 and 20 which are adapted to provide both positive and negative tens and units pulses since the line finder disclosed in the co-pending application, Serial No. 134,974, is adapted to operate with negative tens and units pulses.

*Connector 131b*

This circuit, as well as the other connectors of the system, is identical to the corresponding system component shown and described in detail in the co-pending application, Serial No. 301,215, identified above, and is employed to perform the numerous functions described in detail heretofore in connection with the tracing of a call from the calling substation A to the called substation G. In this connection, it will be understood that the associated acceptor 131*a* replaces the associated line finder in the system shown and described in the co-pending application, Serial No. 301,215, and supplies acceptor gate pulses and a +B switching potential to the connector 131*b* which respectively correspond to the finder gate pulses and the +B switching potential furnished by the line finder in the system shown in co-pending application, Serial No. 301,215, identified above. Also, the selector forward conductor 196 replaces the multiplexer output conductor 50 and the selector return conductor 200 replaces the distributor input conductor 51 in the system shown in copending application, Serial No. 301,215, identified above, and no dial tone gate tube is required in the connectors of the present system since dial tone is returned by the selectors.

In this connection, it will be understood that the conversation timing facilities in the connector 131*b* may be altered in the manner described in detail in the copending application, Serial No. 301,215, identified above, so that the connector 131*b* is made busy at the end of the conversation timing period instead of sending a conversation timing extinguishing pulse over the conductor 131*e* to the associated acceptor 131*a*. With this modification, the conductor 131*e* between the acceptor 131*a* and the connector 131*b* is not required in each of the acceptor-connector links of the system. Furthermore, with this modification, a busy tone signal is released to the calling subscriber at the same time that the dial tone signal is returned to the called subscriber in a manner described above so that both the calling and called subscribers are informed that the call has been terminated automatically.

*Distributors 15a, 15b–15j, inclusive*

As pointed out in the general description of the system, each of these circuits is provided for the general purpose of distributing signals derived from the signal sample modulated connector pulses developed in the connectors in the same hundreds group and the signal sample modulated selector pulses developed in the selectors in the same hundreds group to the line circuits terminating the calling and called lines in this group. Thus, for example, in the first hundreds group 12, the distributor **15*a* is capable of distributing signals derived from the signal modulated connector pulses appearing in different time positions on the common distributor channel input conductor 51*a* to the respective line circuits in the hundreds line group 12 under the directive control of the connectors 121*b*, 123*b*–125*b* in the first hundreds group 12. Also, the distributor 15*a* is capable of distributing signals derived from the signal modulated selector pulses appearing in different time positions on the common distributor channel input conductor 51*a* to the respective line circuits in the first hundreds group 12 under the directive control of the selectors 120*b*, 122*b*–124*b* in the first hundreds group 12.**

Each of these distributors may be of the type described in detail in either of the above identified co-pending applications, Serial No. 134,974 and Serial No. 205,641. However, it will be understood that a particular type of distributor is designed to operate with a particular type of line circuit. With a line circuit of the type shown in the co-pending application, Serial No. 205,641, it is necessary to use a distributor of the type shown in this same co-pending application, since no provision is made in the line circuits shown therein for detecting the signals which are modulated on the connector signal pulses and selector signal pulses produced on the conductors **51*a*, 51*b*–51*j*,** such detection being accomplished in the distributor. However, it will be understood that a disbutor of the type shown in co-pending application, Serial No. 134,974, may equally well be employed in the system of the present invention in which case no detection of the signal modulated connector and selector signal pulses is performed in the distributor but instead is performed in the line circuit of the type disclosed in the co-pending application, Serial No. 134,974.

*Acceptor 131a*

As previously explained in connection with Fig. 4A of the drawings, this acceptor generally comprises an acceptor control gate circuit 400, a plus B switching circuit 401, an acceptor gate pulse forming circuit 402 and an idle pulse circuit 403. The functions performed by this acceptor and the identified components thereof are also generally explained above with reference to the same figure of the drawings.

Figure 19:
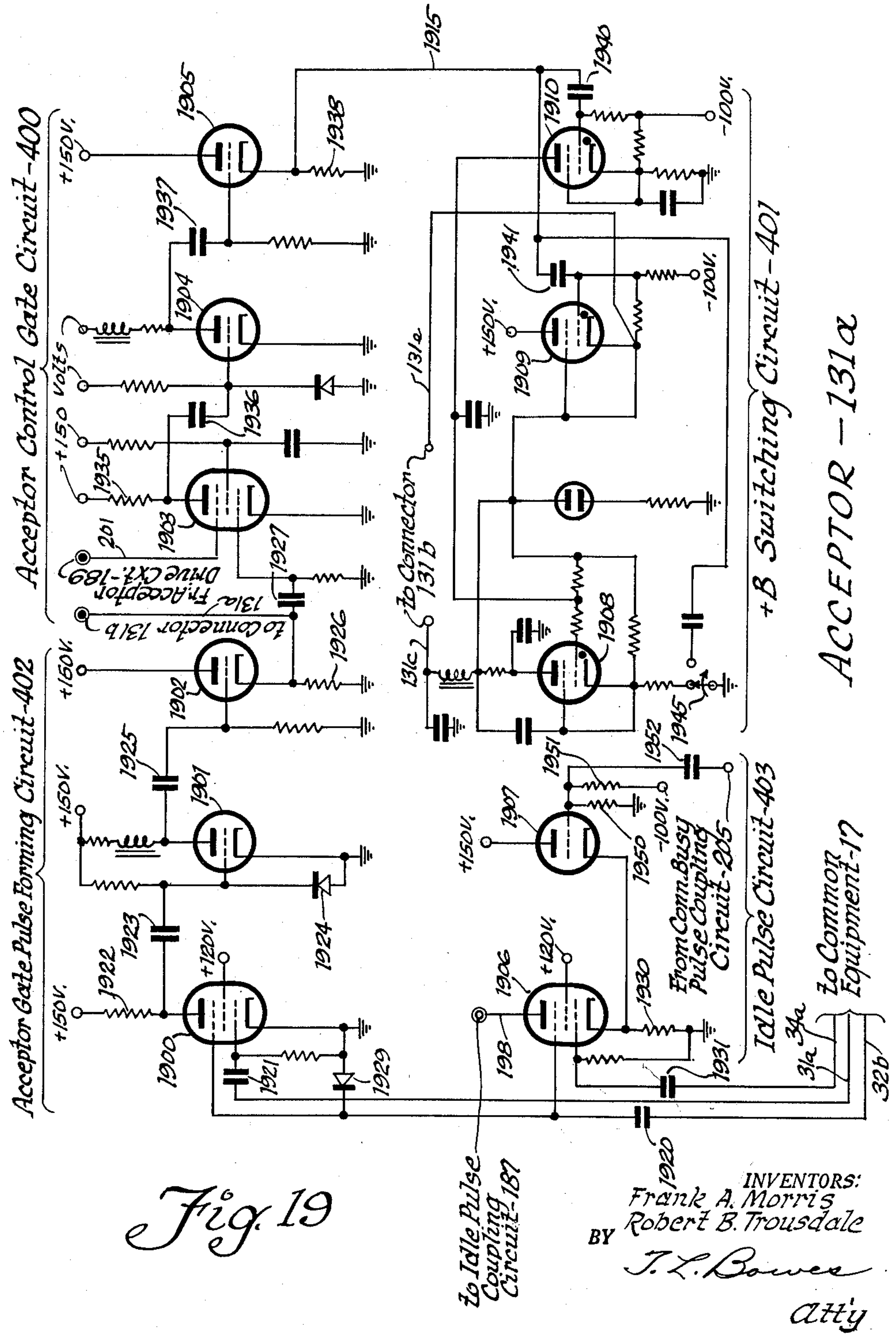
Fig. 19 is a schematic diagram showing the details of the acceptor portion of one of the acceptor-connector links diagrammatically illustrated in Figs. 4A, 4B and 4C.

Referring now more particularly to Fig. 19 of the drawings wherein the detailed circuitry of the acceptor is illustrated, it will be seen that the acceptor control gate circuit 400 comprises an acceptor control gate tube 1903, an inverter tube 1904 and a cathode follower tube 1905 connected in tandem in the order named and arranged to impress pulses gated therethrough upon the conductor 1915. These pulses are transmitted over the conductor 1915 to the input terminals of the +B switching circuit 401 which circuit comprises a +B switching tube 1909, an extinguishing tube 1908 and a timing tube 1910 interconnected in the manner illustrated.

The acceptor gate pulse forming circuit 402 comprises an acceptor gate pulse forming tube 1900, an inverter tube 1901 and a cathode follower tube 1902 which are connected in tandem in the order named and arranged to impress pulses gated therethrough upon the conductor **131*d*. These pulses are transmitted over the conductor 131*d* to one control grid of the acceptor gate control tube 1903 and to the connector 131*b*** in parallel.

The idle pulse circuit 403 comprises an idle pulse gate tube 1906 and a control tube 1907. This circuit is actuated under the joint control of tens pulses impressed thereon from the conductor **32*b* and channel pulses impressed thereon from the conductor 34*a* and is arranged to impress idle pulses upon the idle pulse out conductor 198 in the time position assigned to the acceptor-connector link 131. Circuit elements not specifically mentioned in the above description of the acceptor 131*a* are referred to below in describing the functions which they respectively perform in the acceptor circuit. The three gas tubes 1908, 1909 and 1910 of the +B switching circuit 401 are highly sensitive thyratrons, preferably of the RCA commercial type 5696. The tubes 1900, 1903 and 1906 are preferably of the commercial type 6AS6; and the tubes 1901, 1902, 1904, 1905 and 1907** are preferably of the commercial type 6C4.

In considering the operational details of the acceptor **131*a*, it is first pointed out that when the acceptor is idle all tubes embodied in the +B switching circuit 401 are de-ionized. With this circuit inactive, the associated connector 131*b*** is likewise inactive.

In the system of the present invention, each of the acceptor-connector links is assigned a predetermined time position within the basic time position frame. Furthermore, all of the acceptors in a given hundreds line group may be assigned pulse time positions within the same tens pulse interval. Thus, in the first hundreds group 12, all of the acceptor-connector links may be assigned pulse time positions within the first tens pulse interval and individually assigned a units pulse time position within this tens pulse interval. Likewise, in the second hundreds group 13, all of the acceptor-connector links may be assigned pulse time positions within the second tens pulse interval and individually assigned units pulse time positions within this tens pulse interval. Thus, the acceptor **131*a*, which in the illustrated embodiment is the first acceptor in the second hundreds group 13 is assigned the first units pulse time position 62*b* which occurs during the second tens pulse interval defined by the tens pulses 73*a*, appearing on the conductor 32*b*. In a similar manner, the acceptor 133*a*, which in the illustrated embodiment is shown as the second acceptor in the second hundreds group 13, is assigned the second units pulse time position 63*b* within the second tens pulse interval 73*a*.**

Since the acceptor-connector links of the system are assigned predetermined pulse time positions which do not change during the setting up of two-way communications connections between different pairs of the lines of the system, the acceptor gate pulse forming circuit 402 in the acceptor **131*a* is continuously operative to produce acceptor gate pulses in the time position assigned to this acceptor which are transmitted to the associated connector 131*b* and are also impressed upon the acceptor control gate circuit 400 to permit this circuit to accept selector forward signal pulses which occur in the time position assigned to the acceptor-connector link 131. In a similar manner, the idle pulse circuit 403 is continuously operative to produce idle pulses on the common output conductor 198 thereof in the time position 62*b* assigned to the link 131 during those periods when the acceptor-connector link 131** is idle, i.e., not operatively associated with a call forwarding selector of the system.

Considering first the manner in which acceptor gate pulses are continuously formed in the circuit 402, tens pulses appearing on the conductor **32*b* are continuously impressed upon the suppressor grid of the acceptor gate pulse forming tube 1900 through the coupling condenser 1920 and units pulses appearing on the conductor 31*a*** are impressed upon the first control grid of the tube 1900 through the coupling condenser 1921. When the tens pulses 73*a* appearing on the conductor 32*b* coincide with one of the units pulses 62*a*, 62*b*, 61*c*–62*j*, inclusive, appearing on the conductor 31*a*, the gate tube 1900 is rendered fully conductive so as to produce across the anode resistor 1922 thereof a negative pulse of one microsecond duration which occurs in the units pulse time position 62*b*. This negative pulse which is now called an acceptor gate pulse is coupled through the condenser 1923 to the control grid of the inverter tube 1901 wherein the acceptor gate pulse is amplified and inverted and appears as a positive acceptor gate pulse at the anode of the tube 1901. A crystal rectifier 1924 is provided between the control grid and cathode of the tube 1901 to clamp the base line of the acceptor gate pulse waveform to ground potential. The positive acceptor gate pulse produced at the anode of the tube 1901 is coupled through the condenser 1925 to the control grid of the cathode follower tube 1902 and is repeated in like phase across the cathode resistor 1926 thereof. The positive acceptor gate pulses produced across the resistor 1926 are continuously transmitted over the conductor 131*d* to the circuits 407, 408 and 426 in the connector 131*b* and are also coupled through the condenser 1927 to the first control grid of the acceptor control gate tube 1903.

The idle pulse circuit 403 is continuously supplied with tens pulses and channel pulses in the correct time positions to establish idle pulses in the time position assigned to the acceptor 131*a*. Thus, the tens pulses 73*a* appearing on the conductor 32*b* are continuously impressed upon the suppressor grid of the idle pulse gate tube 1906 through the condenser 1920 and the channel pulses 82*a*, 82*b*–82*j*, inclusive, appearing on the conductor 34*a* are continuously impressed upon the first control grid of the tube 1906 through the condenser 1931. A crystal rectifier 1929 is connected from the suppressor grids of the tubes 1900 and 1906 to ground to charge the coupling condenser 1920 during on-pulse intervals. During off-pulse intervals the condenser 1920 biases the tubes 1906 and 1900 beyond cut-off to prevent conduction thereof. A cathode resistor 1930 is connected from the cathode of the tube 1906 to ground. When the acceptor-connector link 131 is idle, the tube 1906 is not affected by the control tube 1907 so that during the idle periods of the acceptor 131*a*, the channel pulses 82*b* appearing in the time position 62*b*, which occur during the tens pulse interval 73*a*, are gated through to tube 1906 and appear as negative idle pulses on the conductor 198, the anode resistor for the tube 1906 being in the idle pulse coupling circuit 187. In this connection, it will be recalled that these idle pulses are transmitted through the idle pulse coupling circuit 187 and over the conductor 197 to all of the selectors of the system.

The positive selector forward pulses appearing on the conductor 196 in the time position 62*b* assigned to the link 131, which in the illustrated call originate in the call forwarding selector 120*b*, are transmitted through the acceptor drive circuit 189 wherein they are transformed into acceptor drive pulses and these acceptor drive pulses are impressed directly upon the suppressor grid of the acceptor control gate tube 1903, the bias network for this suppressor grid being contained in the acceptor drive circuit. The acceptor gate pulses which are produced in the time position 62*b* are continuously impressed upon the first control grid of the tube 1903. Accordingly, these acceptor drive pulses are gated through the tube 1903 and appear as negative pulses across the anode resistor 1935 of the tube 1903. The gated acceptor drive pulses appearing at the anode of the tube 1903 are coupled through the condenser 1936 to the control grid of the inverter tube 1904 wherein they are amplified and inverted and appear as positive pulses at the anode of this tube. These positive acceptor drive pulses are coupled through the condenser 1937 to the control grid of the cathode follower tube 1905 and are repeated in like phase across the cathode resistor 1938 of this tube. The positive acceptor drive pulses thus produced across the resistor 1938 are coupled over the conductor 1915 and through the condenser 1940 to the control grid of the +B switch timing tube 1910 and through the condenser 1941 to the control grid of the +B switching tube 1909. The +B switching circuit 401 responds to the positive acceptor drive pulses impressed upon the tubes 1909 and 1910 thereof by producing a positive potential of approximately one hundred forty volts on the conductor 131*c* which potential is used as operating potential for certain ones of the tubes in the circuit components of the associated connector 131*b*. In this connection, it is pointed out that the +B switching circuit 401 is identical to the corresponding circuit component of the finder 120*a* and is described in detail in the co-pending application, Serial No. 134, 974, identified above, and reference may be had to this specification for a complete description of the operation of this portion of the acceptor 131*a*. Furthermore, the description of the hold switch indicated generally at 1945 in Fig. 19 of this specification is described in detail in the co-pending application, Serial No. 257,712, identified above, and reference may be had to this specification for a detailed description of the hold switch portion of the +B switching circuit 401 in the acceptor 131*a*.

The control grid of the control tube 1907 is biased negatively by means of the voltage divider network including the resistors 1950 and 1951 which are connected between the negative bias potential source and ground so that the control grid of the tube 1907 is normally biased beyond cut-off. As soon as any one of the acceptor-connector links of the system is selected, or seized, by a call forwarding selector, the call forwarding selector operates to transmit connector busy pulses in the time position assigned to the seized acceptor-connector link to each of the acceptors of the system. More particularly, when any one of the acceptor-connector links of the system is seized, the connector busy pulses developed by the call forwarding selector are transmitted through the connector busy pulse coupling circuit 205, over the conductor 205*b* and through the coupling condenser 1952 to the control grid of the control tube 1907 in the acceptor 131*a*, as well as to all other acceptors of the system. These positive connector busy pulses are of sufficient amplitude to drive the tube 1907 into the conductive region so that the tube 1907 conducts for the duration of each connector busy pulse transmitted thereto over the conductor 205*b*. The cathode of the tube 1907 is connected to the cathode of the idle pulse gate tube 1906 so that the resistor 1930 thereof is common to both of the tubes 1906 and 1907. The anode of the tube 1907 is connected to the positive anode potential source so that the tube 1907 is operated as a cathode follower. Accordingly, the connector busy pulses impressed upon the conductor 205*b* are repeated through the control tube 1907 and are impressed upon the cathode resistor 1930 of the idle pulse gate tube 1906 as positive pulses. These positive connector busy pulses prevent the idle pulse gate tube 1906 from conducting during the period of each connector busy pulse since the cathode of the tube 1906 is driven highly positive during these periods.

Until the acceptor-connector link 131 is seized by a call forwarding selector, the connector busy pulses transmitted over the conductor 205*b* will not occur in the pulse time position 62*b* assigned to the acceptor-connector link 131. Therefore, even though a number of connector busy pulses may be transmitted over the conductor 205*b* and impressed upon the cathode resistor 1930 of the tube 1906 so as to render this tube non-conductive for the duration thereof, the idle pulse gate tube 1906 still continues to gate the channel pulses 82*b* appearing in the time position 62*b* to the conductor 198 so that idle pulses are continuously transmitted to all of the selectors of the system to indicate that the accepor-connector link 131 is idle. However, when the acceptor-connector link 131 is seized by a called forwarding selector and this selector transmits connector busy pulses over the conductor 205*b* in the time position 62*b* assigned to the link 131, the idle pulse gate tube 1906 is driven beyond cut-off by these connector busy pulses so that it is unable to develop idle pulses on the conductor 198 in the time position 62*b* assigned to the link 131. This indicates to all of the selectors to the system that the acceptor-connector link 131 has been taken into use and prevents any other selector from selecting the time position 62*b* and sending out selector forward pulses and connector busy pulses in this time position.

In the illustrated embodiment, the idle pulses are removed from the conductor 198 by means of the above-described connector busy pulse channel which interconnects all of the selectors and acceptors of the system. With this arrangement, substantially instantaneous connector busying is provided. However, if desired, the connector busy pulse channel need not be employed and removal of the idle pulses from the conductor 198 may be accomplished under the control of the +B switching circuit 401 in the acceptor 131*a*. Thus, when the acceptor-connector link 131 is seized by the call forwarding selector and the +B switching circuit 401 thereof is operated so as to produce operating potential on the conductor 131c, this operating potential may be employed to bias the idle pulse gate tube 1906 beyond cut-off so as to remove the idle pulses appearing in the time position 62*b* assigned to the acceptor-connector link 131 from the idle pulse out conductor 198. However, with this alternative arrangement, the selectors of the system must be so allotted that sufficient time between allotment intervals is provided for the +B switching circuit to operate, as described heretofore in connection with the allotting circuit 20*b*.

*Selector 120b*

As previously explained in connection with Fig. 3B of the drawings, this selector generally comprises a dial impulse integrator circuit 309, a hundreds register pulser 310, a hundreds digit register 311, a hundreds sequence timing circuit 312, a hundreds register inverter 360, an idle pulse gate circuit 395, a connector busy lock circuit 396, a connector coincidence tube circuit 397, a selector pulse and connector busy pulse forming circuit 317, a forward in gate circuit 307, a forward reconstructor circuit 308, a forward out gate circuit 324, a return in gate circuit 323, a return reconstructor circuit 322, a return out gate circuit 326, a dial tone gate circuit 325 and a busy tone gate circuit 325*a*. The functions performed by this circuit and the identified components thereof are also generally explained above with reference to the same figure of the drawings.

Figure 13:
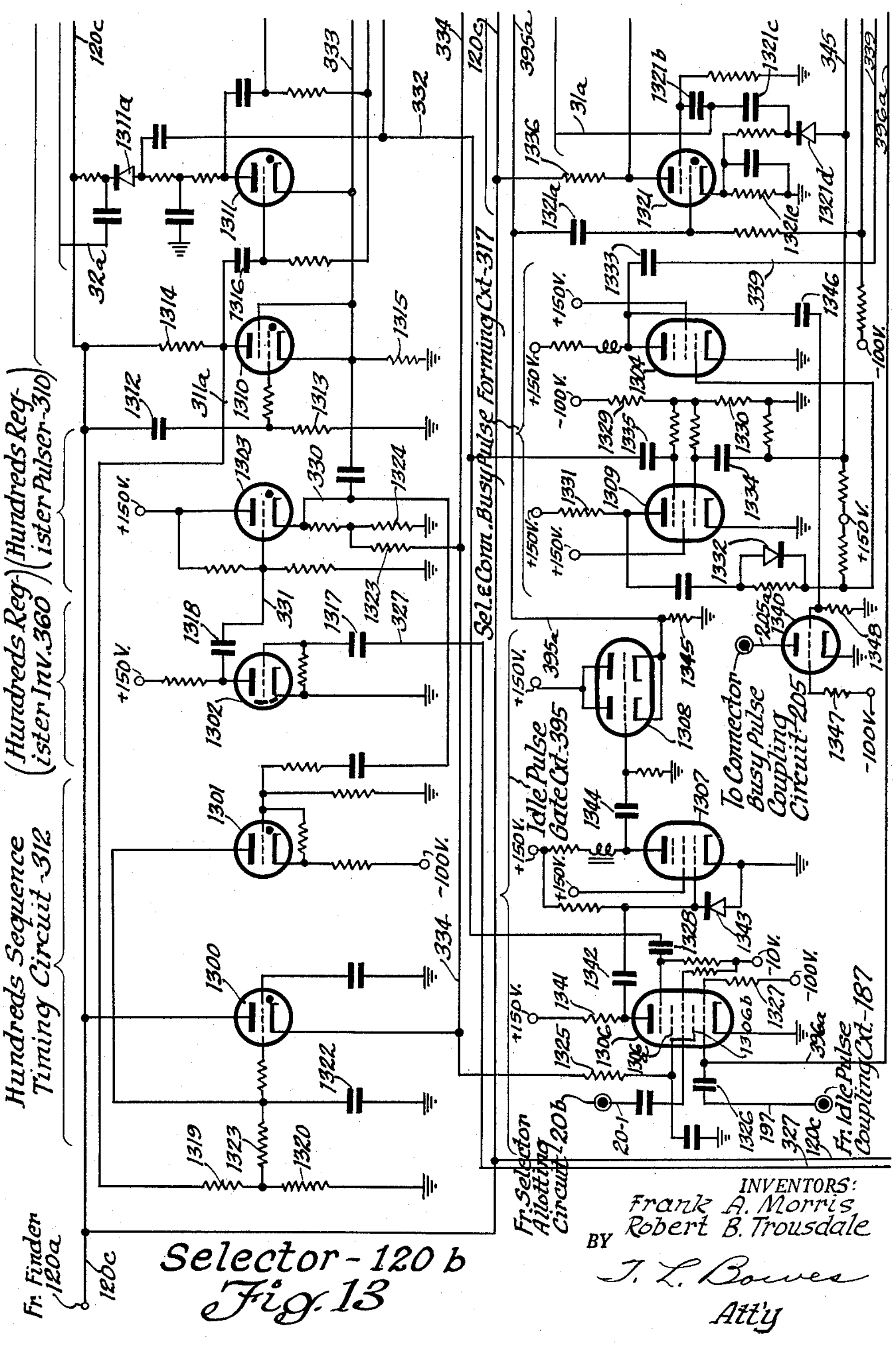
Figure 14:
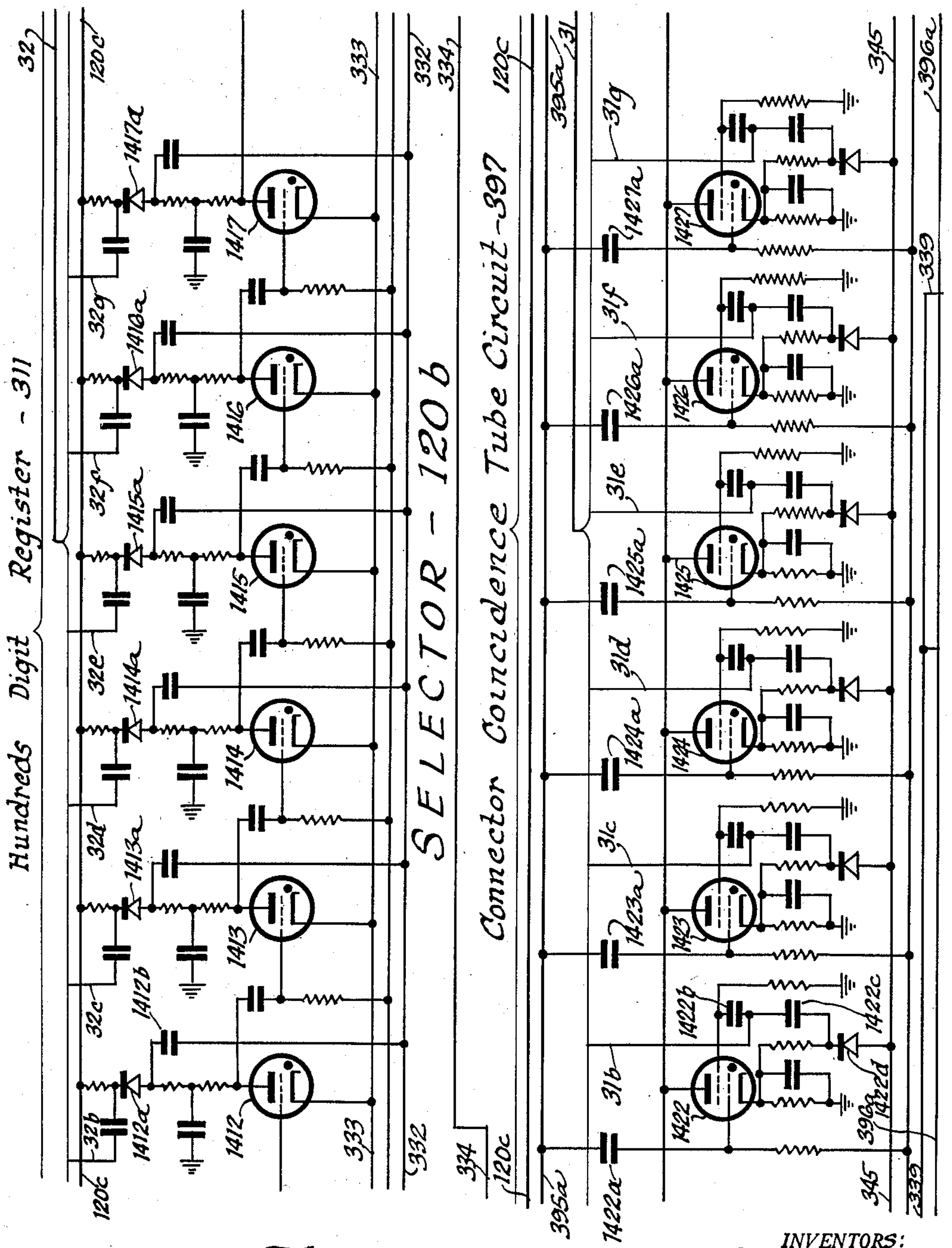
Figure 15:
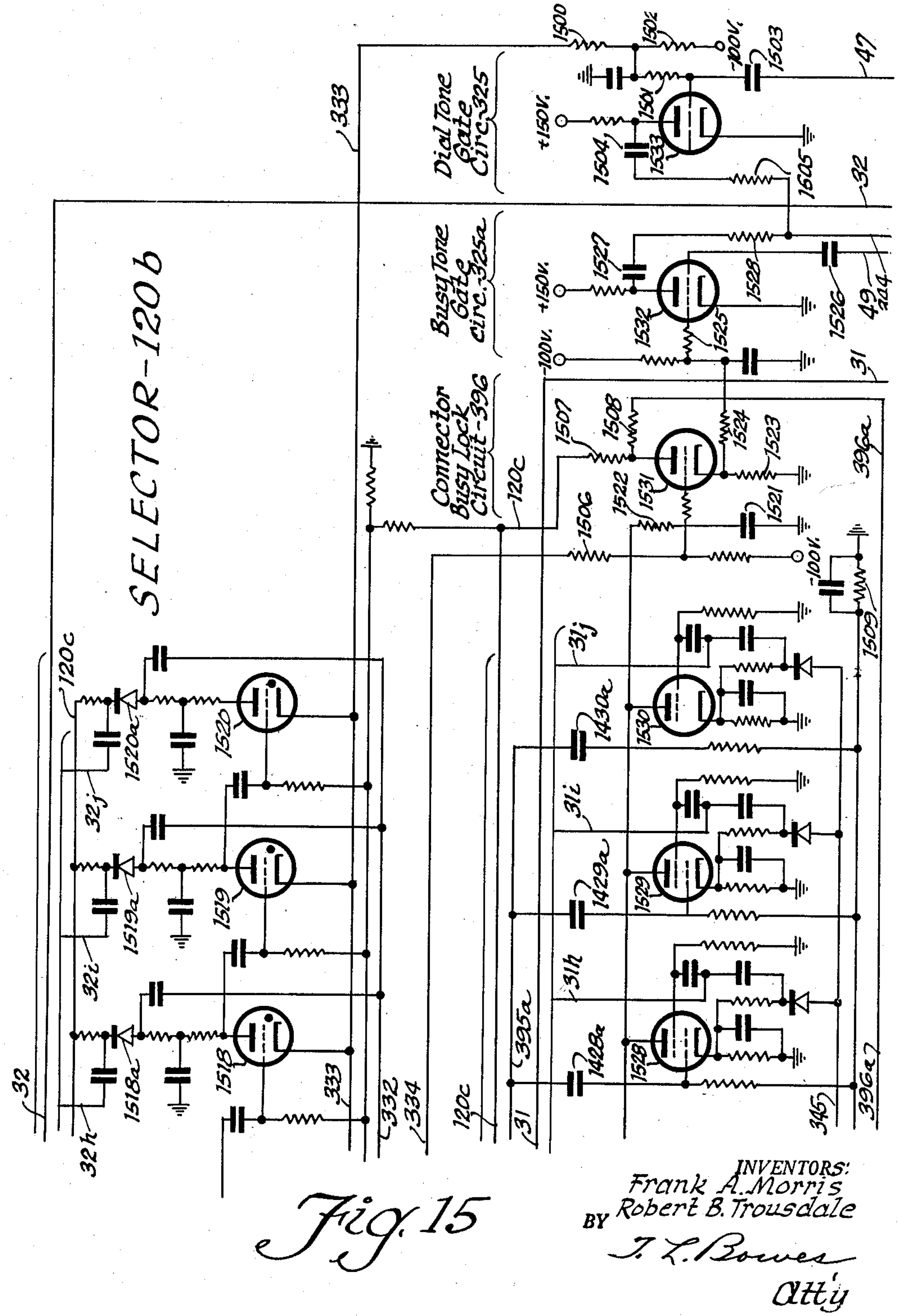
Figure 16:
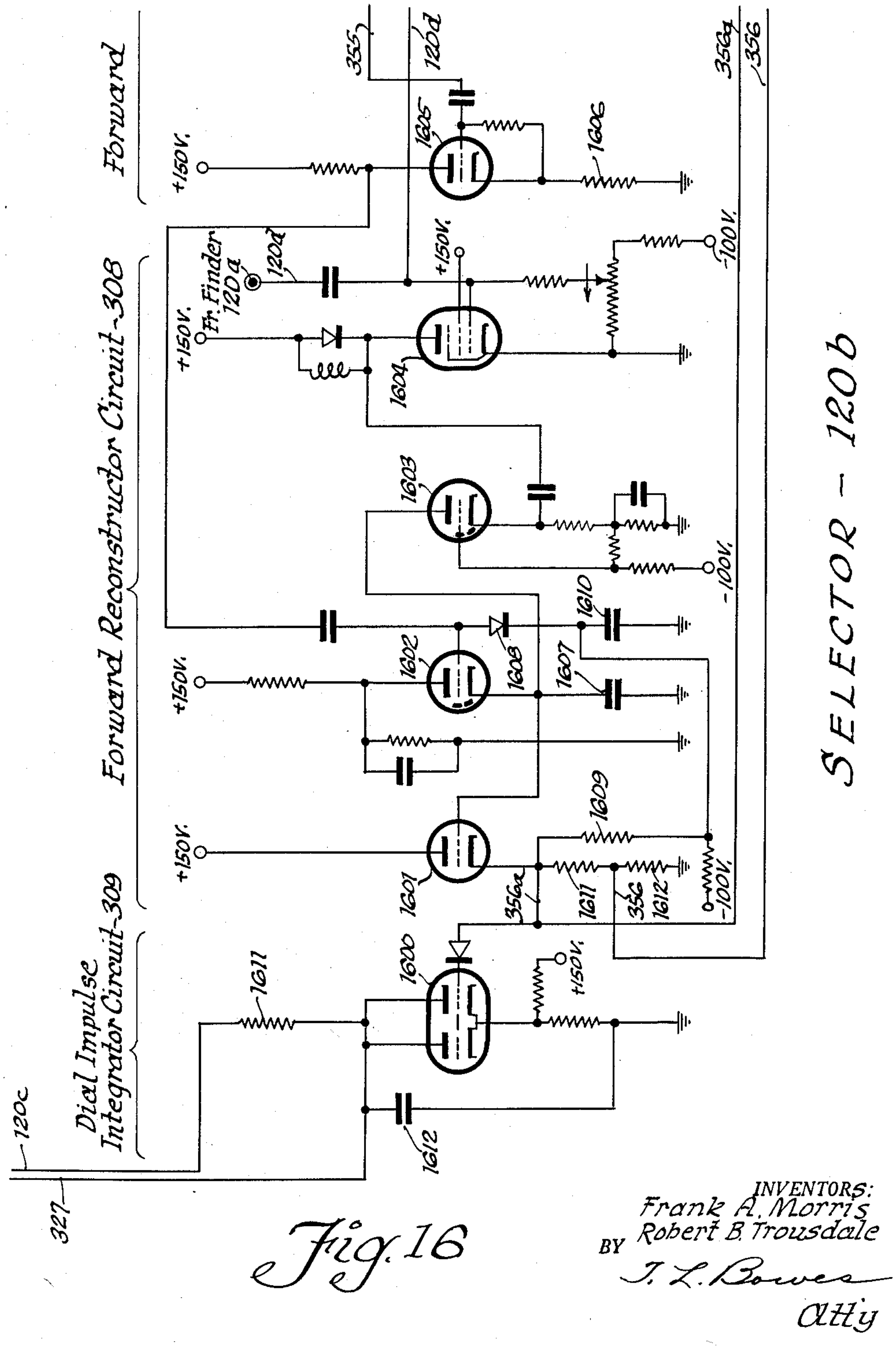
Figure 17:
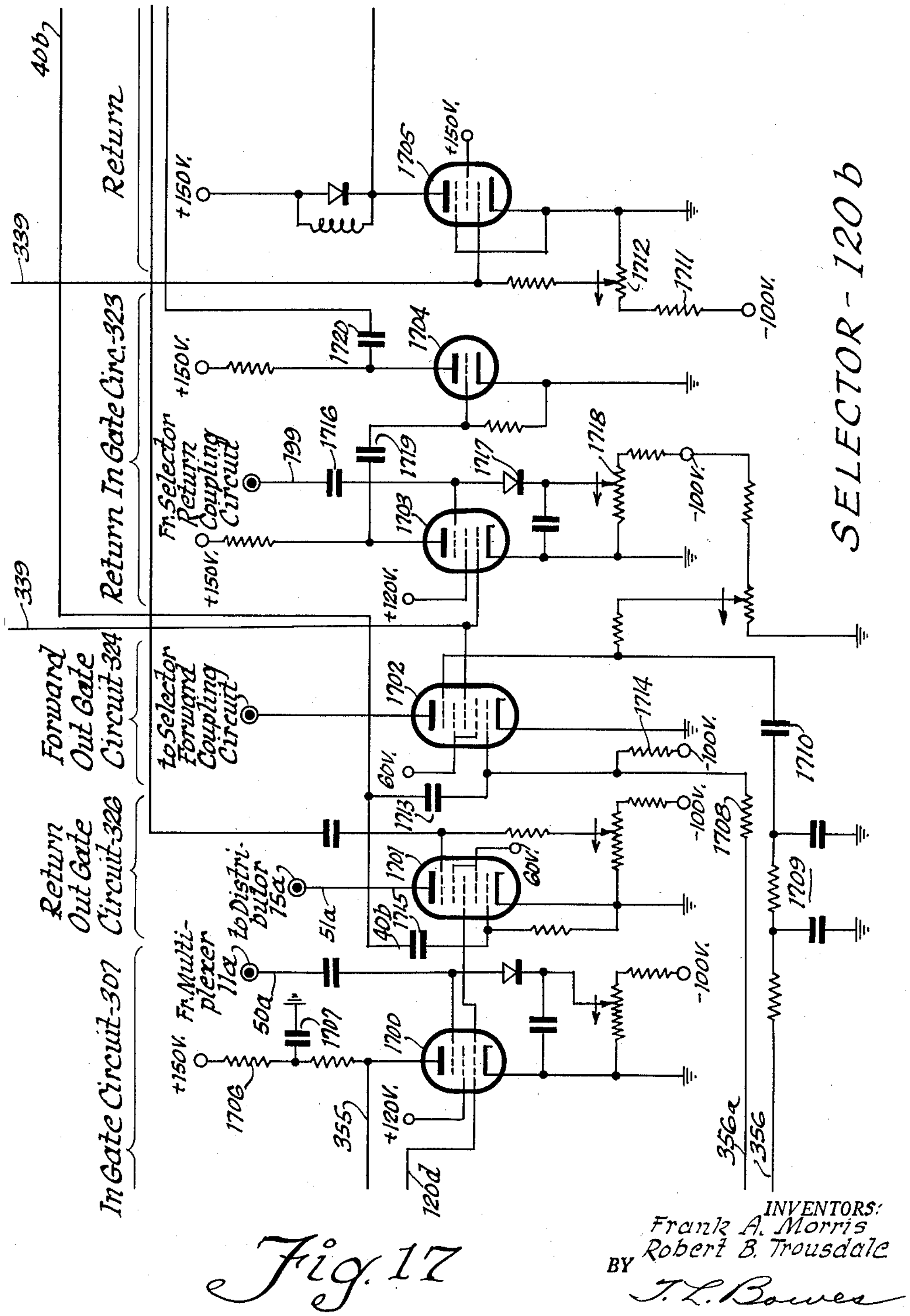
Figure 18:
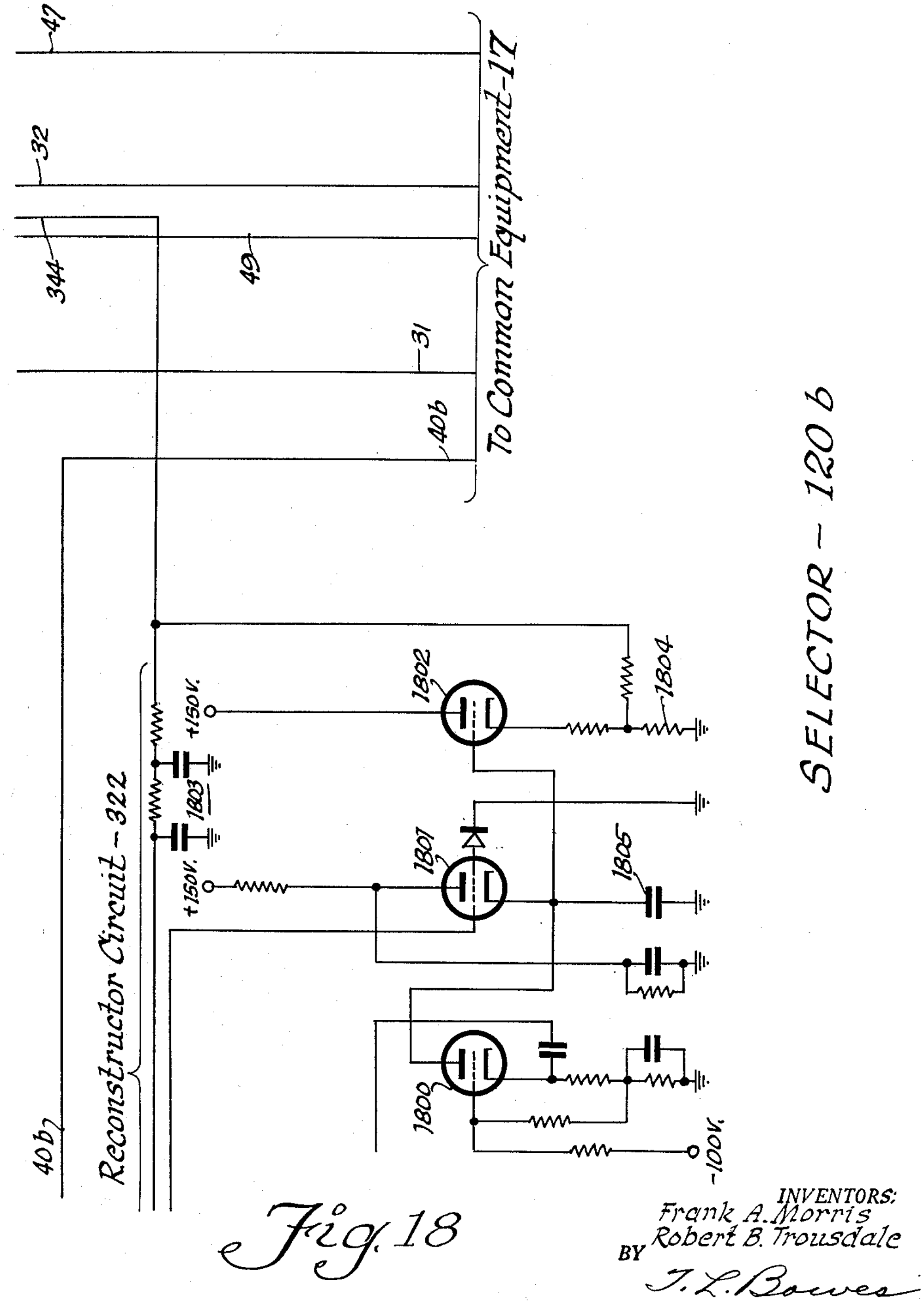

Referring now more particularly to Figs. 13, 14, 15, 16, 17 and 18 of the drawings, wherein the detailed circuitry of the selector 120*b* is illustrated, it will be readily understood that details of the selector may best be understood in terms of the functional significance of the various circuit components thereof. In order to correlate these six figures with the schematic showing of Fig. 3B, it may be pointed out that the hundreds sequence timing circuit 312 is shown in Fig. 13 as comprising a hundreds sequence timing tube 1300 and a hundreds sequence discharge tube 1301; the hundreds register inverter circuit 360 is shown in Fig. 13 as comprising the single inverter tube 1302; the hundreds register pulser 310 is shown in Fig. 13 as comprising the single pulser tube 1303; the hundreds digit register 311 is shown in Figs. 13, 14 and 15 as comprising the primer tube 1310 and the ten cold cathode counting tubes 1311, 1412–1417, inclusive, and 1518–1520, inclusive; the idle pulse gate circuit 395 is shown in Fig. 13 of the drawings as comprising the idle pulse gate tube 1306, the idle pulse inverter 1307 and the idle pulse follower tube 1308; the selector pulse and connector busy pulse forming circuit 317 is shown in Fig. 13 of the drawings as comprising the selector pulse mixer tube 1309, the selector pulse inverter tube 1304 and the connector busy pulse follower tube 1340; the connector coincidence tube circuit 397 is shown in Figs. 13, 14 and 15 of the drawings as comprising the ten coincidence tubes 1321, 1422–1427, inclusive, and 1528–1530, inclusive; the connector busy lock circuit 396 is shown in Fig. 15 of the drawings as comprising the single connector busy lock tube 1531; the busy tone gate circuit 325*a* is shown in Fig. 15 of the drawings as comprising the single busy tone gate tube 1532; the dial tone gate circuit 325 is shown in Fig. 15 of the drawings as comprising the single dial tone gate tube 1533; the dial impulse integrator circuit 309 is shown in Fig. 16 of the drawings as comprising the single dial impulse integrator tube 1600; the forward reconstructor circuit 308 is shown in Fig. 16 of the drawings as comprising a peaker tube 1604, a condenser charging tube 1602, a condenser discharging tube 1603 and a cathode follower output tube 1601; the forward in gate circuit 307 is shown in Figs. 16 and 17 as comprising the forward in gate tube 1700 and the forward in gate inverter tube 1605; the return out gate circuit 326 and the forward out gate circuit 324 are shown in Fig. 17 as respectively comprising the single gate tubes 1701 and 1702; the return in gate circuit 323 is shown in Fig. 17 of the drawings as comprising the return in gate tube 1703 and the return in gate inverter tube 1704; and the return reconstructor circuit 322 is shown in Figs. 17 and 18 as comprising a peaker tube 1705; a condenser discharging tube 1800; a condenser charging tube 1801 and a cathode follower output tube 1802.

The manner in which the identified tubes of the selector are interconnected is pointed out more fully below with reference to the function of the individual circuits. Although the identified tubes may be of any commercial type having the desired operating characteristics, it is pointed out that preferably the tubes 1302, 1602, 1603, 1800 and 1801 are commercial types 6AQ6 dual-diode triodes, the tubes 1306, 1701 and 1702 are of the RCA experimental type A–5727 triple grid tubes wherein each of the three grids has a substantial mutual conductance when operated at a potential which is negative with respect to the cathode potential of the tube, the tubes 1307, 1304, 1604 and 1705 are commercial type 6AU6 pentodes, the tubes 1308 and 1600 are of the commercial type 6J6 double triodes, the tubes 1309, 1700 and 1703 are of the commercial type 6AS6 pentodes, the tubes 1532, 1533, 1601, 1605, 1704 and 1802 are of the commercial type 6C4 triodes. Preferably, the gas filled thyratrons of the hot cathode type included in the selector 120*b*, namely, the tubes 1310, 1321, 1422–1427, inclusive, and 1528–1530, inclusive, are of the RCA commercial 5696 type. The cold cathode gas tubes are preferably of the RCA commercial type 5823. This group includes the tubes 1300, 1301, 1303, 1311, 1412–1417, inclusive, 1518–1520, inclusive, and 1531.

In considering the operation of the selector 120*b*, reference is again made to the above-described call originating at the substation A and routed by way of the finder-selector link 120 and the acceptor-connector link 131 to the called party line substation G. From the description pertaining to this call, it will be recalled that when the finder-selector link 120 is idle, the finder 120*a* withholds operating potential from the conductor 120*c* and also withholds finder gate pulses from the conductor 120*d*. Immediately the finder-selector link 120 is operatively associated with the calling line No. 123, the +B switching circuit 301 of the finder 120*a* operates to impress a positive potential of 140 volts on the conductor 120*c* and almost immediately thereafter functions to impress finder gate pulses upon the conductor 120*d* in the time position 64*b* assigned to the calling line No. 123.

When operating anode potential is thus suddenly applied to the conductor 120c, it is impressed upon the series connected condenser 1312 and the resistor 1313 of the hundreds digit register 311 with the result that the condenser 1312 starts to charge through the resistor 1313. Initially, however, the major portion of the available voltage appears across the resistor 1313 so that the control grid of the priming tube 1310 is driven positive relative to the cathode of this tube. As a consequence, the priming tube 1310 is fired to produce current flow therethrough over a path which includes resistor 1314 and the cathode load resistor 1315. Current flow in this circuit raises the positive potential of the parallel connector cathodes of the counting tubes in the hundreds digit register 311 to a high value. Concurrently, a relatively large voltage drop is produced across the resistor 1314 to decrease the positive potential on the control grid of the tube 1311 through the coupling condenser 1316. After the tube 1310 is fired in the manner just explained, the control grid thereof loses control such that the current flow through the tube is rendered independent of the potential on the control grid thereof. In this regard, it is noted that after the tube 1310 fires, the condenser 1312 charges to the full value of the voltage on the conductor 120c with the result that the control grid of the tube 1310 is reduced substantially to cathode potential. Firing of the tube 1310 in the manner just explained prevents the ten impulse counting tubes of the hundreds digit register 311 from prematurely firing in the manner fully described below.

When a relatively high positive potential is developed on the cathode bus conductor 333 interconnecting the cathodes of the tubes in the hundreds digit register 311, this potential is impressed upon the control grid of the dial tone gate tube 1533 over a path which includes the conductor 333 and the resistors 1500 and 1501. Normally, the tube 1533 is biased beyond cut-off by the negative potential impressed upon the control grid thereof through the resistor 1502 from the negative terminal of the bias potential source. However, the positive potential developed on the conductor 333 when the primer tube 1310 fires overcomes the negative bias normally impressed upon the grid of the tube 1533 and serves to bias this tube to the mid point to its class A operating range. Thus, the dial tone gate tube 1533 is rendered operative to amplify the 120 i.p.m. dial tone signal voltage impressed upon the control grid thereof through the condenser 1503 from the dial tone signal conductor 47. The amplified dial tone signal appearing at the anode of the tube 1533 is impressed upon the suppressor grid of the gate tube 1701 in the return out gate circuit 326 over a path which includes the condenser 1504, the resistor 1505, the conductor 344, and the low pass filter network indicated generally at 1803 in Fig. 18. As explained more fully below, this signal voltage modulates the pulses being gated by the tube 1701 in the time position 64b assigned to the calling line No. 123 with the dial tone signal, whereby this signal is delivered to the calling line to signal the calling subscriber that the dialing operation may be started.

Referring now more particularly to the forward in gate circuit 307, it is pointed out that this circuit is substantially identical to the calling line in gate circuit 407 in the connector 131b and reference may be had to the co-pending application, Serial No. 301,215, identified above, for a complete and detailed description of this portion of the selector 120b. However, it may be pointed out generally that finder gate pulses produced on the conductor 120d in the finder 120a control the circuit 307 to gate multiplexer pulses occurring on the multiplexer output conductor 50a in the time position 64b assigned to the calling line to the calling line reconstructor circuit 308. However, it will be noted that in the circuit 307 there is provided the resistor 1706 and the condenser 1707 which decouple the gate tube 1700 from the common positive potential source. Also, there is provided in the cathode of the inverter tube 1605 a small cathode resistor 1606 which provides a small amount of degeneration in the inverter tube 1605.

In considering the operating details of the forward reconstructor circuit 308, it is pointed out that this circuit is identical in many respects to the calling line reconstructor circuit 408 in the connector 131b and reference may be had to the co-pending application, Serial No. 301,215, identified above, for the detailed description of this circuit. However, for the purposes of the present invention, it may be stated that the circuit 308 functions to store the amplitude of the signal modulated multiplexer pulses for an interval equal to the duration of one pulse frame. In general, this is accomplished by charging the condenser 1607 through the charging tube 1602 in accordance with the amplitude of each pulse repeated to the reconstructor 308 by the forward in gate circuit 307 and discharging this condenser through the tube 1603 just prior to each such condenser charging operation. In the case under consideration, it will be understood that only signal modulated multiplexer pulses occurring in the time position 64b assigned to the calling line No. 123 are gated to the circuit 308 by the forward in gate circuit 307. In this connection, it will be noted that the control grid of the charging tube 1602 is connected to the cathode of the output tube 1601 over a path which includes the clamping rectifier 1608, and the resistor 1609 to provide a regenerative feed back path. However, the condenser 1610 functions together with the resistor 1609 as a low pass filter so that the circuit is regenerative only for the very low frequencies which occur during the dial impulses.

During dialing at the calling substation A, the flow of multiplexer pulses through the forward in gate circuit 307 to the control grid of the charging tube 1602 is interrupted. Accordingly, the discharge tube 1603, which continues to respond to finder gate pulses, discharges the condenser 1607 to a relatively low level and the circuit 308 thus discriminates between directive dial impulses and supervisory signals on the one hand and voice or intelligence signals on the other hand. The reconstructed signals developed in the circuit 308 are produced across the output resistors 1611 and 1612 connected between the cathode of the tube 1601 and ground. The reconstructed signals developed by the circuit 308 are coupled to the dial impulse integrator circuit 309 over the conductor 356a.

In order to discriminate between directive dial impulses and other supervisory signals on the one hand and voice or intelligence signals on the other hand, the output of the circuit 308 is transmitted to the forward out gate circuit 324 over two separate paths, one of which includes filter means for suppressing voice or intelligence signals and the other of which includes means for suppressing the dial impulses. Thus, the total amplitude of the reconstructed signals produced across the resistors 1611 and 1612 is transmitted over the conductor 356a and through the series connected resistor 1708 to the first control grid of the gate tube 1702 in the forward out gate circuit 324. Also, the portion of the reconstructed signals which is developed across the resistor 1612 is transmitted over the conductor 356, through the low pass filter indicated generally at 1709 and the condenser 1710 to the third control grid of the tube 1702 in the circuit 324.

In considering the operation of the dial pulse integrator circuit 309, it is pointed out that this circuit is generally similar to the corresponding dial impulse integrator circuit 409 in the connector 131b and reference may be had to the co-pending application, Serial No. 301,215, identified above, for a detailed description of this circuit. For the purposes of the present invention, it may be stated that this circuit performs the function of discriminating between dial impulses and all other signals developed at the output side of the forward reconstructor circuit 308 and there is produced across the anode resistor 1611 and the charging condenser 1612 a series of saw tooth voltage pulses corresponding to each dial impulse developed at the calling substation A. The saw tooth voltage pulses produced across the condenser 1612 during the first or hundreds digit dialed at the calling substation A are transmitted over the conductor 327 and through the condenser 1317 to the control grid of the inverter tube 1302 in the hundreds register inverter 360. These saw tooth control pulses are amplified and inverted in a tube 1302 and are coupled from the anode thereof through the condenser 1318 to the control grid of the pulser tube 1303 in the hundreds register pulser 310.

In considering the operation of the hundreds register pulser 310, it is pointed out that this circuit is identical to the tens register pulser 410 in the connector **131*b* and reference may be had to the co-pending application, Serial No. 301,215, identified above, for a complete and detailed description of this pulser circuit. However, for the purposes of the present invention, it may be stated that the pulser tube 1303, which is a cold cathode gas filled tube, is operated as a triggered relaxation oscillator which develops uniform amplitude register drive pulses across the common cathode resistor 1315 in the hundreds digit register 311**. Accordingly, this register is advanced to a setting corresponding to the first or hundreds digit dialed at the calling substation A.

In considering the operation of the hundreds digit register 311, it is pointed out that this circuit is substantially identical to the corresponding system component shown and described in detail in the co-pending application, Serial No. 292,676, filed on June 10, 1952, and reference may be had to this application for a complete and detailed description of the corresponding digit register. However, for the purposes of the present invention, it may be stated that the hundreds digit register 311 is driven by the large positive drive pulses produced across the resistor 1315 to register the numerical value of any hundreds digit dialed at the calling substation. Specifically, the tubes of this register other than the priming tube 1310, are connected to operate as a pulse counting chain wherein the cathodes of all of the tubes 1311, 1412–1417, and 1518–1520 are connected to the common drive conductor 333. The first register drive pulses to appear across the resistor 1315 raises the positive potential of the common cathode conductor 333 to a value which is approximately equal to or greater than the anode potential of the primer tube 1310 to interrupt space current flow through this tube. Furthermore, this pulse prevents any of the ten counting tubes of the register circuit 311 from firing for the duration of the pulse. It will thus be apparent that at the end of the open circuit period of the first dial impulse, the priming tube 1310 is deionized and the first counting tube 1311 is fired to register the first dial impulse. In the particular call under consideration, wherein the called line No. 232 is located in the second hundreds group 13 and has a hundreds digit designation of "2," the second counting tube 1412 will, of course, be ionized in response to the second impulse of the hundreds digit and will remain conductive for the duration of the call. All other counting tubes of the hundreds digit register 311 remain non-conductive for the duration of the call. The counting tubes of the hundreds digit register 311 selectively control the gating crystal rectifiers **1311*a*, 1412*a*–1417*a*, inclusive, and 1518*a*–1520*a*, inclusive, to gate to the selector impulse forming circuit 317 only those tens pulses which occur in the tens pulse time position assigned to the particular called hundreds line group. Thus, in the illustrated call, the counting tube 1412, which remains ionized at the end of the first digit, opens the gating rectifier 1412*a* so as to permit the tens pulses 73*a* appearing on the conductor 32*b* in the tens pulse time position assigned to the second hundreds group 13 to be transmitted through the rectifier 1412*a*, the condenser 1412*b*, and over the conductor 332 to the suppressor grid of the pulse mixer tube 1309 in the selector pulse forming circuit 317**.

Referring now to the manner in which dial tone signal transmission to the calling substation A is terminated when the dial operation is started, it is pointed out above that the priming tube 1310 of the hundreds digit register 311 is deionized in response to dialing of the first impulse of the first digit at the calling substation. When current flow through this tube to the resistor 1315 is thus arrested, the voltage drop across the resistor is substantially decreased to decrease the positive potential level on the conductor 333. When the positive potential level on the conductor 333 is thus reduced, the negative bias on the control grid of the dial tone gate tube 1533 rises to a value well beyond the cut-off value of this tube to render this tube non-conductive. As a result, the tube 1533 is blocked against repeating the dial tone signal on the conductor 47 and dial tone transmission to the calling substation is arrested.

Referring now more particularly to the hundreds sequence timing circuit 312, it is pointed out that this circuit corresponds generally to the tens sequence timing circuit 412 in the connector **131*b*. However, the hundreds sequence timing circuit 312 is of a simplified circuit arrangement wherein only two tubes, namely, the timing tube 1300 and the discharge tube 1301 are required. In this connection, it will be recalled that the circuit 312 controls the hundreds register pulser 310 and the idle pulse gate circuit 395 in such manner that the pulser 310 is rendered inactive at the end of the first digit and the idle pulse gate tube 1306 is conditioned to gate idle pulses therethrough which occur during the tens pulse interval assigned to the called hundreds line group as will be described in more detail in connection with the idle pulse gate circuit 395**.

Before describing the operation in the timing circuit 312 to perform the indicated functions, it is pointed out that immediately the selector **120*b* is operatively associated with the finder 120*a* and operating potential is applied to the conductor 120*c*, the priming tube 1310 fires so as to produce a relatively large voltage drop across the anode resistor 1314 thereof. The anode potential of the priming tube 1310 is transmitted over the conductor 311*a* to the series connected resistors 1319 and 1320 in the timing circuit 312 and these resistors are of such value that the timing tube 1300 is not fired when operating potential is applied to the conductors 120*c* and the primer tube 1310 is fired, due to the relatively large voltage drop across the anode resistor 1314 of this tube. However, the timing condenser 1322 in the circuit 312 starts to charge positively through the resistor 1350 immediately the priming tube 1310 is extinguished upon the occurrence of the first dial impulse. The anode of the discharging tube 1301 is connected to the timing condenser 1322 and the tube 1301 is periodically fired from the hundreds register pulser tube 1303 to prevent the condenser 1322 from charging sufficiently positively to fire the timing tube 1300. At the end of the first digit, the register pulser 310 ceases to produce register drive pulses so that the discharge tube 1301 is not fired and the condenser 1322 is permitted to charge positively by an amount sufficient to fire the timing tube 1300. It will be understood, therefore, that at the end of the first digit dialed at the calling substation, the tube 1300** is ionized and remains conductive for the duration of the call.

When the tube 1300 is ionized in the manner just explained, the resulting current flow through the resistors 1323 and 1324 in the cathode circuit thereof has the effect of increasing the cathode potential of the pulser tube 1303 by an amount sufficient to prevent this tube from responding to further control pulses repeated thereto through the inverter tube 1302 during the dialing of the second, third and fourth digits. The positive potential thus produced at the cathode of the timing tube 1300 is also transmitted over the conductor 334 and through the resistor 1325 to the shield grids 1306*a* and 1306*b* which surround the second control grid of the triple grid gate tube 1306 in the idle pulse gate circuit 395 to enable this tube. The positive potential produced on the conductor 334 is also impressed upon the resistor 1506 in the connector busy lock circuit 396 to initiate the start of the connector busy test interval. Thus, the hundreds sequence timing circuit 312 operates during the interdigit pause separating the first and second digits to block the hundreds register pulser 310 from further response to control pulses developed during the dialing of successive digits, to condition the idle pulse gate tube 1306 to repeat therethrough idle pulses which occur during the tens pulse time position assigned to the called hundreds line group 13, and to initiate a connector busy test interval in the busy lock circuit 396.

In considering the operation of the idle pulse gate circuit 395, it will be recalled from the general description of the system that the call forwarding selector, i.e., the selector 120*b* in the illustrated call, not only selects the called hundreds line group as determined by the first digit dialed at the calling substation, but also selects an idle connector within this called hundreds line group. Furthermore, if there are no idle connectors in this group, the selector returns a 120 i.p.m. busy tone signal to the calling line to inform the calling subscriber that there is no linkage available in the called hundreds line group to permit completion of the call. As described above in connection with the hundreds digit register 311, this register operates in response to the first digit to select the called hundreds line group and transmits tens pulses appearing in the tens pulse time position assigned to the selected called hundreds line group over the conductor 332 to the selector pulse forming circuit 317 and the idle pulse gate circuit 395. The idle pulse gate circuit 395 and the connector coincidence tube circuit 397 cooperate to select a particular units pulse time position, within the selected tens pulse time position, which is assigned to an idle one of the connectors in the called hundreds line group. In effect, therefore, the idle pulse gate circuit 395 and the coincidence tube circuit 397 perform a trunk hunting operation within the called hundreds group linkage to select an idle acceptor-connector link within this group. It will also be recalled from the general description of the system that the idle condition of each of the acceptor-connector links of the system is indicated by the presence of an idle pulse in the time position assigned to the particular acceptor-connector link on the idle pulse in conductor 197, these idle pulses being produced in the idle pulse circuit 403 of the acceptor in each of the acceptor-connector links of the system. The idle pulse in conductor 197 may carry the idle pulses for ten groups of ten acceptor-connector links so that idle pulses appearing in each pulse time position within the basic pulse time position frame will be present on the conductor 197 if ten acceptor-connector links are used in each hundreds group and they are all idle. Since there is no reason for the call forwarding selector to determine which connectors are idle in any group other than the selected called hundreds line group, it is the function of the idle pulse gate circuit 395 to transmit therethrough only those idle pulses which occur during the tens pulse time position assigned to the called hundreds line group 13. In addition, the idle pulse gate circuit 395 is controlled by the selector allotting circuit 20*b* in the common equipment 17 to transmit idle pulses therethrough only during a selector allotting period as defined by the selector allotting pulses developed by the circuit 20*b*. These selector allotting pulses are preferably of a duration equal to one pulse frame and recur once every one hundred pulse frames so that the one hundred selectors of the system are individually allotted a period of one pulse frame in each one hundred pulse frames during which they may select an idle acceptor-connector link in a called hundreds line group. In this connection, it will be understood that if the selectors of the system are not allotted in the manner described above, they would race to select idle acceptor-connector links and double connections might result. For example, if a selector in the first hundreds group 12 is handling a call intended for a line in the second hundreds group 13 and at the same time a selector in the tenth hundreds group 14 is also handling a call intended for a line in the second hundreds group 13, these two selectors would both be trying to select one of the idle pulses appearing on the conductor 197 during the second tens pulse interval 73*a* assigned to the second hundreds group 13. Since the idle pulses on the conductor 197 do not disappear instantaneously once the corresponding acceptor-connector link is seized, it is necessary to allot the selectors in the manner described above to prevent two selectors from seizing the same acceptor-connector link.

Considering now the operation of the idle pulse gate circuit 395, the idle pulses which are produced in the manner described above on the conductor 197 are coupled through the condenser 1326 to the first control grid of the idle pulse gate tube 1306. The tube 1306 is of the triple grid type wherein each of three control grids has a substantial mutual conductance relative to the anode thereof when operated at a potential which is negative with respect to the cathode of the tube. During the period between the seizure of the selector 120*b* by its associated finder 120*a* and the end of the first digit dialed at the substation A, the first control grid of the gate tube 1306 is operated at a potential just slightly more negative than the cut-off value of this grid so that idle pulses impressed upon the first control grid of the tube 1306 may cause conduction of this tube provided the potentials on the other two control grids of the tube are of the correct value to cause conduction. Thus, after the selector 120*b* is seized, operating anode potential is impressed upon conductor 120*c* and the resistors 1507 and 1508 in the connector busy lock circuit 396 and the resistor 1327 in the idle pulse gate circuit 395 are connected between the conductor 120*c* and the negative bias potential source. The value of these resistors is so chosen that the potential at the first control grid of the tube 1306 is just slightly beyond cut-off after potential is applied to the conductor 120*c*.

When the hundreds digit register 311 selects the called hundreds line group and releases tens pulses over the conductor 332 in the tens pulse time position assigned to the called hundreds line group, these tens pulses are coupled through the condenser 1328 to the third control grid of the idle pulse gate tube 1306, this control grid being normally operated at minus ten volts with respect to ground potential. Since the selection of an idle acceptor-connector link cannot be made until after the called hundreds line group has been selected, i.e., until after the first digit has been dialed at the calling substation A, the shield grids 1306*a* and 1306*b*, which surround the second control grid of the gate tube 1306 are normally operated at ground potential to prevent conduction of the tube 1306. However, at the end of the first digit, the hundreds sequence timing tube 1300 is fired in the manner described above so as to produce a positive potential on the conductor 334. This positive potential is impressed upon the grids 1306*a* and 1306*b* through the resistor 1325 so that these grids are biased to the correct operating potential of approximately 75 volts positive with respect to ground potential.

From the foregoing general description, it will be evident that several selectors within the same or different hundreds groups may be examining idle pulses of the same called line hundreds group at the same time. It is, therefore, possible that more than one selector may attempt to seize the same idle connector within the called hundreds lines group. In order to prevent double seizure of the same idle connector by two different selectors handling two different calls directed to the same hundreds line group, there is provided the selector allotting circuit 20*b* which sequentially produces selector allotting pulses on the conductor which are impressed upon the second control grid of the idle pulse gate tube 1306. The second control grid of the tube 1306 is also normally operated at minus ten volts with respect to ground potential. Accordingly, each selector within a particular hundreds line group is assigned an individual period during which it can hunt for an idle connector. By allowing the selectors to hunt only in sequence, there is no competition between selectors and double seizure of an idle connector is positively prevented.

When the selector allotting pulses appearing on the conductor 20–1 coincide with the tens pulses selected by the hundreds digit register 311, the idle pulse gate tube 1306 is permitted to transmit therethrough those idle pulses appearing on the idle pulse in conductor 197 which occur during the selected tens pulse interval assigned to the called hundreds line group and these selected idle pulses appear as negative pulses across the anode resistor 1341 of the tube 1306. Each of these selected idle pulses represents an idle acceptor-connector link in the called hundreds line group 13. The selected idle pulses are coupled through the condenser 1342 to the first control grid of the inverter tube 1307, a clamping rectifier 1343 serving to clamp the base line of these pulses to ground potential. The tube 1307 amplifies and inverts these selected idle pulses and they are coupled through the condenser 1344 to the control grids of a duel triode cathode follower tube 1308 and repeated in like phase across the cathode resistor 1345 of this tube. The positive selected idle pulses produced across the resistor 1345 are then transmitted over the conductor 395*a* to the connector coincidence tube circuit 397.

As described heretofore, the connector coincidence tube circuit 397 performs a trunk hunting operation within the called hundreds line group linkage to select an idle acceptor-connector link assigned to this group. More specifically, the connector coincidence tube circuit 397 comprises ten gaseous discharge coincidence tubes 1321, 1422–1427, inclusive, and 1528–1530, inclusive. Each of the tubes in the connector coincidence tube circuit 397 is preferably of the commercial type 5696.

In considering the operation of the connector coincidence tube circuit 397, it is pointed out that this circuit is in general similar to the tens and units coincidence tube circuits in the finder 120*a*, which are described in detail in the co-pending application, Serial No. 292,676, referred to above, and reference may be had to this application for a complete and detailed description of a coincidence tube circuit of this general type. However, for the purposes of the present invention, it may be stated that the idle pulses which are gated by the idle pulse gate circuit 395 are transmtited over the conductor 395*a* to the first control grids of each tube in the coincidence tube circuit 397 in parallel. Normally, the tubes of the coincidence tube circuit 397 are biased to prevent space current flow therethrough by the negative potentials impressed upon the first control grid thereof from the bleeder network including the resistors 1351 and 1509, the potential at the junction point of these resistors being applied to the grid return resistors of each coincidence gating tube. When operating potential is supplied to the anodes of the coincidence tubes in the circuit 397 over the conductor 120*c* incident to the operative association of the finder 120*a* with the calling line, these tubes are conditioned to fire under the joint control of the positive idle pulses gated to this circuit over the conductor 395*a* from the idle pulse gate circuit 395 and the positive units pulses respectively delivered to these coincidence tubes over the conductors 31*a*, 31*b*–31*j*. The idle pulses are transmitted to each coincidence gating tube through an associated coupling condenser. Thus, the idle pulses appearing on the conductor 395*a* are coupled through the condenser 1321*a* to the first control grid of the tube 1321. Likewise, these idle pulses are coupled through the condenser 1422*a* to the first control grid of the second coincidence tube 1422. Liksewise, the positive units pulses produced on the individual conductors of the cable 31 are individually connected to their respective coincidence gating tubes. For example, the units pulses appearing on the conductor 31*a* are coupled through the condenser 1321*b* to the shield grid of the first coincidence gating tube 3121. These units pulses are also coupled through the condenser 1321*c* to the gating rectifier 1321*d* associated with the first coincidence tube 1321. In a similar manner, the units pulses produced on the conductor 31*b* are coupled through the condenser 1422*b* to the shield grid of the second coincidence tube 1422 and these units pulses are also coupled through the condenser 1422*c* to the anode of the gating rectifier 1422*d*. In a similar manner, each one of the eight remaining units pulse conductors is coupled to the shield grid of the corresponding coincidence tube and to the anode of the gating rectifier associated therewith.

From the foregoing general description, it will be understood that the idle pulses appearing on the conductor 395*a* are capable of firing one of the tubes of the coincidence tube circuit 397 only when they occur coincidentally with the application of positive units pulses to the shield grid of the coincidence tube. It will also be understood that the coincidence of a particular idle pulse on the conductor 395*a* with a particular units pulse appearing on one of the conductors 31*a*, 31*b*, 31*j* may occur at any particular instant so that the trunk hunting operation, i.e., the idle connector selecting operation performed by the coincidence tube circuit 397 is entirely random in character.

The coincidence tube circuit 397 continues to hunt for an idle pulse appearing in the time position assigned to the called hundreds line group for the duration of the connector busy test interval. In this connection, it will be recalled that the connector busy lock circuit 396 determines the duration of the connector busy test interval. It will also be recalled that the trunk hunting operation for an idle acceptor-connector link within the called hundreds line group must be performed during the inter-digit pause between the first and second digits dialed at the calling substation A. Furthermore, an idle acceptor-connector link must be seized and operatively associated with the call forwarding selector during this inter-digit pause so that the second, third and fourth digits dialed at the calling substation A may be registered in the selected connector.

Assuming that the acceptor-connector link 131*b* in the called hundreds line group 13 is idle, the idle pulses produced by the acceptor 131*a* and transmitted over the conductor 197 to the idle pulse gate circuit 395, and through this gate circuit to the conductor 395*a*, are impressed upon the first control grid of the tube 1321 coincidentally with units pulses impressed upon the shield grid of this tube from the conductor 31*a*. As a result, the tube 1321 is fired. When the tube 1321 fires a positive potential is produced across the cathode resistor 1321*e* thereof so that the anode of the gating rectifier 1321*d* is made positive relative to the cathode of this rectifier and this rectifier is rendered fully conductive. Under these conditions, the units pulses appearing on the conductor 31*a* are transmitted through the condenser 1321*c* and the gating rectifier 1321*d* to the output conductor 345 of the coincidence tube circuit 397. In this connection, it will be understood that the coincidence tube circuit 397 operates to select an idle connector within the called line hundreds group at any time during the connector busy test interval. Thus, if the acceptor-connector link 131 is idle at the start of the connector busy test interval and all other links in the hundreds group 13 are busy, and the link 131 becomes idle before the end of the connector busy test interval, the tube 1321 will respond to the production of idle pulses on the conductor 395a in the time position 62b assigned to the connector link 131, which coincide with the units pulses impressed upon the conductor 31a by firing before the end of the connector busy test interval. It will also be understood that any one of the other nine coincidence tubes in the circuit 397 may be fired in a random manner by coincidence of the corresponding idle pulses with units pulses impressed upon the shield grids of these coincidence tubes, wherein the corresponding acceptor-connector link is operatively associated with the call forwarding selector 120b.

Assuming that the acceptor-connector link 131 is idle and that this link is selected in the coincidence tube circuit 397 by the firing of the tube 1321 thereof, positive units pulses appearing on the conductor 31a are gated through the rectifier 1321d and over the conductor 345 to the first control grid of the selector pulse mixer tube 1309 in the selector and connector busy pulse forming circuit 317.

In considering the operation of the circuit 317, it is pointed out that this circuit corresponds generally to the connector pulse forming circuit 417 in the connector 131b and reference may be had to the co-pending application, Serial No. 301,215, referred to above, for a detailed description of this circuit. However, for the purposes of the present invention, it may be stated that the units pulses gated through the rectifier 1321d are transmitted over the conductor 345 and through the condenser 1334 to the first control grid of the pulse mixing tube 1309. Likewise, the tens pulses produced on the output conductor 332 of the hundreds digit register 311 are transmitted over this conductor and through the condenser 1335 to the suppressor grid of the tube 1309. Both the first control grid and suppressor grid of the tube 1309 are biased negatively by means of the voltage divider network including the resistors 1329 and 1330 so that normally both of these control grids are cut off. However, when the tens pulses produced on the conductor 332 coincide with one of the units pulses produced on the conductor 345 the tube 1309 is rendered conductive and these coincident units pulses appear as negative pulses across the anode resistor 1331 of the tube 1309. The negative pulses produced at the anode of the tube 1309 are coupled through a pulse clipping circuit including the rectifier 1332 to the control grid of the pulse mixer inverter tube 1304. These negative pulses, the base line of which is clipped by means of the clipping circuit including the rectifier 1332 are amplified and inverted in the tube 1304 and appear as positive pulses at the anode of this tube. These positive pulses, which may now be referred to as selector pulses, are coupled through the condenser 133 and transmitted over the conductor 339 to the forward out gate circuit 324, the return in gate circuit 323 and return reconstructor circuit 322. More specifically, the selector pulses produced on the conductor 339 are coupled to the second control grid of the selector forward out gate tube 1702, to the first grid of the return in gate tube 1703 and to the first control grid of the peaker tube 1705 in the return reconstructor circuit 322. A common bias potential for these control grids is provided by the voltage divider network including the resistor 1711 and the potentiometer 1712.

The selector pulses produced at the anode of the tube 1304 are also coupled through the condenser 1346 to the control grid of the connector busy pulse gate tube 1340, this control grid being biased beyond cut-off by means of the divider network including the resistors 1347 and 1348 connected from the negative bias potential source to ground. These selector pulses are repeated at the anode of the tube 1340 as negative connector busy pulses and are transmitted over the conductor 205a, through the connector busy pulse coupling circuit 205, and over the conductor 205b to all of the acceptors of the system.

In considering the details of the forward out gate circuit 324, it is pointed out that this circuit is substantially identical to the called line out gate circuit in the connector 131b and reference may be had to the co-pending application, Serial no. 301,215, referred to above, for a detailed description of this circuit. However, for the purposes of the present invention, it may be stated that the linkage sampling pulses 96a, which are produced on the conductor 40b are transmitted over the conductor 40b and through the condenser 1713 to the first control grid of the forward out gate tube 1702. The selector pulses produced on the conductor 339 are coupled to the second control grid of this tube and the stepped audio wave which is produced across the resistor 1612 in the forward reconstructor circuit 308 is filtered in the low pass filter 1709 to remove the abrupt steps thereof and coupled through the condenser 1710 to the third control grid of the tube 1702. In order to repeat dial impulses through the circuit 324, which it will be recalled are produced as interruptions in the pulse flow through the input circuit 200 in the finder 120a, the output of the reconstructor circuit 308 is also transmitted over the conductor 356a and through the resistor 1708 to the first control grid of the forward out gate tube 1702. The first control grid of the tube 1702 is normally biased negatively by means of the bleeder network including the resistors 1611, 1612, 1708 and 1714. However, when signals are reconstructed in the circuit 308, a certain average potential is produced across the resistors 1611 and 1612 which operates to bias the first control grid of the tube 1702 to a sufficiently positive potential that the linkage sampling pulses impressed upon this grid by way of the conductor 40b will drive this grid into the conductive region of the tube 1702 provided the other control grids of this tube are simultaneously conducting. Accordingly, during the make period of each dial impulse, and other off hook periods, the potential on the first control grid of the tube 1702 is sufficiently positive to permit that one of the linkage sampling pulses which coincides with the selector pulses produced on the conductor 339 to be gated through the tube 1702 and also to be modulated in amplitude in accordance with the audio signals produced at the third control grid of this tube. However, during the break period of each dial impulse the potential on the resistors 1611 and 1612 is reduced to a relatively low value so that the first control grid of the tube 1702 is biased sufficiently beyond cut-off that transmission of linkage sampling pulses through the tube 1702 ceases. As a result, the dial impulses are repeated through the circuit 324 to the connector 131b. The particular linkage sampling pulse which is gated through the tube 1702 appears in the time position assigned to the selected idle acceptor-connector link. Thus, in the illustrated call, the linkage sampling pulses would appear in the time position 82b assigned to the link 131. The selected linkage sampling pulse may now be called a selector forward signal pulse and is transmitted over the conductor 195, through the selector forward coupling circuit 186, and over the conductor 196 to all of the connectors of the system. However, only the connector 131b is conditioned to accept these selector forward signal pulses by coincidence thereof with the acceptor gate pulses gated to the connector 131b by its associated acceptor 131a in the time position 62b assigned to the link 131. As a result, only the connector 131b responds to these selector forward signal pulses by selecting the tens, units and party line designation of the called line within the called hundreds line group 13 in the manner described in detail heretofore.

Assuming that all of the links 131, 133–135 in the hundreds group 13 are busy at the time the illustrated call is directed to the line No. 232 in the hundreds group 13, no idle pulses will be produced on the conductor 395a by the idle pulse gate circuit 395 and, hence, none of the coincidence tubes in the circuit 397 will be fired. It is the function of the connector busy lock circuit 396 to terminate the hunting operation of the coincidence tube circuit 397 at the end of the connector busy test interval and condition the busy tone gate circuit 325a to transmit a busy tone signal to the calling subscriber to inform him that there is no linkage available in the called hundreds line group to complete the call.

It will be recalled from the foregoing description of the operation of the selector 120b during dialing of the first digit, that after the first digit is completed the hundreds sequence timing tube 1300 in the circuit 312 is fired so as to produce a positive potential on the conductor 334. This potential is impressed upon an integration network including the resistor 1506 and the condenser 1521 so that the condenser 1521 starts to charge positively to the positive potential on the conductor 334. If the trunk hunting operation performed in the connector coincidence tube circuit 397 is succesful and one of the coincidence tubes therein is fired, a negative potential is produced across the common anode resistor 1336 in this circuit. This negative potential is coupled through the resistor 1522 to the condenser 1521 to prevent this condenser from being charged positively through the resistor 1506 by an amount sufficient to fire the tube 1531. As a result, if any one of the tubes in the coincidence tube circuit 397 is fired the condenser 1521 in the connector busy lock circuit 396 is prevented from charging to a sufficient positive level to fire the tube 1531 in this circuit. However, if all of the linkage in the called hundreds line group is busy, none of the coincidence tubes in the circuit 397 is fired and the condenser 1521 continues to charge positively until it reaches a sufficiently positive potential to fire the connector busy lock tube 1531. When this tube fires a positive potential is produced acros sthe cathode resistor 1523 thereof and this positive potential is coupled through the resistors 1524 and 1525 to the control grid of the busy tone gate tube 1532. The tone gate tube 1532 responds to this positive enabling bias potential impressed upon the control grid thereof, by gating therethrough a 120 i.p.m. busy tone signal derived from the busy tone generator 29d over the conductor 49 and through the coupling condenser 1526. This busy tone signal which is transmitted through the tone gate tube 1532 is coupled through the condenser 1527 and the resistor 1528 and over the conductor 344 and through the low pass filter 1803 to the third control grid of the return out gate tube 1701.

In considering the operation of the return out gate circuit 326, it is pointed out that this circuit corresponds generally to the calling line out gate circuit 426 in the connector 131b and reference may be had to the co-pending application, Serial No. 301,215, referred to above, for a complete and detailed description of this circuit. However, for the purposes of the present invention, it may be stated that the first control grid of the gate tube 1701 in the circuit 326 is excited by linkage sampling pulses impressed thereon from the conductor 40b through the coupling condenser 1715. The second control grid of the tube 1701 is excited by finder gate pulses appearing on the conductor 120d in the time position 64b assigned to the calling line No. 123. The third control grid of the tube 1701 is excited by the above-described busy tone signal from the busy tone gate circuit 325a, a corresponding dial tone signal from the dial tone gate circuit 325 and the reconstructed signal voltage derived from the called line which is produced across the output resistor 1804 in the return reconstructor circuit 322. Accordingly, when the busy tone signal is gated by the tube 1532 to the third control grid of the tube 1701 this latter tube responds thereto by modulating the linkage sampling pulse gated through this tube with the busy tone signal. The modulated selector pulse produced at the anode of the tube 1701 is coupled to the distributor 15a over the conductor 51a and is distributed to the line circuit 10a so as to inform the calling subscriber at the substation A that all of the linkage in the called hundreds line group is busy and that the call cannot be completed.

In the event that linkage is available in the called hundreds line group so that one of the coincidence tubes in the connector coincidence tube circuit 397 is fired, a negative potential is produced across the common anode resistor 1336 in this circuit so as to decrease the available charging potential for the condenser 1521 to a point such that this condenser is unable to charge sufficiently positively to fire the connector busy lock tube 1531. As a result, the busy tone gate tube 1532 is not enabled and no busy tone signal is returned to the calling subscriber.

From the foregoing general description of the system, it will be recalled that the selector forward signal pulses produced by the forward out gate circuit 324 in the manner described above are coupled to the operatively associated acceptor-connector link 131. It will further be recalled that these selector forward signal pulses are interrupted in accordance with the dial impulses produced at the calling substation A during the second, third and fourth digits. Accordingly, the selector forward signal pulses correspond substantially to the multiplexer pulses produced on the multiplexer output conductor 50a in the calling hundreds group 12. However, these selector forward signal pulses appear in the time position assigned to the acceptor-connector link 131.

As described generally heretofore, the connector 131b responds to the interruption in selector forward pulse flow by registering the second and third digits, and, in the event of a party line ringing system the fourth digit, so that the called line is selected within the called line hundreds group and also a party line ringing signal which identifies the called substation connected to the called line is selected by the connector 131. When the called substation G at the called line No. 232 answers, the signal modulated multiplexer pulses produced by the multiplexer 11b in the time position assigned to the called line are transmitted over the output conductor 50b thereof to the connector 131b and are shifted from the pulse time position 63c assigned to the called line No. 232 into the pulse time position 62b assigned to the acceptor-connector link 131. The connector 131b operates to produce selector return pulses which are modulated in accordance with the called line signals and these pulses are transmitted back to the selector 120b over a path which includes the conductor 200, the selector return coupling circuit 188, and the conductor 199. These selector return pulses are then impressed upon the return in gate circuit 323 in the selector 120b.

Considering now the operation of the return in gate circuit 323, it is pointed out that this circuit is in general similar to the called line in gate circuit 423 in the connector 131b and reference may be had to the co-pending application, Serial No. 301,215, referred to above, for a detailed description thereof. However, for the purposes of the present invention, it may be stated that the selector return pulses produced on the conductor 199 are coupled through the condenser 1716 to the suppressor grid of the return in gate tube 1703. These pulses are of positive polarity and are clamped by means of the crystal rectifier 1717 to the negative potential produced at the arm of the bias potentiometer 1718. The first control grid of the gate tube 1703 is excited by selector pulses impressed thereon from the conductor 339. As a result, the gate tube 1703 operates to gate therethrough only those selector return pulses which occur in the time position 62b assigned to the acceptor-connector link 131 which is operatively associated with the called forwarding selector 120b. These gated selector return pulses appearing at the anode of the tube 1703 are coupled through the condenser 1719 to the control grid of the inverter tube 1704 wherein they are amplified and inverted and appear as positive pulses at the anode of the tube 1704. These positive pulses are coupled through the condenser 1720 to the control grid of the charging tube 1801 in the return reconstructor circuit 322.

In considering the operation of the return reconstructor circuit 322, it is pointed out that this circuit corresponds generally to the called line reconstructor circuit 422 in the connector 131*b* and reference may be had to the co-pending application, Serial No. 301,215, identified above, for a detailed description of this circuit. However, for the purposes of the present invention, it may be stated that the selector pulses produced on the conductor 339 are impressed upon the first control grid of the peaker tube 1705 so as to produce at the anode of this tube short negative pulses which immediately precede the selector return pulses transmitted to the condenser charging tube 1801 in the circuit 332. The negative pulses produced at the anode of the peaker tube 1705 are coupled to the discharging tube 1800 and operate to render this tube conductive so that the condenser 1805 is discharged by the tube 1800 immediately prior to each charging operation by the tube 1801. As a result, the called line signals are reconstructed across the condenser 1805 in a step-like wave form the average value of which corresponds to the audio signals originating at the called line No. 232. This stepped audio waveform is impressed upon the control grid of the cathode follower tube 1802 and is reproduced across the resistor 1804 thereof in like phase. The reconstructed signals produced across the resistor 1804 are filtered in the low pass filter 1803 to remove the abrupt steps in the waveform produced by charging and discharging the condenser 1805 and the filtered audio signals are impressed upon the third control grid of the return out gate tube 1701 in the circuit 326. The gate tube 1701 in the circuit 326 operates to modulate the selector signal pulses produced at the anode of this tube with the called line signals which are reconstructed in the circuit 322 so that the signal modulated selector signal pulses are transmitted to the distributor 15*a* over the conductor 51*a* and are repeated through this distributor to the line circuit 10*a*. As a result, the called line signals are transmitted to the calling subscriber at the calling substation A so that two-way transmission of signals is accomplished between the calling substation A and the called substation G.

From the foregoing description of the system, it will be understood that the acceptor-connector links of the system are seized by call forwarding selectors and are busied to the remaining selectors of the system by means of the above-described idle pulse and connector busy pulse channels. Thus, each acceptor produces idle pulses in the time position assigned thereto and these idle pulses are transmitted through the idle pulse coupling circuit 187 to all of the selectors of the system in parallel. Each call forwarding selector selects one of these idle pulses in accordance with the hundreds digit designation of the called line and sends out connector busy pulses in the same time position which are coupled through the connector busy pulse coupling circuit 205 to all of the acceptors of the system. The corresponding acceptor responds to these connector busy pulses by removing the corresponding idle pulses from the idle pulse channel so that all of the other selectors of the system are informed that that particular acceptor-connector link is in use.

In order to simplify the cabling between the finder-selector links and the acceptor-connector links of the system, an alternative arrangement may be employed wherein the idle pulse channel between the acceptors and selectors of the system is eliminated. In this alternative embodiment, an idle pulse generator which is common to all of the linkage of the system is employed to generate idle pulses in the time positions assigned to each acceptor-connector link of the system, and the idle pulses carried by this idle pulse generator are transmitted to all of the selectors of the system. When a call forwarding selector selects one of these idle pulses, the selector produces connector busy pulses in the manner described heretofore in the same time position which are coupled through a connector busy pulse coupling circuit to all of the other selectors of the system. However, with this alternative embodiment, the idle pulse channel between the acceptors and selectors of the system is eliminated and the connector busy pulse channel does not extend between the acceptors and selectors of the system, but instead, merely interconnects the selectors to permit one call forwarding selector to busy a particular acceptor-connector link to all of the other selectors of the system.

In order to illustrate the details of this alternative embodiment, there is shown in Fig. 30 a portion of the selector 120*b* in which the necessary modifications have been made to provide for the single connector busying channel between the selectors of the system as described above. More specifically, there is shown in Fig. 30 of the drawings the idle pulse gate circuit 395 and the selector pulse and connector busy pulse forming circuit 317 of the selector 120*b* together with a connector busy pulse coupling circuit 3000 which is common to all of the selectors of the system. In Fig. 30, circuit components which are identical to those described in detail above in connection with Figs. 13 to 18, inclusive, of the drawings have been given corresponding reference numerals, the additional circuit components necessary to the alternative embodiment being given reference numerals in the 3000 series.

Before considering in detail the modifications which must be made in the selector 120*b* to provide this alternative embodiment, it is pointed out that the idle pulse circuit 403 in each of the acceptors of the system is eliminated by this alternative embodiment. Thus, in the acceptor 131*a* (Fig. 19), the tens pulses appearing on the conductor 32*b* are only transmitted through the condenser 1920 to the suppressor grid of the acceptor gate tube 1900 and the connection of the channel pulse conductor 34*a* to the acceptor 131*a* is not required, thereby further simplifying the cabling to the acceptors of the system. It is also pointed out that the idle pulse out conductor 198 which is common to all the acceptors of the system is eliminated as well as the idle pulse coupling circuit 187. The idle pulse in conductor 197, however, is still required in the alternative embodiment, but this conductor is connected to a common idle pulse generator in the common equipment 17.

In the event that ten acceptor-connector links are utilized in each hundreds line group of the system so that one hundred acceptor-connector links are used and each time position in the basic time position frame represents an active acceptor-connector link of the system, the linkage sampling pulses developed by the drive circuit 40*a* may readily be employed as idle pulses since these linkage sampling pulses appear in each time position within the basic time position frame and are of relatively short duration. Accordingly, if one hundred acceptor-connector links are used in the system, the output conductor 40*b* of the drive circuit 40*a* is connected to each of the selectors of the system in place of the idle pulse in conductor 197 in the system illustrated in Figs. 1–12, inclusive. However, if less than one hundred acceptor-connector links are employed in the system, it is necessary to provide additional artificial connector busying means as will be described in more detail hereinafter. It is further pointed out that in the alternative embodiment, the conductor 205*b* from the connector busy pulse coupling circuit 205 to all of the acceptors of the system is eliminated. It is also pointed out that in the described alternative embodiment the conductor 205*b* is not connected between the connector busy pulse coupling circuit 205 and all of the acceptors of the system, but instead, extends from the output terminals of the connector busy pulse coupling circuits 205 to all of the selectors of the system.

Considering now in more detail the selector modifications required in the described alternative embodiment, the idle pulse gate tube 1306 in the idle pulse gate circuit 395 is supplied with selector allotting pulses from the selector allotting circuit 20b over the conductor 20-1, the shield grids surrounding the second control grid of the tube 1306 are supplied with an enabling potential from the hundreds sequence timing circuit 312 over the conductor 334, and the third control grid of the tube 1306 is supplied with tens pulses selected by the hundreds digit register 311 over the conductor 332 in the same manner as that described in detail above in connection with Fig. 13 of the drawings. Furthermore, the first control grid of the tube 1306 is biased by means of a potential derived from the connector busy lock circuit 369 by way of the conductor 396a. However, in the described alternative embodiment, the first control grid of the gate tube 1306 is excited by linkage sampling pulses transmitted thereto over the conductor 40b from the drive circuit 40a. Furthermore, a cathode resistor 3002 is connected from the cathode of the tube 1306 to ground and the cathode of this tube is connected to the cathode of an idle pulse control tube 3001. The control grid of the control tube 3001 is connected through the condenser 3003 to the common connector busy pulse in conductor 205b which is multipled to all of the selectors of the system. Also, the control grid of the tube 3001 is biased beyond cut-off by means of the voltage divider network including the resistors 3004 and 3005 which are connected between the negative bias potential source and ground. The anode to the tube 3001 is connected to the positive potential source so that the tube 3001 is operated as a cathode follower and repeats any connector busy pulses transmitted thereto over the conductor 205b across the cathode resistor 3002 of the idle pulse gate tube 1306.

If any one of the acceptor-connector links of the system is seized by a call forwarding selector so that this call forwarding selector produces connector busy pulses in the time position assigned to the seized acceptor-connector links, these connector busy pulses will be present on the conductor 205b and will be produced across the cathode resistor 3002 of the gate tube 1306 so as to prevent this gate tube from transmitting therethrough those linkage sampling pulses impressed upon the first control grid thereof which occur during the connector busy pulses. Therefore, the idle pulse gate circuit 395 is prevented from transmitting therethrough those linkage sampling pulses which occur during the time positions assigned to seized acceptor-connector links in the called hundreds line group.

The remainder of the idle pulse gate circuit 395 and the selector pulse and connector busy pulse forming circuit 317 is substantially the same as described above in detail in connection with Fig. 13 of the drawings. However, it will be noted that the selector pulses which are transmitted to the return out gate circuit 326, the forwarding out gate circuit 324 and the return reconstructor circuit 322 are derived from the cathode of the connector busy pulse gate tube 1340.

In the described alternative embodiment, the output of the connector busy pulse gate tube 1340 is again connected over the common conductor 205a to the input terminals of a connector busy pulse coupling circuit. However, in the alternative embodiment, the output terminals of this connector busy pulse coupling circuit are multipled back to all of the selectors of the system. In this connection, it will be understood that the connector busy pulse coupling circuit 3000 shown in Fig. 30 performs an identical function to the connector busy pulse coupling circuit 205 shown in Figs. 1 to 12, inclusive, although a somewhat different circuit arrangement is shown in Fig. 30 of the drawings for this coupling circuit and either circuit may be employed to couple the connector busy pulses between the indicated multiple points in the system.

The connector busy pulses developed by all of the call forwarding selectors of the system are transmitted over the conductor 205a and through the condenser 3006 to the first control grid of an amplifier tube 3007, the resistor 3008 connected from the conductor 205a to the positive potential supply serving as the common anode resistor for all of the connector busy pulse gate tubes 1340 in the selectors of the system. A clamping rectifier 3009 functions to clamp the base line of the negative connector busy pulses impressed upon the first control grid of the tube 3007 to ground potential. These connector busy pulses are amplified and inverted in the tube 3007 and are coupled through the condenser 3010 to the first control grid of a cathode follower output tube 3011. These positive connector busy pulses are thus repeated across the cathode resistors 3012 and 3013 in the cathode circuit of the tube 3011 and are transmitted over the conductor 205b to the idle pulse control tubes 3001 in each of the selectors of the system. The cathode of the amplifier tube 3007 is connected to the junction point of the resistors 3012 and 3013 to provide a regenerative feedback connection from the output to the input of the connector busy pulse coupling circuit 3000 so that the wave shape of the connector busy pulses is maintained during transmission through the circuit 3000. Also, the inductance 3014 in the anode circuit of the amplifier tube 3007 is provided to improve the high frequency response of this amplifier and preserve the wave shape of the connector busy pulses which are transmitted through this tube. The positive connector busy pulses impressed upon the conductor 205b are transmitted to all of the selectors of the system and, as described heretofore, operate to block the idle pulse gate tube 1306 in each selector for the duration of each connector busy pulse. Accordingly, the seized acceptor-connector links of the system are busied to all of the selectors of the system without the provision of two separate pulse channels between the finder-selector linkage and the acceptor-connector linkage of the system.

In the event that less than one hundred acceptor-connector links are employed in the system, artificial busying means must be provided in the system to prevent the selectors of the system from selecting an idle pulse which occurs in a time position which is not assigned to an active acceptor-connector link. In this connection, it will be understood that certain ones of the acceptor-connector links of the system may be temporarily out of commission due to servicing, repairs or the like, in which case it is desirable to provide artificial busying means so that the remaining components of the system may function while such repairs are going on.

In accordance with the described alternative embodiment, there is provided an artificial connector busy pulse generator 3100, the details of which are shown in Fig. 31 of the drawings. The generator 3100 is similar in many respects to the trunk marking pulse generators 194a, 194b-194j, which are described in detail in the copending application, Serial No. 301,215, referred to above and reference may be had to that application for a general description thereof. The artificial connector busy pulse generator 3100 selects certain ones of the positive units pulses developed by the units pulse ring 20 and these selected units pulses are employed as artificial connector busy pulses to indicate a permanent busy condition in the time positions which are not assigned to active acceptor-connector links of the system. Thus, referring to Fig. 31, the units pulses which are successively produced on the units pulse conductors 31a, 31b-31j, inclusive, are connected to one or more of a plurality of units pulse mixing busses. In the illustrated embodiment, only two such busses 3101 and 3102 are shown as active pulse mixing busses. However, it will be understood that a pulse mixing bus may be provided for each tens digit level of the system in the event that one or more acceptor-connector links is missing from each hundreds line group of the system.

The units pulses which appear on the conductors 31*a*, 31*b*–31*j*, inclusive, are connected to different ones of the pulse mixing busses in accordance with the time positions assigned to inactive acceptor-connector links of the system. In the illustrated embodiment, it is assumed that only nine acceptor-connector links are active in the first hundreds group 12 and that these nine acceptor-connector links are assigned to the first nine time positions within the first tens pulse interval 72*a*. Accordingly, the units pulses appearing on the conductor 31*j* are connected to the pulse mixing bus 3101 through the isolating resistor 3103 so that units pulses 71*a*, 71*b*–71*j*, inclusive, appearing in the tenth units pulse time position in each tens pulse interval appear on the pulse mixing bus 3101. In this connection, it will be understood that the assignment of time positions to the acceptor-connector links in each hundreds group is on an arbitrary basis and the nine active acceptor-connector links in the first hundreds group 12 could equally well be assigned the second to tenth units pulse time positions in the first tens pulse interval 72*a* or any other nine time positions within this tens pulse interval.

In the illustrated embodiment, no acceptor-connector links are missing in the second and third hundreds line groups so that the pulse mixing busses 3104 and 3105 do not have any units pulses impressed thereon from the units pulse conductors 31*a*, 31*b*–31*j*, inclusive. In the fourth hundreds line group, it is assumed that only seven acceptor-connector links are actively assigned to this hundreds line group and these acceptor-connector links have assigned thereto the third through ninth units pulse time positions in the fourth tens pulse interval 75*a*. Accordingly, the units pulses appearing on the conductor 31*a* are coupled to the pulse mixing bus 3102 through the isolating resistor 3106, the units pulses appearing on the conductor 31*b* are coupled to the mixing bus 3101 through the isolating resistor 3107, and the units pulses appearing on the conductor 31*j* are likewise coupled to the mixing bus 3102 through the isolating resistor 3108. In this connection, it will be understood that the other isolating resistors shown in the drawing may be connected as desired to different ones of the pulse mixing busses to produce artificial connector busy pulses in different time positions in accordance with the number of acceptor-connector links used in each hundreds line group.

Each of the pulse mixing busses is connected to a pulse amplifying and clipping channel having the common anode load resistor 3109 as the output thereof. Thus, the pulse mixing bus 3101 is coupled through the condenser 3110 to the control grid of a first amplifier tube 3111 so that the units pulses impressed upon the pulse mixing bus 3101 are amplified and inverted in the tube 3111 and are coupled through the condenser 3112 to the control grid of a second amplifier and inverter tube 3113. The positive units pulses appearing at the anode of the tube 3113 are coupled through the condenser 3114 to the suppressor grid of a tens gating tube 3115. The anode of a clamping rectifier 3116 is connected to the suppressor grid of the tube 3115 and the cathode of this rectifier is connected to a positive potential as determined by the voltage divider network including the resistors 3117 and 3118 which are connected from the positive potential supply to ground.

In order to select only that one of the units pulses which appears in the first tens pulse interval 72*a*, the tens pulses appearing on the conductor 32*a* are coupled through the condenser 3119 to the first control grid of the gate tube 3115. Accordingly, only the units pulse 71*a*, which occurs during the first tens pulse interval 72*a*, appears across the common anode resistor 3109 of the gate tube 3115. In a similar manner, the units pulses impressed upon the pulse mixing bus 3102 are amplified and inverted in the tubes 3120 and 3121 and are impressed upon the suppressor grid of the tens gate tube 3122. Tens pulses appearing in the fourth tens pulse interval 75*a* are impressed upon the first control grid of the tube 3122 over the conductor 32*d* so that only the units pulses 62*d*, 63*d* and 71*d*, which occur during the fourth tens pulse interval 75*a*, are produced across the common anode resistor 3109. It will thus be evident that the units pulses appearing on the conductors 31*a*, 31*b*–31*j*, inclusive, may be selectively impressed upon the pulse mixing busses and selectively gated by means of the tens pulses appearing on the conductors 32*a*, 32*b*–32*j*, inclusive, so as to produce across the common anode resistor 3109 negative units pulses which may now be called connector busy pulses in any desired time position within the basic time position frame. These artificial connector busy pulses are coupled through the condenser 3125 to the first control grid of an amplifier tube 3126 wherein these pulses are amplified and inverted and appear at the anode of the tube 3126 as positive artificial connector busy pulses. The pulses produced at the anode of the tube 3126 are coupled through the condenser 3127 and through a pulse clipping circuit including the rectifiers 3128 and 3129 to the control grid of an output tube 3130. The cathode of the tube 3130 is biased positively by means of the voltage divider network including the resistors 3131 and 3132 so that normally the tube 3130 does not conduct. The negative artificial connector busy pulses produced at the anode of the tube 3130 are transmitted over the common connector busy pulse out conductor 205*a* to the connector busy pulse coupling circuit 3000. With this arrangement, any one of the acceptor-connector links of the system may be taken out of service by merely making an appropriate connection from the desired units pulse conductor to one of the units pulse mixing busses so as to produce artificial connector busy pulses in the time position assigned to the acceptor-connector links. Also, the trunking percentage of the system may be altered by means of the above-described artificial connector busy pulse generator since artificial connector busy pulses may be produced in those time positions which are not used by active acceptor-connector links of the system.

In the alternative embodiment shown in Fig. 30, the linkage sampling pulses produced on the conductor 40*b*, which appear in each time position on the basic time position frame, are used as idle pulses and those linkage sampling pulses which occur in time positions which are assigned to unused acceptor-connector links are cancelled by means of the above-described artificial connector busy pulses generator 3100. This arrangement may be further simplified by providing the idle pulse generator 3200, shown in Fig. 32 of the drawings, the output of which is connected to the first control grid of the idle pulse gate tube 1306 in each of the selectors of the system instead of the linkage sampling pulses produced on the conductor 40*b*. With this arrangement, the artificial connector busy pulse generator 3100 is not required since idle pulses are generated only in the pulse time positions which represent active acceptor-connector links of the system.

Considering now the details of the idle pulse generator 3200, a pulse forming matrix is provided which includes the pulse mixing busses 3201, 3202, etc., and substantially identical to that provided in the artificial connector busy pulse generator 3100. Furthermore, each pulse mixing bus has connected thereto an amplifying and gating channel similar to the artificial connector busy pulse generator 3100 so that there is produced across the common anode resistor 3209 in the idle pulse generator 3200, units pulses corresponding to the units pulse conductors which are connected to individual ones of the pulse mixing busses.

In order to simplify the connection of the units pulse conductors 31*a*, 31*b*–31*j*, inclusive, to the individual pulse mixing busses, only those units pulses which appear in the time positions which are not used by active acceptor-connector links are produced across the anode resistor 3209. These negative units pulses are coupled through the condenser 3240 and a pulse clipping circuit including the rectifier 3241 to the first control grid of an idle pulse gating tube 3242. The linkage sampling pulses appearing on the conductor 40*b* are coupled through the condenser 3243 to the suppressor grid of the gating tube 3242. Therefore, with no negative pulses impressed upon the first control grid of the tube 3242, i.e., with ten active acceptor-connector links in each hundreds group, all of the linkage sampling pulses are gated through the tube 3242 and appear as negative pulses across the anode resistor 3244 thereof. However, if one of the acceptor-connector links of the system is not in use, for example, if the tenth acceptor-connector link in the first hundreds group 12 is not in use, negative units pulses are produced across the resistor 3209 by connecting the units pulse conductor 31*j* through the isolating resistor 3203 to the pulse mixing bus 3201 and gating the units pulses appearing on this bus by means of the tens pulses appearing on the conductor 32*a*. This negative units pulse appearing across the resistor 3209 is coupled through the condenser 3240 to the first control grid of the gating tube 3242 so that this tube is cut off for the duration of this units pulse. Accordingly, the corresponding linkage sampling pulse appearing on the conductor 42*b* during the interval of this units pulse is prevented from being transmitted through the tube 3242 so that no pulse appears across the anode resistor 3244 in the tenth units pulse time position within the first tens pulse interval 72*a*. In a similar manner, one or more units pulses may be produced in each tens pulse interval according to the number of active acceptor-connector links in each hundreds line group, and there is produced across the resistor 3244 of the gate tube 3242 only those linkage sampling pulses which occur during the time positions assigned to active acceptor-connector links of the system. These linkage sampling pulses, which may now be called idle pulses, are coupled through the condenser 3245 to the first control grid of an amplifier tube 3246 and are repeated as positive pulses across the anode resistor 3247 of this tube. The positive idle pulses produced across the resistor 3247 are coupled through the condenser 3248 to the control grid of a cathode follower output tube 3249, a rectifier 3250 being connected from the control grid of the tube 3249 to ground to clamp the base line of these idle pulses to ground potential. The cathode of the tube 3249 is connected over the illustrated coaxial cable 3251 to the idle pulse gate tube 1306 in each of the selectors of the system, the 300 ohm impedance of the cable 3251 acting as the cathode impedance for the tube 3249. Accordingly, each of the idle pulse gate tubes 1306 in the selectors of the system has impressed thereon idle pulses which appear only in the time positions assigned to active acceptor-connector links of the system so that it is impossible to select an idle pulse which does not represent an active acceptor-connector link in the system.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In an automatic telephone system, a plurality of lines, means defining a plurality of line groups composed of different ones of said lines, means for developing a plurality of time positions which recur in repetitive time position frames, means for assigning each of said time positions to one line in each of several of said line groups so that the number of said lines is substantially greater than the number of said time positions, and time position responsive means directively controllable over calling ones of said lines for simultaneously setting up connections between different pairs of said lines in the time position assigned to the calling and called lines, said simultaneous connections including those involving calling and called lines in different line groups having the same time position assigned thereto.

2. In an automatic telephone system, a plurality of lines, means defining a plurality of line groups composed of different ones of said lines, means for developing a plurality of time positions which recur in repetitive time position frames, means for assigning each of said time positions to one line in each of several of said line groups, whereby the number of said lines is substantially greater than the number of said time positions, first time position responsive means directively controllable over any calling one of said lines for establishing a connection between said calling line and any called one of said lines, means for designating certain of said lines as restricted service lines, and second time position responsive means controlled by said restricted service designating means for restricting the service available to said restricted service lines.

3. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, first time position responsive means directively controllable over any calling one of said lines for establishing a connection between said calling line and any called one of said lines, means for designating certain of said lines as restricted service lines, and second time position responsive means controlled by said restricted service designating means and said time position developing means for restricting the service available to said restricted service lines.

4. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, first time position responsive means directively controllable over any calling one of said lines for establishing a connection between said calling line and any called one of said lines, means for assigning certain of said lines to one of two groups of restricted service lines having different classes of service available thereto, means for developing recurrent pulses which identify certain ones of said lines as being in one of said restricted service groups, and second time position responsive means controlled by said recurrent pulses for restricting the service available to the lines in one of said restricted service groups by limiting the time duration of calls initiated therefrom.

5. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, first time position responsive means directively controllable over any calling one of said lines for establishing a connection between said calling line and any called one of said lines, means for designating certain of said lines as restricted service lines, and means controlled by said restricted service designating means and operable independently of the calling and called line subscribers for terminating a call a predetermined time interval after the call is initiated in the event the calling line is designated as a restricted service line.

6. In an automatic telephone system, a plurality of lines, means defining a plurality of line groups composed of different ones of said lines, means for developing a plurality of time positions which recur in repetitive time position frames, means for assigning each of said time positions to one line in each of several of said line groups, whereby the number of said lines is substantially greater than the number of said time positions, first time position responsive means directively controllable over any calling one of said lines for establishing a connection between said calling line and any called one of said lines, means for designating certain of said lines as restricted service lines, and means controlled by said restricted service designating means for transmitting a warning tone signal to the calling and called subscribers involved in calls initiated by restricted service lines to inform these subscribers that the call therebetween has been in progress for a predetermined time interval.

7. In an automatic telephone system, a plurality of lines, means defining a plurality of line groups composed of different ones of said lines, means for developing a plurality of time positions which recur in repetitive time position frames, means for assigning each of said time positions to one line in each of several of said line groups, whereby the number of said lines is substantially greater than the number of said time positions, means for defining a plurality of different trunk groups in each of which certain ones of said lines in a particular one of said line groups are included, and time position responsive means directively controllable over any calling one of said lines for selecting an idle line within a called one of said trunk groups in response to a call directed to any one of the lines in said one trunk group and for thereafter transmitting signals in both directions between said calling line and said selected idle line.

8. In an automatic telephone system, a plurality of lines, means defining a plurality of line groups composed of different ones of said lines, means for developing a plurality of time positions which recur in repetitive time position frames, means for assigning each of said time positions to one line in each of several of said line groups, whereby the number of said lines is substantially greater than the number of said time positions, means for defining a plurality of different trunk groups in each of which certain ones of said lines in a particular one of said line groups are included, means for assigning consecutively occurring ones of said time positions to the lines in each of said trunk groups, and time position responsive means directively controllable over any calling one of said lines for selecting an idle line within a called one of said trunk groups in response to a call directed to a line in said one trunk group and for thereafter transmitting signals in both directions between said calling line and said selected idle line.

9. In an automatic telephone system, a plurality of lines, means defining a plurality of line groups composed of different ones of said lines, means for developing a plurality of time positions which recur in repetitive time position frames, means for assigning each of said time positions to one line in each of several of said line groups, whereby the number of said lines is substantially greater than the number of said time positions, means individual to each of said line groups for marking certain lines within the line group as trunks, a plurality of called line group selectors for each of said line groups, a plurality of called line selectors for each of said line groups, means responsive to the initiation of a call on one of said lines for selecting an idle one of said called line selectors in the called line group, and means including said selected called line selector and responsive to said trunk marking means for selecting an idle line within the called line trunk group in the event the called line is marked as a trunk.

10. In an automatic telephone system, a plurality of lines, means defining a plurality of line groups composed of different ones of said lines, means for developing a plurality of time positions which recur in repetitive time position frames, means for assigning each of said time positions to one line in each of several of said line groups, whereby the number of said lines is substantially greater than the number of said time positions, means individual to each of said line groups for marking certain lines within the line group as trunks, a plurality of called line group selectors for each of said line groups, a plurality of called line selectors for each of said line groups, means responsive to the initiation of a call on one of said lines for selecting an idle one of said called line selectors in the called line group, means including said selected called line selector and responsive to said trunk marking means for selecting an idle line within the called line trunk group in the event that called line is marked as a trunk, and means for transmitting a busy signal over the calling line in the event all of the lines in the called line trunk group are busy.

11. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, a plurality of finder-selector links for each of said line groups, a plurality of acceptor-connector links for each of said line groups, means for assigning a different one of said time positions to each of said acceptor-connector links, and means including a finder-selector link in the calling line group and an acceptor-connector link in the called line group for setting up a telephonic connection between the calling and called lines.

12. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, means for assigning different groups of said time positions to different ones of said line groups, signal sampling means for sampling signals produced on a calling one of said lines in the time position assigned to the calling line, called line group selecting means responsive to impulses produced on the calling called line as successive called line group selecting impulses and carried by the signal samples produced by said last named means for selecting the called line containing the called line group, called line selecting means responsive to impulses produced on the calling line as successive called line selecting impulses for selecting the called line within said selected called line group, signal sample converting means for thereafter converting the signal samples derived from the calling line into corresponding signal samples occurring in the time position assigned to the called line, and reconstructor means for reconstructing the sampled signals from said last named signal samples and for transmitting the reconstructed signals over the called line.

13. In an automatic telephone system, a plurality of lines, means defining a plurality of line groups comprising different ones of said lines, means for developing a plurality of time positions which recur in repetitive time position frames, means for assigning each of said time positions to one line in each of several line groups, whereby the number of said lines is substantially greater than the number of said time positions, a plurality of finder-selector links for each of said line groups, a plurality of acceptor-connector links for each of said line groups, means for assigning a different one of said time positions to each of said acceptor-connector links, means including a finder-selector link in the calling line group and an acceptor-connector link in the called line group for setting up a connection between the calling and called lines, and separate line busying means serving each of said line groups for busying calling and called lines to the links in the same line group as said calling and called lines are taken into use.

14. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, means for assigning different groups of said time positions to different ones of said line groups, signal sampling means for sampling signals produced on a calling one of said lines in the time position assigned to the calling line, first signal reconstructor means for reconstructing the sampled signals from said signal samples, first resampling means directively controllable over the calling line for resampling said reconstructed signals in an idle time position assigned to the called line group, second signal reconstructor means for reconstructing the sampled signals from said resamples second resampling means directively controllable over the calling line for resampling said last named reconstructed signals in the time position assigned to the called line within said called line group, and third signal reconstructor means for reconstructing the sampled signals from said last named resamples and for transmitting the reconstructed signals over the called line.

15. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, a multiplexer associated with each of said line groups including a common signal sample output channel and operative to sample signals produced on the lines of the associated line group in the time positions individually assigned to said lines and to transmit the signal samples over the common signal output channel thereof, a distributor associated with each of said line groups and including a common signal input channel and operative to distribute signal samples in accordance with the time positions assigned to the lines in the associated line group, a signal transmission channel common to all of said lines, a plurality of finder-selector links associated with each of said line groups and each connected directly between the multiplexer signal output channel of the corresponding line group and said common signal transmission channel, a plurality of acceptor-connector links associated with each of said line groups and each connected directly between said common signal transmission channel and the distributor signal input channel of the associated line group, each of said acceptor-connector links having individually assigned thereto a different one of said time positions, each of said finder-selector links being directively controllable over any calling line in the associated line group selectively to route signal samples derived from the calling line through the calling line group multiplexer and over the signal output channel thereof to an idle one of the acceptor-connector links associated with the called line group over a path which includes said common signal transmission channel, each of said acceptor-connector links being directly controllable over the calling line to route the calling line signal samples transmitted thereto over said common signal transmission channel to the distributor in the associated line group in the time position assigned to the called line over a path which includes the signal input channel of said associated distributor, and means for reconstructing the calling line signals from said distributed signal samples and for transmitting the reconstructed calling line signals over the called line.

16. In an automatic telephone system, a plurality of lines arranged in different line groups, each of said line groups including a plurality of lines having individually assigned thereto different time positions in repetitive time position frames, an electronic multiplexer associated with each of said line groups and including a common signal sample output channel and operative to sample signals produced on the lines of the associated line group in the time positions individually assigned to said lines and to transmit the signal samples over the common signal output channel thereof, an electronic distributor associated with each of said line groups and including a common signal input channel and operative to distribute signal samples in accordance with the time positions assigned to the lines in the associated line group, a signal transmission channel common to all of said lines, a plurality of finder-selector links associated with each of said line groups and each connected directly between the multiplexer signal output channel of the corresponding line group and said common signal transmission channel, a plurality of acceptor-connector links associated with each of said line groups and each connected directly between said common signal transmission channel and the distributor signal input channel of the associated line group, each of said acceptor-connector links having individually assigned thereto a different one of said time positions, means rendering each of said finder-selector links directively controllable over any calling line in the associated line group selectively to convert calling line signal samples derived from the associated calling line group multiplexer into corresponding selector forward signal samples occurring in the time position assigned to an idle acceptor-connector link in the called line group and to route said selector forward signal samples to said idle acceptor-connector link over a path which includes said common signal transmission channel, means rendering each of said acceptor-connector links directively controllable over the calling line to convert the selector forward signal samples transmitted thereto over said common signal transmission channel into corresponding connector signal samples occurring in the time position assigned to the called line and to route said connector signal samples to the distributor associated with the called line group over a path which includes the common signal input channel thereof, means rendering each of said acceptor-connector links operative to convert called line signal samples derived from the called line group multiplexer in the time position assigned to the called line into corresponding selector return signal samples occurring in the time position assigned to said one acceptor-connector link and to route said selector return signal samples to the finder-selector link operatively associated with the calling line over a path which includes said common signal transmission channel, means rendering each of said finder-selector links operative to convert selector-return signal samples transmitted thereto over said common signal transmission channel into corresponding signal samples occurring in the time position assigned to the calling line and to route said last named signal samples to the distributor associated with the calling line group, and means for reconstructing the original calling and called line signals from said distributed signal samples and for transmitting the reconstructed calling line signals over the called line and the reconstructed called line signals over the calling line.

17. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, a multiplexer associated with each of said line groups and including a common signal sample output channel and operative to sample signals produced on the lines of the associated line group in the time positions individually assigned to said lines and to transmit the signal samples over the common signal output channel thereof, a distributor associated with each of said line groups and including a common signal input channel and operative to distribute signal samples in accordance with the time positions assigned to the lines in the associated line group, a signal transmission channel common to all of said lines, a plurality of finder-selector links associated with each of said line groups and each connected directly between the multiplexer signal output channel of the corresponding line group and said common signal transmission channel, a plurality of acceptor-connector links associated with each of said line groups and each connected directly between said common signal transmission channel and the distributor signal input channel of the associated line group, each of said acceptor-connector links having individually assigned thereto a different one of said time positions, an idle pulse channel interconnecting all of said links, each of said acceptor-connector links including means for impressing idle pulses on said idle pulse channel in the time position assigned to said one acceptor-connector link when said one link is idle, each of said finder-selector links being directively controllable over any calling line in the associated line group to select the called line group and including means controlled in part by idle pulses appearing on said idle pulse channel for convering calling line signal samples derived from the associated calling line group multiplexer into corresponding selector signal samples occurring in the time position assigned to an idle acceptor-connector link in the called line group and routing said selector signal samples to said idle acceptor-connector link over a path which includes said common signal transmission channel, each of said acceptor-connector links being directively controlable over the calling line to convert the selector signal samples transmitted thereto over said common signal transmission channel into corresponding connector signal samples occurring in the time position assigned to the called line and to route said connector signal samples to the distributor associated with the called line group over a path which includes the common signal input channel thereof, and means for reconstructing the calling line signals from said connector signal samples routed to the associated distributor and for transmitting the reconstructed calling line signals over the called line.

18. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, a multiplexer associated with each of said line groups including a common signal samples output channel and operative to sample signals produced on the lines of the associated line group in the time positions individually assigned to said lines and to transmit the signal samples over the common signal output channel thereof, a distributor associated with each of said line groups and including a common signal input channel and operative to distribute signal samples in accordance with the time positions assigned to the lines in the associated line group, a signal transmission channel common to all of said lines, a plurality of finder-selector links associated with each of said line groups and each connected directly between the multiplexer signal output channel of the corresponding line group and said common signal transmission channel, a plurality of acceptor-connector links associated with each of said line groups and each connected directly between said common signal transmission channel and the signal input channel of the corresponding line group, each of said acceptor-connector links having individually assigned thereto a different one of said time positions, an idle pulse channel interconnecting all of said links, each of said acceptor-connector links including means for impressing idle pulses on said idle pulse channel in the time position assigned to said one acceptor-connector link when said one link is idle, each of said finder-selector links being directively controllable over any calling line in the associated line group to select the called line group and including means controlled in part by idle pulses appearing on said idle pulse channel for converting calling line signal samples derived from the associated calling line group multiplexer into corresponding selector forward signal samples occurring in the time position assigned to an idle acceptor-connector link in the called line group and routing said selector forward signal samples to said idle acceptor-connector link over a path which includes said common signal transmission channel, each of said acceptor-connector links being directively controllable over the calling line to convert the selector forward signal samples transmitted thereto over said common signal transmission channel into corresponding connector signal samples occurring in the time position assigned to the called line and to route said connector signal samples to the distributor associated with the called line group over a path which includes the common signal input channel thereof, each of said acceptor-connector links being operative to convert called line signal samples derived from the called line group multiplexer in the time position assigned to the called line into corresponding selector return signal samples occurring in the time position assigned to said one acceptor-connector link and to route said selector return signal samples to the finder-selector link operatively associated with the called line over a path which includes said common signal transmission channel, each of said finder-selector links being operative to convert selector-return signal samples transmitted thereto over said common signal transmission channel into corresponding signal samples occurring in the time position assigned to the calling line and to route said last named signal samples to the distributor associated with the calling line group, and means for reconstructing the original calling and called line signals from said distributed signal samples and for transmitting the reconstructed calling line signals over the called line and the reconstructed called line signals over the calling line.

19. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, a multiplexer associated with each of said line groups including a common signal sample output channel and operative to sample signals produced on the lines of the associated line group in the time positions individually assigned to said lines and to transmit the signal samples over the common signal output channel thereof, a distributor associated with each of said line groups and including a common signal input channel and operative to distribute signal samples in accordance with the time positions assigned to the lines in the associated line group, a signal transmission channel common to all of said lines, a plurality of finder-selector links associated with each of said line groups and each connected directly between the multiplexer signal output channel of the corresponding line group and said common signal transmission channel, a plurality of acceptor-connector links associated with each of said line groups and each connected directly between said common signal transmission channel and the distributor signal input channel of the corresponding line group, each of said acceptor-connector links having individually assigned thereto a different one of said time positions, an idle pulse channel interconnecting all of said links, each of said acceptor-connector links including means for impressing idle pulses on said idle pulse channel in the time position assigned to said one acceptor-connector link when said one link is idle, each of said finder-selector links being directively controllable over any calling line in the associated line group to select the called line group and including means controlled in part by idle pulses appearing on said idle pulse channel for converting calling line signal samples derived from the associated calling line group mutliplexer into corresponding selector signal samples occurring in the time position assigned to an idle acceptor-connector link in the called line group and routing said selector signal samples to said idle acceptor-connector link over a path which includes said common signal transmission channel, each of said acceptor-connector links including means responsive to selector signal samples transmitted thereto over said common signal transmission channel in the time position assigned to the acceptor-connector link for removing the corresponding idle pulses from said idle pulse channel thereby to indicate to the other finder-connector links of the system the busy condition thereof, each of said acceptor-connector links being directly controllable over the calling line to convert the selector signal samples transmitted thereto over said common signal transmission channel into corresponding connector signal samples occurring in the time position assigned to the called line and to route said connector signal samples to the distributor associated with the called line group over a path which includes the common signal input channel thereof, and means for reconstructing the calling line signals from said connector signal samples routed to the associated distributor and for transmitting the reconstructed calling line signals over the called line.

20. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, a plurality of finder-selector links for each of said line groups, a plurality of acceptor-connector links for each of said line groups, means for assigning a different one of said time positions to each of said acceptor-connector links, means including a finder-selector link in the calling line group and an acceptor-connector link in the called line group for setting up a connection between the calling and called lines, and means common to all of said line groups for busying said acceptor-connector links to said finder-selector links as said acceptor-connector links are taken into use.

21. In an automatic telephone system, a plurality of lines means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, each of said line groups having associated therewith a plurality of called line group selectors and a plurality of called line selectors, a finder for each of said called line group selectors for operatively associating the called line group selector with a calling one of said lines, each of said called line group selectors being directively controllable over the calling line operatively associated therewith to select the called line group and including means for selecting an idle called line selector serving the called line group, an acceptor for each of said called line selectors for operatively associating the called line selector with the selecting line group selector, each of said acceptors having individually assigned thereto one of said time positions, a selector busying channel interconnecting all of said selectors and common to all of said lines, selector busying means included in each of said acceptors for busying the associated line selector to the other line group selectors of the system over said selector busying channel, and means including tandem related called line group selector and called line selector pairs and the finders and acceptors associated therewith for concurrently providing mutually non-interfering two-way communication connections between different pairs of said lines.

22. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, each of said line groups having associated therewith a plurality of called line group selectors and a plurality of called line selectors, a finder for each of said called line group selectors for operatively associating the line group selector with a calling one of said lines, each of said called line group selectors being directively controllable over the calling line operatively associated therewith to select the called line group and including means for selecting an idle line selector in the called line group, an acceptor for each of said called line selectors for operatively associating the called line selector with the selecting line group selector, means including tandem related called line group selector and called line selector pairs and the finders and acceptors associated therewith for concurrently providing mutually non-interfering two-way communication connections between different pairs of said lines, and means included in each of said called line group selectors for transmitting a busy signal over the calling line operatively associated therewith in the event all of the called line selectors in the called line group are busy.

23. In an automatic telephone system, a plurality of lines arranged in different line groups, each of said line groups having associated therewith a plurality of line group selectors and a plurality of line selectors, a finder for each of said line group selectors for operatively associating the line group selector with a calling one of said lines, each of said line group selectors being directively controllable over the calling line operatively associated therewith to select the called line group and including means for selecting an idle line selector in the called line group, an acceptor for each of said line selectors for operatively associating the line selector with the selecting line group selector, a selector busying channel interconnecting all of said selectors and common to all of said lines, selector busying means included in each of said acceptors for busying the associated line selector to the other line group selectors of the system over said selector busying channel, each of said line selectors being directively controllable over the calling line and through the selecting line group selector to select the called line within the called line group, means including tandem related line group selector and line selector pairs and the finders and acceptors associated therewith for concurrently providing mutually non-interfering two-way communication connections between different pairs of said lines, means included in each of said line group selectors for transmitting a busy signal over the calling line operatively associated therewith a busy signal in the event all of the line selectors in the called line group are busy, means individual to each of said line groups for transmitting a busy signal over the calling line in the event all of the finders in the calling line group are busy, and means included in each of said line selectors for transmitting a busy signal over the calling line in the event the called line is busy.

24. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, means for assigning different groups of said time positions to different ones of said line groups, line units pulse generating means for repetitively generating units pulses in each of said time positions, synchronously operated group pulse generating means for generating a series of group pulses during each pulse frame, each of said group pulses spanning a group of said units pulses, means for generating signal bearing pulses in each time position of each pulse frame, signal sampling means controlled by said group and units pulses for sampling signals produced on a calling one of said lines in the time position assigned to the calling line, means controlled by said group and units pulses and directively controllable over the calling line for converting said signal samples into corresponding signal samples occurring in an idle one of the time positions assigned to the called line group and then converting said last named signal samples into corresponding signal samples occurring in the time position assigned to the called line within said called line group, and signal reconstructor means for reconstructing the sampled signals from said last named signal samples and for transmitting the reconstructed signals over the called line.

25. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, means for assigning different groups of said time positions to different ones of said line groups, selector means responsive to a digit of dial impulses transmitted over any calling one of said lines for selecting one of said groups of time positions in accordance with the numerical value of said dialed digit, means for producing idle pulses in the time positions included within each of said groups of time positions when the time position is idle, and means controlled in part by the idle pulses produced in the time positions within said selected group of time positions for selecting an idle time position within said selected time position group.

26. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, means for assigning different groups of said time positions to different ones of said line groups, selector means responsive to a digit of dial impulses transmitted over any calling one of said lines for selecting one of said groups of time positions in accordance with the numerical valve of said dialed digit, an idle pulse channel common to all of said line groups, means for transmitting idle pulses over said channel in each of said time positions, means controlled in part by the idle pulses transmitted over said channel for selecting an idle time position within said selected time position group, and means responsive to selection of said idle time position for preventing idle pulses from being transmitted over said channel in said selected idle time position.

27. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, means for assigning different groups of said time positions to different ones of said line groups, at least some active time positions in each of said time position groups being capable of handling calls intended for the line group to which the time position group is assigned, a plurality of called line group selectors each responsive to a digit of dial impulses transmitted over a calling one of said lines for selecting one of said time position groups in accordance with the numerical value of said dialed digit, an idle pulse channel common to all of said line group selectors, means for transmitting idle pulses over said channel to said selectors in each active one of said time positions, means included in each selector and controlled in part by the idle pulses transmitted thereto over said channel for selecting an idle active time position within the time position group selected thereby, and means included in each selector and responsive to the selection of an idle active time position thereby for busying said selected idle active time position to all of the other selectors of the system.

28. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, means for assigning different groups of said time positions to different ones of said line groups, at least some active time positions in each of said time position groups being capable of handling calls intended for the line group to which the time position group is assigned, a plurality of called line group selectors, means for operatively associating said selectors with different calling ones of said lines, an idle pulse channel common to all of said selectors, means for transmitting idle pulses over said channel to said selectors in each active one of said time positions, means included in each of said selectors and responsive to a digit of dial impulses transmitted over the calling line operatively associated therewith for selecting one of said time position groups in accordance with the numerical value of said dialed digit, idle pulse gating means included in each of said selectors and controlled in part by said last named means for selecting those idle pulses which occur in said selected time position group, means included in each of said selectors for selecting a single one of said selected idle pulses, and means included in each selector and responsive to the selection of said single idle pulse for blocking the idle pulse gating means in the other selectors of the system in the time position corresponding to said single idle pulse.

29. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, means for assigning different groups of said time positions to different ones of said line groups, means for developing calling line pulses in the time position assigned to any calling one of said lines, called line selector means responsive to a digit of dial impulses transmitted over said calling line and carried by said calling line pulses for developing selector pulses in a time position within one of said groups of time positions in accordance with the numerical value of said dialed digit, and selector allotting means for preventing said called line selector means from selecting the same time position for two simultaneously calling lines.

30. In an automatic telephone system, a plurality of lines, means defining a plurality of line groups comprising different ones of said lines, means for developing a plurality of time positions which recur in repetitive time position frames, means for assigning each of said time positions to one line in each of several of said line groups, whereby the number of said lines is substantially greater than the number of said time positions, means for assigning different groups of said time positions to different ones of said line groups, at least some active time positions in each of said time position groups being capable of handling calls intended for the line group to which the time position group is assigned, a plurality of called line group selectors each responsive to a digit of dial impulses transmitted over a calling one of said lines for selecting one of said time position groups in accordance with the numerical value of said dialed digit, an idle pulse channel common to all of said called line group selectors, means for transmitting idle pulses over said channel to said selectors in each idle one of said active time positions, idle pulse gating means included in each selector for selecting one of said idle pulses which occurs within the time position group selected thereby, and selector allotting means for sequentially energizing said idle pulse gating means in each selector, thereby to prevent the selection of the same idle pulse by two or more of said selectors.

References Cited in the file of this patent

UNITED STATES PATENTS

| | | |
|---|---|---|
| 2,490,833 | Ransom | Dec. 13, 1949 |
| 2,619,548 | Lesti | Nov. 25, 1952 |
| 2,647,163 | Lomax | July 28, 1953 |
| 2,649,505 | Ransom et al. | Aug. 18, 1953 |
| 2,754,367 | Levy | July 10, 1956 |
| 2,773,935 | Trousdale | Dec. 11, 1956 |
| 2,773,939 | Trousdale | Dec. 11, 1956 |

FOREIGN PATENTS

| | | |
|---|---|---|
| 777,933 | Great Britain | July 3, 1957 |

UNITED STATES PATENT OFFICE

CERTIFICATE OF CORRECTION

January 12, 1960

Patent No. 2,921,137

Frank A. Morris et al.

It is hereby certified that error appears in the printed specification of the above numbered patent requiring correction and that the said Letters Patent should read as corrected below.

Column 3, line 27, for "steppng swtches" read -- stepping switches --; column 82, line 50, strike out "called"; line 69, after "several" insert -- of said --; column 85, line 32, for "convering" read -- converting --; column 87, line 26, for "direct read -- directively --; column 90, line 15, after "said" insert -- called --.

Signed and sealed this 4th day of October 1960.

(SEAL)

Attest:

KARL H. AXLINE

Attesting Officer

ROBERT C. WATSON

Commissioner of Patents